US008075997B2

(12) United States Patent
Smith et al.

(10) Patent No.: US 8,075,997 B2
(45) Date of Patent: *Dec. 13, 2011

(54) COMPOSITION AND METHOD FOR MAKING A PROPPANT

(75) Inventors: Russell J. Smith, Houston, TX (US);
John R. Loscutova, Houston, TX (US);
Christopher E. Coker, Houston, TX (US); Andrew R. Barron, Houston, TX (US); Robert D. Skala, Katy, TX (US);
Elizabeth A. Whitsitt, Houston, TX (US); Mark Wiesner, Raleigh, NC (US);
Stephen A. Costantino, Reading, PA (US); Rajendra Bordia, Seattle, WA (US)

(73) Assignee: Oxane Materials, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,629

(22) Filed: Dec. 7, 2010

(65) Prior Publication Data
US 2011/0077176 A1 Mar. 31, 2011

Related U.S. Application Data

(63) Continuation of application No. 11/769,247, filed on Jun. 27, 2007, now Pat. No. 7,867,613, which is a continuation-in-part of application No. 11/728,953, filed on Mar. 27, 2007, which is a continuation-in-part of application No. 11/498,527, filed on Aug. 3, 2006, now Pat. No. 7,491,444, which is a continuation-in-part of application No. 11/347,664, filed on Feb. 3, 2006, now Pat. No. 7,459,209.

(60) Provisional application No. 60/649,594, filed on Feb. 4, 2005.

(51) Int. Cl.
*B32B 5/66* (2006.01)

(52) U.S. Cl. ........ 428/403; 428/404; 428/405; 428/407; 427/212

(58) Field of Classification Search .................. 428/407, 428/403–405; 427/212
See application file for complete search history.

(56) References Cited

U.S. PATENT DOCUMENTS

| | | |
|---|---|---|
| 3,365,315 A | 1/1968 | Beck et al. |
| 3,794,503 A | 2/1974 | Netting |
| 3,796,777 A | 3/1974 | Netting |
| 3,888,957 A | 6/1975 | Netting |
| 3,960,583 A | 6/1976 | Netting et al. |
| 4,111,713 A | 9/1978 | Beck |
| 4,303,061 A | 12/1981 | Torobin |
| 4,303,431 A | 12/1981 | Torobin |
| 4,303,432 A | 12/1981 | Torobin |
| 4,303,433 A | 12/1981 | Torobin |
| 4,303,730 A | 12/1981 | Torobin |
| 4,303,731 A | 12/1981 | Torobin |
| 4,303,732 A | 12/1981 | Torobin |
| 4,303,736 A | 12/1981 | Torobin |
| 4,349,456 A | 9/1982 | Sowman |
| 4,415,512 A | 11/1983 | Torobin |
| 4,420,442 A | 12/1983 | Sands |
| 4,421,562 A | 12/1983 | Sands |
| 4,427,068 A | 1/1984 | Fitzgibbon |
| 4,493,875 A | 1/1985 | Beck et al. |
| 4,547,468 A | 10/1985 | Jones et al. |
| 4,632,876 A | 12/1986 | Laird et al. |
| 4,637,990 A | 1/1987 | Torobin |
| 4,639,427 A | 1/1987 | Khaund |
| 4,641,709 A | 2/1987 | Powers et al. |
| 4,654,266 A | 3/1987 | Kachnik |
| 4,668,645 A | 5/1987 | Khaund |
| 4,671,909 A | 6/1987 | Torobin |
| 4,680,230 A | 7/1987 | Gibb et al. |
| 4,698,317 A | 10/1987 | Inoue et al. |
| 4,725,390 A | 2/1988 | Laird et al. |
| 4,743,545 A | 5/1988 | Torobin |
| 4,744,831 A | 5/1988 | Beck |
| 4,764,218 A | 8/1988 | Kobayashi et al. |
| 4,777,154 A | 10/1988 | Torobin |
| 4,790,688 A | 12/1988 | Castor |
| 4,793,980 A | 12/1988 | Torobin |
| 4,869,960 A | 9/1989 | Gibb et al. |
| 4,881,951 A | 11/1989 | Wood et al. |
| 4,894,285 A | 1/1990 | Fitzgibbob |
| 4,917,857 A | 4/1990 | Jaeckel et al. |
| 4,919,866 A | 4/1990 | Kubbutat |

(Continued)

FOREIGN PATENT DOCUMENTS

EP  0 102 761 A1  3/1984

(Continued)

OTHER PUBLICATIONS

Weisner et al., "Nanomaterials, Sustainability, and Risk Minimization," Introduction to IWA International Conference on Nano and Microparticles in Water and Wastewater Treatment, Sep. 2003 (11 pages).

(Continued)

*Primary Examiner* — Leszek Kiliman
(74) *Attorney, Agent, or Firm* — Kilyk & Bowersox, P.L.L.C.

(57) ABSTRACT

The present invention relates to proppants which can be used to prop open subterranean formation fractions. Proppant formulations are further disclosed which use one or more proppants of the present invention. Methods to prop open subterranean formation fractions are further disclosed. In addition, other uses for the proppants of the present invention are further disclosed, as well as methods of making the proppants.

39 Claims, 7 Drawing Sheets

U.S. PATENT DOCUMENTS

| | | | |
|---|---|---|---|
| 4,921,820 A | 5/1990 | Rumpf et al. | |
| 4,921,821 A | 5/1990 | Rumpf et al. | |
| 4,923,714 A | 5/1990 | Gibb et al. | |
| 4,944,905 A | 7/1990 | Gibb et al. | |
| 4,954,462 A | 9/1990 | Wood et al. | |
| 4,964,883 A | 10/1990 | Morris et al. | |
| 4,977,116 A | 12/1990 | Rumpf et al. | |
| 4,983,550 A | 1/1991 | Goetz et al. | |
| 5,017,523 A | 5/1991 | Kimura et al. | |
| 5,071,635 A | 12/1991 | Yamanaka et al. | |
| 5,120,455 A | 6/1992 | Lunghofer | |
| 5,183,493 A | 2/1993 | Brandau et al. | |
| 5,185,299 A | 2/1993 | Wood et al. | |
| 5,188,175 A | 2/1993 | Sweet | |
| 5,212,143 A | 5/1993 | Torobin | |
| 5,219,806 A | 6/1993 | Wood | |
| 5,225,123 A | 7/1993 | Torobin | |
| 5,240,654 A | 8/1993 | Smith et al. | |
| 5,240,894 A | 8/1993 | Burkhardt et al. | |
| 5,282,875 A | 2/1994 | Wood et al. | |
| 5,318,382 A | 6/1994 | Cahill | |
| 5,322,821 A | 6/1994 | Brezny | |
| 5,326,513 A | 7/1994 | Kubbutat | |
| 5,352,254 A | 10/1994 | Celikkaya | |
| 5,397,759 A | 3/1995 | Torobin | |
| 5,420,086 A | 5/1995 | Brandau et al. | |
| H1447 H | 6/1995 | Linton | |
| 5,472,648 A | 12/1995 | Alisch et al. | |
| 5,474,583 A | 12/1995 | Celikkaya | |
| 5,489,318 A | 2/1996 | Erickson et al. | |
| 5,496,386 A | 3/1996 | Broberg et al. | |
| 5,516,348 A | 5/1996 | Conwell et al. | |
| 5,534,348 A | 7/1996 | Miller et al. | |
| 5,547,479 A | 8/1996 | Conwell et al. | |
| 5,645,619 A | 7/1997 | Erickson et al. | |
| 5,669,941 A | 9/1997 | Peterson | |
| 5,690,707 A | 11/1997 | Wood et al. | |
| 5,708,039 A | 1/1998 | Daly et al. | |
| 5,728,184 A | 3/1998 | Monroe | |
| 5,739,368 A | 4/1998 | Krzystowczyk et al. | |
| 5,750,459 A | 5/1998 | Marella et al. | |
| 5,779,743 A | 7/1998 | Wood | |
| 5,893,935 A | 4/1999 | Wood | |
| 5,899,256 A | 5/1999 | Rohatgi | |
| 5,908,478 A | 6/1999 | Wood | |
| 5,921,317 A | 7/1999 | Dewprashad et al. | |
| 6,048,470 A | 4/2000 | Nakahara et al. | |
| 6,139,960 A | 10/2000 | Styron et al. | |
| 6,197,073 B1 | 3/2001 | Kadner et al. | |
| 6,206,942 B1 | 3/2001 | Wood | |
| 6,210,625 B1 | 4/2001 | Matsushita et al. | |
| 6,211,109 B1 | 4/2001 | Shamshoum et al. | |
| 6,258,456 B1 | 7/2001 | Meyer | |
| 6,322,890 B1 | 11/2001 | Barron et al. | |
| 6,330,916 B1 | 12/2001 | Rickards et al. | |
| 6,369,183 B1 | 4/2002 | Cook et al. | |
| 6,372,678 B1 | 4/2002 | Youngman et al. | |
| 6,406,789 B1 | 6/2002 | McDaniel et al. | |
| 6,409,650 B2 | 6/2002 | Bruno et al. | |
| 6,492,024 B1 | 12/2002 | Walter | |
| 6,528,446 B1 | 3/2003 | Stensrud | |
| 6,572,697 B2 | 6/2003 | Gleeson et al. | |
| 6,582,819 B2 | 6/2003 | McDaniel et al. | |
| 6,632,527 B1 | 10/2003 | McDaniel et al. | |
| 6,632,528 B1 | 10/2003 | Clough | |
| 6,667,261 B1 | 12/2003 | Anshits et al. | |
| 6,713,177 B2 | 3/2004 | George et al. | |
| 6,746,636 B2 | 6/2004 | Meyer | |
| 6,772,838 B2 | 8/2004 | Dawson et al. | |
| 6,780,804 B2 | 8/2004 | Webber et al. | |
| 6,805,737 B2 | 10/2004 | Godeke et al. | |
| 6,806,236 B2 | 10/2004 | Frenier et al. | |
| 6,832,654 B2 | 12/2004 | Ravensberger et al. | |
| 6,913,872 B1 | 7/2005 | Sturtevant et al. | |
| 6,916,891 B2 | 7/2005 | Salem et al. | |
| 6,962,200 B2 | 11/2005 | Nguyen et al. | |
| 6,983,797 B2 | 1/2006 | Nguyen et al. | |
| 7,032,664 B2 | 4/2006 | Lord et al. | |
| 7,036,591 B2 | 5/2006 | Cannan et al. | |
| 7,036,592 B2 | 5/2006 | Nguyen et al. | |
| 7,066,258 B2 | 6/2006 | Justus et al. | |
| 7,135,231 B1 | 11/2006 | Sinclair et al. | |
| 7,160,844 B2 | 1/2007 | Urbanek | |
| 7,220,454 B2 | 5/2007 | Barron et al. | |
| 7,459,209 B2* | 12/2008 | Smith et al. | 428/403 |
| 7,491,444 B2* | 2/2009 | Smith et al. | 428/402 |
| 7,867,613 B2* | 1/2011 | Smith et al. | 428/403 |
| 7,883,773 B2* | 2/2011 | Smith et al. | 428/402 |
| 7,887,918 B2* | 2/2011 | Smith et al. | 428/402 |
| 7,914,892 B2* | 3/2011 | Smith et al. | 428/402 |
| 2002/0025436 A1 | 2/2002 | Meyer | |
| 2002/0114941 A1 | 8/2002 | Franke et al. | |
| 2002/0128142 A1 | 9/2002 | Godeke et al. | |
| 2003/0026989 A1 | 2/2003 | George et al. | |
| 2003/0148893 A1 | 8/2003 | Lunghofer et al. | |
| 2003/0150185 A1 | 8/2003 | Godeke et al. | |
| 2003/0167797 A1 | 9/2003 | Schmid et al. | |
| 2003/0180537 A1 | 9/2003 | Meyer | |
| 2003/0203205 A1 | 10/2003 | Bi et al. | |
| 2003/0203207 A1 | 10/2003 | Pessey et al. | |
| 2004/0012105 A1 | 1/2004 | Deppe et al. | |
| 2004/0040708 A1 | 3/2004 | Stephenson et al. | |
| 2004/0069490 A1 | 4/2004 | Cannan et al. | |
| 2004/0079260 A1 | 4/2004 | Datta et al. | |
| 2004/0080063 A1 | 4/2004 | Datta et al. | |
| 2004/0081827 A1 | 4/2004 | Datta et al. | |
| 2004/0105980 A1 | 6/2004 | Sudarshan et al. | |
| 2004/0200617 A1 | 10/2004 | Stephenson et al. | |
| 2004/0224155 A1 | 11/2004 | Barron et al. | |
| 2004/0231844 A1 | 11/2004 | Nguyen et al. | |
| 2004/0251573 A1 | 12/2004 | Schmid | |
| 2004/0262801 A1 | 12/2004 | Hojaji et al. | |
| 2004/0266933 A1 | 12/2004 | Friedman et al. | |
| 2005/0006095 A1 | 1/2005 | Justus et al. | |
| 2005/0016726 A1 | 1/2005 | Nguyen et al. | |
| 2005/0022991 A1 | 2/2005 | Rao | |
| 2005/0028979 A1 | 2/2005 | Brannon et al. | |
| 2005/0061509 A1 | 3/2005 | Nguyen | |
| 2005/0089631 A1 | 4/2005 | Nguyen et al. | |
| 2005/0096207 A1 | 5/2005 | Urbanek | |
| 2005/0194141 A1 | 9/2005 | Sinclair et al. | |
| 2005/0244641 A1 | 11/2005 | Vincent | |
| 2005/0272611 A1 | 12/2005 | Lord et al. | |
| 2005/0284630 A1 | 12/2005 | Nguyen et al. | |
| 2006/0006589 A1 | 1/2006 | Canova et al. | |
| 2006/0016598 A1 | 1/2006 | Urbanek | |
| 2006/0035790 A1 | 2/2006 | Okell et al. | |
| 2006/0065398 A1 | 3/2006 | Brannon et al. | |
| 2006/0073980 A1 | 4/2006 | Brannon et al. | |
| 2006/0078682 A1 | 4/2006 | McDaniel et al. | |
| 2006/0081371 A1 | 4/2006 | Duenckel et al. | |
| 2006/0113080 A1 | 6/2006 | Nguyen et al. | |
| 2006/0151170 A1 | 7/2006 | Brannon et al. | |
| 2006/0162929 A1 | 7/2006 | Urbanek | |
| 2006/0177661 A1 | 8/2006 | Smith et al. | |
| 2006/0219600 A1 | 10/2006 | Palamara et al. | |
| 2006/0240967 A1 | 10/2006 | Hojaji et al. | |
| 2006/0258546 A1 | 11/2006 | Brannon et al. | |
| 2006/0272816 A1 | 12/2006 | Willberg et al. | |
| 2007/0021308 A1 | 1/2007 | Berger et al. | |
| 2007/0023187 A1 | 2/2007 | Canova et al. | |
| 2007/0036977 A1 | 2/2007 | Sinclair et al. | |
| 2007/0054054 A1 | 3/2007 | Svoboda et al. | |
| 2007/0062699 A1 | 3/2007 | Alary et al. | |
| 2007/0072776 A1 | 3/2007 | Crews | |
| 2007/0083331 A1 | 4/2007 | Craig | |
| 2007/0084602 A1 | 4/2007 | Curimbaba et al. | |
| 2007/0087941 A1 | 4/2007 | Cawiezel | |
| 2007/0099793 A1 | 5/2007 | Wilson | |
| 2007/0114030 A1 | 5/2007 | Todd et al. | |
| 2007/0166541 A1 | 7/2007 | Smith et al. | |
| 2007/0172654 A1 | 7/2007 | Leidolph et al. | |
| 2007/0172655 A1 | 7/2007 | Leidolph et al. | |
| 2007/0173417 A1 | 7/2007 | Kaufman et al. | |
| 2007/0202318 A1 | 8/2007 | Smith et al. | |
| 2007/0204992 A1 | 9/2007 | Davis et al. | |
| 2007/0209794 A1 | 9/2007 | Kaufman et al. | |

| 2008/0009425 | A1 | 1/2008 | Pershikova |
| 2008/0015103 | A1 | 1/2008 | Luscher et al. |
| 2008/0058228 | A1 | 3/2008 | Wilson |
| 2008/0070774 | A1 | 3/2008 | Shmotev et al. |
| 2008/0087429 | A1 | 4/2008 | Brannon et al. |

FOREIGN PATENT DOCUMENTS

| EP | 0 207 668 | A1 | 1/1987 |
| RU | 92001491 | | 9/1995 |
| RU | 2166079 | | 12/1999 |
| WO | WO 01/66909 | A2 | 9/2001 |
| WO | WO 2005/021147 | A2 | 3/2005 |
| WO | WO 2006/084236 | A1 | 8/2006 |

OTHER PUBLICATIONS

Thorsten Brandau and Egbert Brandau, "Hafnia and Hafnia—Zirconia Mixed Oxide Ultra Spherical Microspheres Made by a SOL-GEL-Vibrational Dropping Process," Feb. 26, 2005, pp. 1-7.

Thorsten Brandau, "Powders and Granules," Microspheres: Technology and Applications, Apr. 10, 2005, pp. 1-6.

International Search Report and Written Opinion issued Jul. 12, 2006 in PCT/US2006/004106.

Cutler et al., "Lightweight Proppants for Deep Gas Well Stimulation, Final Report," submitted by Terra Tek Engineering, work performed for the Department of Energy under Contract No. DE-AC19-79BC10038, Document No. DOE/BC/10038-29, published Jan. 1984 (64 pages).

Meyer, "Spheroidal Beads from Boiler Slag and Fly Ash," 1999 International Ash Utilization Symposium, Center for Applied Energy Research, University of Kentucky, Paper #29, 1999 (8 pages).

Communication from the European Patent Office from corresponding European Patent Application No. 06 734 420.0 dated Feb. 11, 2008 (3 pages).

International Search Report and Written Opinion of the International Searching Authority from corresponding International Patent Application No. PCT/US2007/015624 dated Mar. 3, 2008 (16 pages).

Defriend et al., "A flexible route to high strength α-alumina and aluminate spheres," Journal of Materials Science, No. 38, 2003, pp. 2673-2678.

Wang et al., "Conversion of Fly Ash Cenosphere to Hollow Microspheres with Zeolite/Mullite Composite Shells," Advanced Functional Materials, vol. 13, No. 7, Jul. 2003, pp. 563-567.

Defriend et al., "Surface repair of porous and damaged alumina bodies using carboxylate-alumoxane nanoparticles," Journal of Materials Science, No. 37, 2002, pp. 2909-2916.

Callender et al., "Aqueous Synthesis of Water-Soluble Alumoxanes: Environmentally Benign Precursors to Alumina and Aluminum-Based Ceramics," Chem. Mater., No. 9, 1997, pp. 2418-2433.

Mauer Engineering, "Geothermal Fracture Stimulation Technology, vol. 1, Fracturing Proppants and Their Properties," work performed under Contract No. AC32-79AL10563, U.S. Dept. of Energy, Geothermal Energy, Jul. 1980 (100 pgs.).

Arp et al., "Case History Study of Fracture Height Containment in East Texas," Society of Petroleum Engineers, Document No. SPE 14653, 1986 (6 pgs.).

Jones et al., "Lightweight Proppants for Deep Gas-Well Stimulation," First Annual Report Jul. 1979-Jul. 1980, work performed for the Dept. of Energy under Contract No. DE-AC19-79BC10038, published Oct. 1981, Document No. DOE/BC/10038-19 (34 pgs.).

Cutler et al., "Lightweight Proppants for Deep Gas Well Stimulation," Second Annual Report, Jul. 1, 1980-Jun. 30, 1981, work performed for the Dept. of Energy under Contract No. DE-AC19-79BC10038, published Apr. 1982, Document No. DOE/BC/10038-22 (51 pgs.).

Cutler et al., "Lightweight Proppants For Deep-Gas-Well Stimulation," Third Annual Report, Jul. 1, 1981-Jun. 30, 1982, work performed for the Dept. of Energy under Contract No. DE-AC19-79BC10038, published Apr. 1983, Document No. DOE/BC/10038-27 (113 pgs.).

Official Communication issued by the European Patent Office in corresponding European Patent Application No. 07 810 264.7 dated Oct. 6, 2009 (9 pages).

* cited by examiner

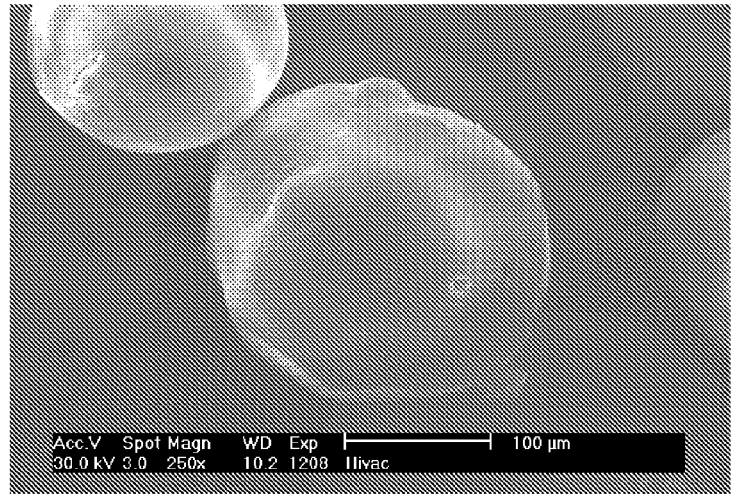
Figure 6: SEM micrograph at 250X magnification of proppant particles with sintered ceramic outer shell (to 1400°C) from Ex. 10.
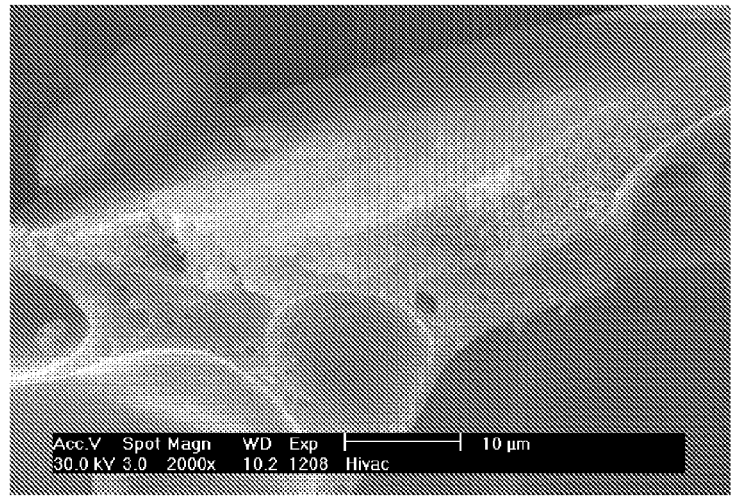
Figure 7: SEM micrograph at 2000X magnification of a fractured cross section from Ex. 10, showing sintered ceramic shell and underlying template.

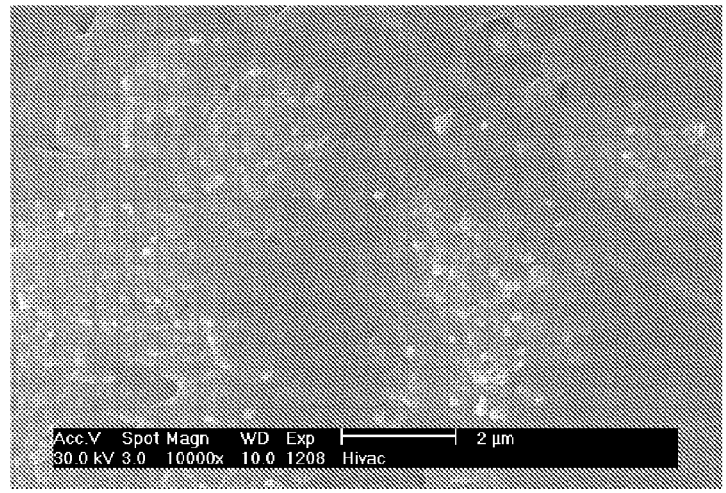
Figure 8: SEM micrograph at 10000X magnification of Ex. 10 shell microstructure, fired to 1400°C.
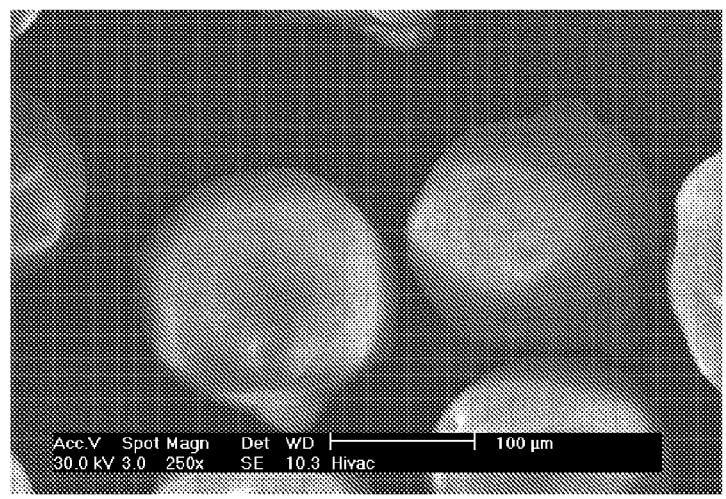
Figure 9: SEM micrograph at 250X magnification of proppant particles with sintered ceramic outer shell (to 1200°C) from Ex. 11.

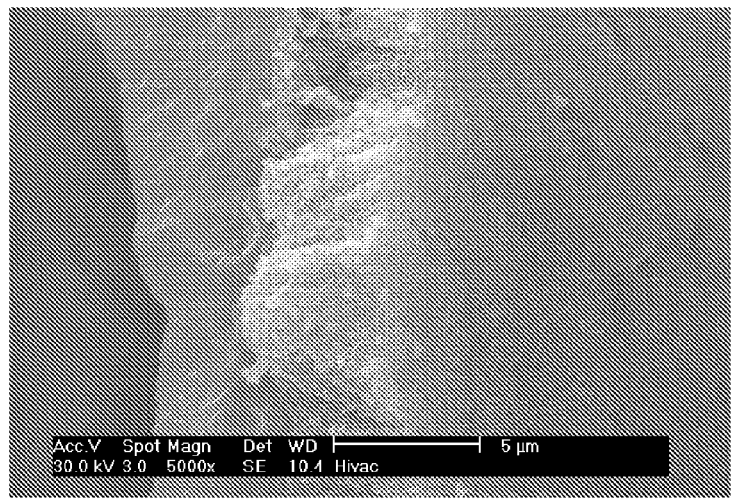
Figure 10: SEM micrograph at 5000X magnification of a fractured cross section from Ex. 11, showing sintered ceramic shell and underlying template. The ceramic shell has a uniform submicron grain size.
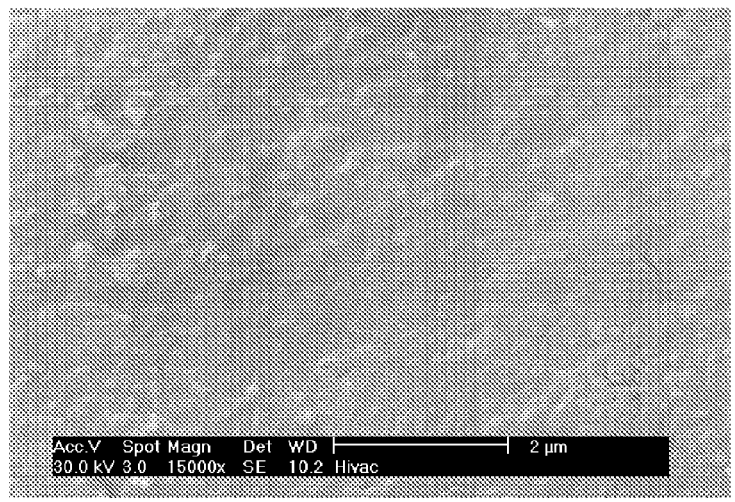
Figure 11: SEM micrograph at 15000X magnification of Ex. 11 shell microstructure, fired to 1200°C.

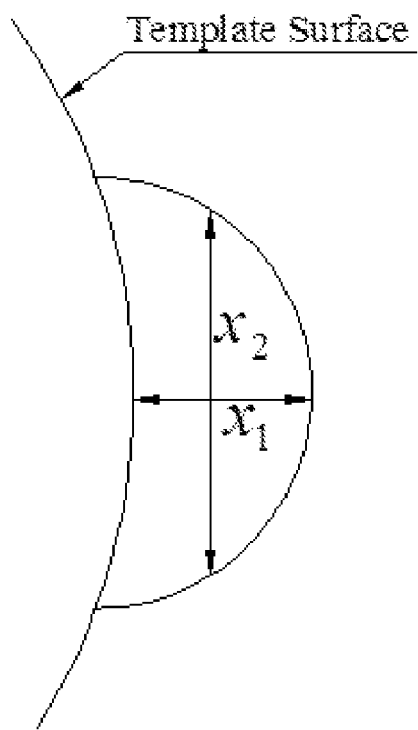
Figure 12: Schematic diagram showing measurements associated with surface morphology tests determined via the aspect ratio methodology.

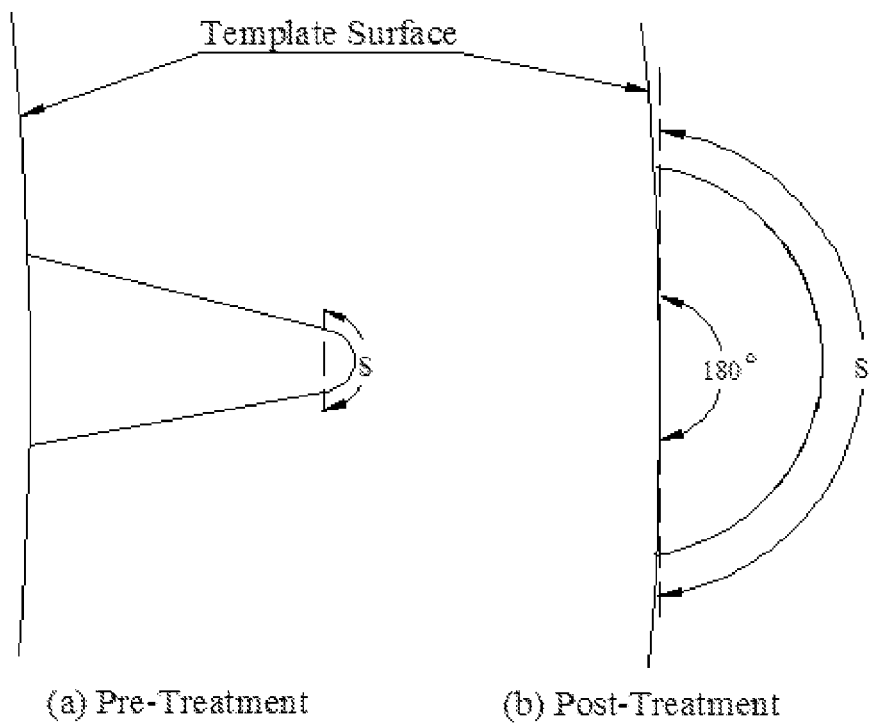
Figure 13: Schematic diagram showing measurement associated with surface morphology tests determined via the radius of curvature methodology.
(a) pretreatment, (b) post treatment

COMPOSITION AND METHOD FOR MAKING A PROPPANT

This application is a continuation of U.S. patent application Ser. No. 11/769,247, filed Jun. 27, 2007 (now allowed), which is a continuation-in-part of U.S. patent application Ser. No. 11/728,953, filed Mar. 27, 2007, which in turn is a continuation-in-part of U.S. patent application Ser. No. 11/498,527, filed Aug. 3, 2006 (now U.S. Pat. No. 7,491,444), which in turn is a continuation-in-part of U.S. patent application Ser. No. 11/347,664, filed Feb. 3, 2006 (now U.S. Pat. No. 7,459,209), which in turn claims the benefit under 35 U.S.C. §119 (e) of prior U.S. Provisional Patent Application No. 60/649,594 filed Feb. 4, 2005, all of which are incorporated in their entirety by reference herein.

BACKGROUND OF THE INVENTION

Recognition that the macroscopic properties of materials depend not only on their chemical composition, but also on the size, shape and structure has spawned investigations into the control of these parameters for various materials. In this regard, the fabrication of uniform hollow spheres has recently gained much interest. Hollow capsules with nanometer and micrometer dimensions offer a diverse range of potential applications, including utilization as encapsulants for the controlled release of a variety of substances, such as drugs, dyes, proteins, and cosmetics. When used as fillers for coatings, composites, insulating materials or pigments, hollow spheres provide advantages over the traditional solid particles because of their associated low densities. Hollow spheres may also be used in applications as diverse as hierarchical filtration membranes and proppants to prop open fractures in subterranean formations.

Ceramic proppants are widely used as propping agents to maintain permeability in oil and gas formations. Conventional proppants offered for sale exhibit exceptional crush strength but also extreme density. Typical densities of ceramic proppants exceed 100 pounds per cubic foot. Proppants are materials pumped into oil or gas wells at extreme pressure in a carrier solution (typically brine) during the fracturing process. Once the pumping-induced pressure is removed, proppants "prop" open fractures in the rock formation and thus preclude the fracture from closing. As a result, the amount of formation surface area exposed to the well bore is increased, enhancing recovery rates. Proppants also add mechanical strength to the formation and thus help maintain flow rates over time. Three grades of proppants are typically employed: sand, resin-coated sand and ceramic proppants. Proppants are principally used in gas wells, but do find application in oil wells.

Relevant quality parameters include: particle density (low density is desirable), crush strength and hardness, particle size (value depends on formation type), particle size distribution (tight distributions are desirable), particle shape (spherical shape is desired), pore size distribution (tight distributions are desirable), surface smoothness, corrosion resistance, temperature stability, and hydrophilicity (hydro-neutral to phobic is desired).

Ceramic proppants dominate sand and resin-coated sand on the critical dimensions of crush strength and hardness. They offer some benefit in terms of maximum achievable particle size, corrosion and temperature capability. Extensive theoretical modeling and practical case experience suggest that conventional ceramic proppants offer compelling benefits relative to sand or resin-coated sand for most formations. Ceramic-driven flow rate and recovery improvements of 20% or more relative to conventional sand solutions are not uncommon.

Ceramic proppants were initially developed for use in deep wells (e.g., those deeper than 7,500 feet) where sand's crush strength is inadequate. In an attempt to expand their addressable market, ceramic proppant manufacturers have introduced products focused on wells of intermediate depth.

Resin-coated sands offer a number of advantages relative to conventional sands. First, resin coated sands exhibit higher crush strength than uncoated sand given that resin-coating disperses load stresses over a wider area. Second, resin-coated sands are "tacky" and thus exhibit reduced "proppant flow-back" relative to conventional sand proppants (e.g. the proppant stays in the formation better). Third, resin coatings typically increase sphericity and roundness thereby reducing flow resistance through the proppant pack.

Ceramics are typically employed in wells of intermediate to deep depth. Shallow wells typically employ sand or no proppant. As will be described in later sections, shallow "water fracs'" represent a potential market roughly equivalent to the current ceramic market in terms of ceramic market size.

With a combined annual production of over 30 million tons, the oxides and hydroxides of aluminum are undoubtedly among the most industrially important chemicals (K. Wefers and C. Misra, "Oxides and Hydroxides of Aluminum." Alcoa Laboratories, 1987). Their uses include: precursors for the production of aluminum metal, catalysts and absorbents; structural ceramic materials; reinforcing agents for plastics and rubbers, antacids and binders for the pharmaceutical industry; and as low dielectric loss insulators in the electronics industry. With such a diverse range of applications, it is unsurprising that much research has been focused on developing and understanding methods for the preparation of these materials.

Traditional ceramic processing involves three basic steps generally referred to as powder processing, shape forming, and densification, often with a final mechanical finishing step. Although several steps may be energy intensive, the most direct environmental impact arises from the shape-forming process where various binders, solvents, and other potentially toxic agents are added to form and stabilize a solid ("green") body. In addition to any innate health risk associated with the chemical processing, these agents are subsequently removed in gaseous form by direct evaporation or pyrolysis. In many cast-parts, the liquid solvent alone consists of over 50% of the initial volume of material. The component chemicals listed, with relative per percentage, in Table 1 are essentially mixed to a slurry, cast, then dried and fired. All solvents and additives must be removed as gaseous products via evaporation or pyrolysis.

TABLE 1

Composition of a non aqueous tape-casting alumina slurry

| Function | Composition | Volume % |
| --- | --- | --- |
| Powder | Alumina | 27 |
| Solvent | 1,1,1-Trichloroethylene/Ethyl Alcohol | 58 |
| Deflocculent | Menhaden Oil | 1.8 |
| Binder | Polyvinyl Butyrol | 4.4 |
| Plasticizer | Polyethylene Glycol/Octyl Phthalate | 8.8 |

Whereas the traditional sintering process is used primarily for the manufacture of dense parts, the solution-gelation process has been applied industrially primarily for the production of porous materials and coatings. Solution-gelation involves a four-stage process: dispersion; gelation; drying; firing. A stable liquid dispersion or sol of the colloidal ceramic precursor is initially formed in a solvent with appropriate additives. By change in concentration (aging) or pH, the dispersion is polymerized to form a solid dispersion or gel. The excess liquid is removed from this gel by drying and the final ceramic is formed by firing the gel at higher temperatures.

The common solution-gelation route to aluminum oxides employs aluminum hydroxide or hydroxide-based material as the solid colloid, the second phase being water and/or an organic solvent. Aluminum hydroxide gels have traditionally been prepared by the neutralization of a concentrated aluminum salt solution; however, the strong interactions of the freshly precipitated alumina gels with ions from the precursors solutions makes it difficult to prepare these gels in pure form. To avoid this complication alumina gels may be prepared from the hydrolysis of aluminum alkoxides, $Al(OR)_3$ (Eq. 1).

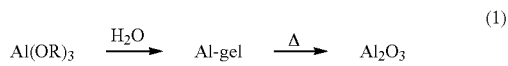

(1)

Although this method was originally reported by Adkins in 1922 (A. Adkins, J. Am. Chem. Soc. 1922, 44, 2175), it was not until the 1970's when it was shown that transparent ceramic bodies can be obtained by the pyrolysis of suitable alumina gels, that interest increased significantly (B. E. Yoldas, J. Mat. Sci. 1975, 10, 1856).

The exact composition of the gel in commercial systems is ordinarily proprietary, however, a typical composition can include an aluminum compound, a mineral acid and a complexing agent to inhibit premature precipitation of the gel, e.g., Table 2. The aluminum compound was traditionally assumed to be the direct precursor to pseudo-boehmite. However, the gel is now known to consist of aluminum-oxygen macromolecular species with a boehmite-like core: alumoxanes.

TABLE 2

Typical composition of an alumina sol-gel for slipcast filter membranes

| Function | Composition |
|---|---|
| Boehmite Precursor | ASB [aluminum sec-butoxide, $Al(OC_4H_9)_3$] |
| Electrolyte | $HNO_3$ 0.07 mole/mole ASB |
| Complexing agent | glycerol ca. 10 wt. % |

The replacement of 1,1,1-trichloroethylene (TCE) as a solvent in the traditional ceramic process must be regarded as a high priority for limiting environmental pollution. Due to its wide spread use as a solvent in industrial processes, TCE has become one of the most commonly found contaminants in ground waters and surface waters. Concentrations range from parts per billion to hundreds of milligrams per liter. The United States Environmental Protection Agency (USEPA) included TCE on its 1991 list of 17 high-priority toxic chemicals targeted for source reduction. The 1988 releases of TCE reported under the voluntary right to know provisions of Superfund Amendments and Reauthorization Act (SARA) totaled to 190.5 million pounds.

The plasticizers, binders, and alcohols used in the process present a number of potential environmental impacts associated with the release of combustion products during firing of the ceramics, and the need to recycle or discharge alcohols which, in the case of discharge to waterways, may exert high biological oxygen demands in the receiving communities.

Ceramic ultrafiltration (UF) and nanofiltration (NF) membranes have been fabricated by the sol-gel process in which a thin membrane film is deposited, typically by a slip-cast procedure, on an underlying porous support. This is typically achieved by hydrolysis of Al, Ti, Zr or other metal compounds to form a gelatinous hydroxide at a slightly elevated temperature and high pH. In the case of alumina membranes, this first step may be carried out with 2-butanol or iso-propanol. After removing the alcohol, the precipitated material is acidified, typically using nitric acid, to produce a colloidal suspension. By controlling the extent of aggregation in the colloidal sol, membranes of variable permeability may be produced. The aggregation of colloidal particles in the sol is controlled by adjusting the solution chemistry to influence the diffuse layer interactions between particles or through ultrasonification. Alternatively, a sol gel can be employed, which is then applied to a porous support. While this procedure offers greater control over membrane pore size than does the metal precipitation route, it is nonetheless a difficult process to manipulate. In both cases, plasticizers and binders are added to improve the properties of the slip cast solution. Once the film has been applied it is dried to prevent cracking and then sintered at high temperature.

The principal environmental results arising from the sol-gel process are those associated with use of strong acids, plasticizers, binders, and solvents. Depending on the firing conditions, variable amounts of organic materials such as binders and plasticizers may be released as combustion products. NOx's may also be produced from residual nitric acid in the off-gas. Moreover, acids and solvents must be recycled or disposed of. Energy consumption in the process entails "upstream" environmental emissions associated with the production of that energy.

The aluminum-based sol-gels formed during the hydrolysis of aluminum compounds belong to a general class of compounds: alumoxanes. Alumoxanes were first reported in 1958 and have since been prepared with a wide variety of substituents on aluminum. The structure of alumoxanes was proposed to consist of linear (I) or cyclic (II) chains (S. Pasynkiewicz, Polyhedron, 1990, 9, 429). Recent work has redefined the structural view of alumoxanes, and shown that they are not chains but three dimensional cage compounds (A. W. Apblett, A. C. Warren, and A. R. Barron, Chem. Mater., 1992, 4, 167; C. C. Landry, J. A. Davis, A. W. Apblett, and A. R. Barron, J. Mater. Chem., 1993, 3, 597). For example, siloxy-alumoxanes, [Al(O)(OH)x(OSiR3)1−x]n, consist of an aluminum-oxygen core structure (III) analogous to that found in the mineral boehmite, [Al(O)(OH)]n, with a siloxide substituted periphery.

(I)

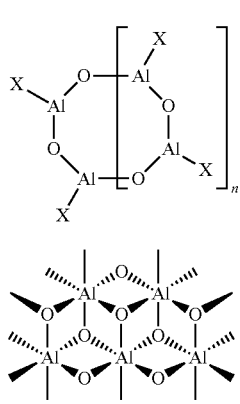

Precursor sol-gels are traditionally prepared via the hydrolysis of aluminum compounds (Eq. 1). This "bottom-up" approach of reacting small inorganic molecules to form oligomeric and polymeric materials has met with varied success, due to the difficulties in controlling the reaction conditions, and therefore the stoichiometries, solubility, and processability, of the resulting gel. It would thus be desirable to prepare alumoxanes in a one-pot bench-top synthesis from readily available, and commercially viable, starting materials, which would provide control over the products.

In the siloxy-alumoxanes, the "organic" unit itself contains aluminum, i.e., IV. Thus, in order to prepare the siloxy-alumoxane similar to those previously reported the anionic moiety, the "ligand" $[Al(OH)_2(OSiR_3)_2]^-$, would be used as a bridging group; adding this unit would clearly present a significant synthetic challenge. However, the carboxylate-alumoxanes represent a more realistic synthetic target since the carboxylate anion, $[RCO_2]^-$, is an isoelectronic and structural analog of the organic periphery found in siloxy-alumoxanes (IV and V). Based upon this rational, a "top-down" approach has been developed based upon the reaction of boehmite, $[Al(O)(OH)]_n$, with carboxylic acids, Eq. 2 (Landry, C. C.; Pappè, N.; Mason, M. R.; Apblett, A. W.; Tyler, A. N.; MacInnes, A. N.; Barron, A. R., J. Mater. Chem. 1995, 5, 331).

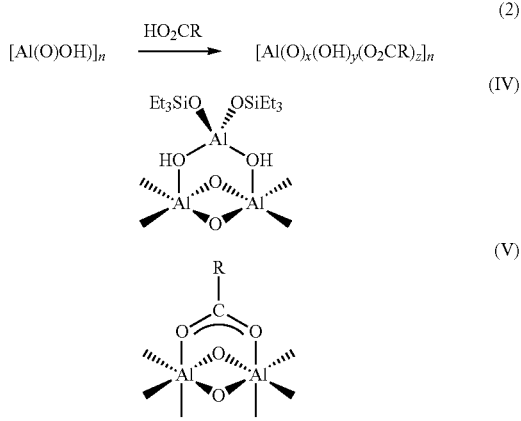

The carboxylate-alumoxane materials prepared from the reaction of boehmite and carboxylic acids are air and water stable materials and are very processable. The soluble carboxylate-alumoxanes can be dip-coated, spin coated, and spray-coated onto various substrates. The physical properties of the alumoxanes are highly dependent on the identity of the alkyl substituents, R, and range from insoluble crystalline powders to powders that readily form solutions or gels in hydrocarbon solvents and/or water. The alumoxanes are indefinitely stable under ambient conditions, and are adaptable to a wide range of processing techniques. Given the advantages observed for the application of carboxylate alumoxanes, e.g., the low price of boehmite ($1 $kg^{-1}$) and the availability of an almost infinite range of carboxylic acids make these species ideal as precursors for ternary and doped aluminum oxides. The alumoxanes can be easily converted to $\gamma$-$Al_2O_3$ upon mild thermolysis (A. W. Apblett, C. C. Landry, M. R. Mason, and A. R. Barron, Mat. Res. Soc., Symp. Proc., 1992, 249, 75).

SUMMARY OF THE INVENTION

A feature of the present invention is to provide a proppant having suitable crush strength and/or buoyancy as shown by specific gravity.

A further invention of the present invention is to provide a proppant that can overcome one or more of the disadvantages described above.

The present invention relates to a proppant comprising a template material and a shell on the template material, wherein the shell comprises a ceramic material or oxide thereof or a metal oxide. The template material can be a hollow sphere and can be a single particle, such as a cenosphere.

The present invention further relates to a proppant having a surface that comprises a ceramic material or oxide thereof or a metal oxide, wherein the surface has an average grain size of 1 micron or less. Other average grain sizes are possible. The surface can have a maximum grain size, as well as a tight distribution with respect to the grain sizes.

The present invention further relates to a method to prop open subterranean formation fractions using one or more proppants, which are preferably contained in proppant formulations.

The present invention further relates to methods of making the various proppants of the present invention. For instance, one method includes coating a template material with a formulation comprising a ceramic material or oxide thereof or a metal oxide to form a shell around the template and then hardening the shell, such as by sintering or calcining. Other methods are further described.

The present invention also relates to the use of the template alone for the uses described herein, including, but not limited to proppants for hydrocarbon recovery, concrete formulations, and the like. The present invention further relates to methods to form a template sphere or modify the surface of a template sphere using a variety of techniques, as described herein.

It is to be understood that both the foregoing general description and the following detailed description are exemplary and explanatory only and are intended to provide a further explanation of the present invention, as claimed.

The accompanying figures, which are incorporated in and constitute a part of this application, illustrate various embodiments of the present invention and, together with the description, serve to explain the principles of the present invention.

BRIEF DESCRIPTION OF DRAWINGS

FIGS. 6-11 are SEM microphotographs of several embodiments of the present invention.

FIG. 12 is a schematic diagram showing measurements associated with surface morphology tests determined via the aspect ratio methodology.

FIG. 13 is a schematic diagram showing measurement associated with surface morphology tests determined via the radius of curvature methodology (a) pretreatment, (b) post treatment.

DETAILED DESCRIPTION OF THE PRESENT INVENTION

Figure 1:
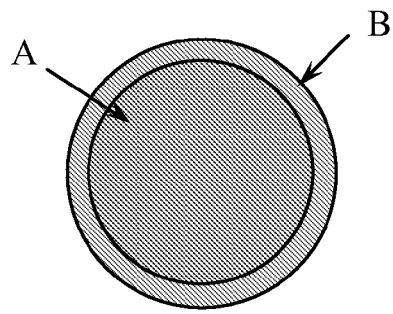
FIG. 1 is a schematic showing an embodiment of a proppant of the present invention showing a substrate (A) with the coating (B). The substrate (A) may be chosen from a group including, but not limited to, ceramic, natural material, shell, nut, or other materials. The coating (B) can be chosen from a group including, but not limited to, ceramic, ceramic precursor, polymer, resin, or a nanoparticle reinforced polymer or a nanoparticle reinforced resin.
Figure 2:
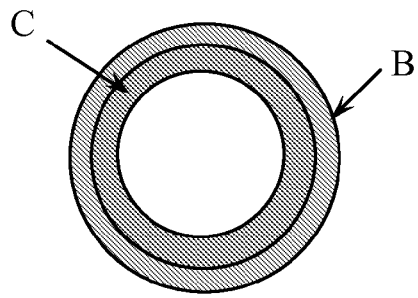
FIG. 2 shows a schematic of a proppant of the present invention showing a hollow substrate (C) with the coating (B). The substrate (C) may be chosen from a group including, but not limited to, ceramic, natural material, shell, nut, or other described in the claims. The coating (B) can be chosen from a group including, but not limited to, ceramic, ceramic precursor, polymer, resin, or a nanoparticle reinforced polymer or a nanoparticle reinforced resin.
Figure 3:
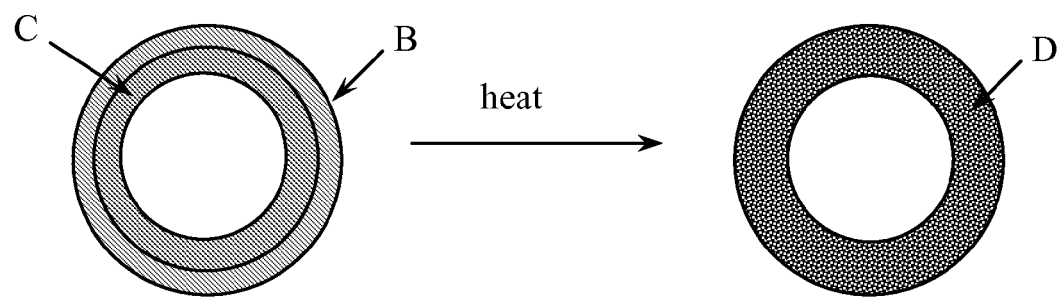
FIG. 3 shows a schematic of the reaction or conversion of the coating (B) and substrate (A) to form a mixed phase or new phase material (D).

The materials of the present invention when used as proppants could dominate current proppant solutions on all relevant quality dimensions. The methods of this invention are aimed at the fabrication of proppants that preferably exhibit neutral buoyancy, high crush strength, high sphericity, narrow size distribution, and/or high smoothness. These materials have the ability to materially reduce and/or possibly eliminate the need to employ expensive and reservoir permeability-destroying polymer carrier gels.

Equally important, the optimal shape, size, size distribution, pore size distribution, and/or surface smoothness properties of the present invention suggest that flow resistance through the proppant pack could be reduced, such as by more than 50%. Neutral buoyancy enhances proppant transport deep into the formation increasing the amount of fracture-area propped thereby increasing the mechanical strength of the reservoir. Due to the above issues, proppants of the present invention can achieve substantially increased flow rates and/or enhanced hydrocarbon recovery. The low-cost of the present invention's preferred nanoparticles, and the reduced material requirements (on a per pound basis) are advantages of the present invention's preferred proppants. The low density of the present invention's proppants may enable reductions in transportation costs in certain situations. Also, a lighter proppant allows more proppant to be added, which can be useful in water-frac operations or other uses. Also, pumping costs can be lower because the proppant is lighter and therefore less pumping force is needed which is helpful to costs and does less damage to the formation since less pump pressure is used to pump the same volume of material. Further, significantly improved flow rate of the hydrocarbon recovery can occur.

The proppants of the present invention present oil and gas producers with one or more of the following benefits: improved flow rates, improved productive life of wells, improved ability to design hydraulic fractures, and/or reduced environmental impact. The proppants of the present invention are designed to improve flow rates, eliminating or materially reducing the use of permeability destroying polymer gels, and/or reducing pressure drop through the proppant pack, and/or the ability to reduce the amount of water trapped between proppants thereby increasing hydrocarbon "flow area."

The high density of conventional ceramic proppants and sands (roughly 100 lb/cu.ft.) inhibit their transport inside fractures. High density causes proppants to "settle out" when pumped thereby minimizing their efficacy. To maintain dense proppants in solution, expensive polymer gels are typically mixed with the carrier solution (e.g. completion fluid). Once suspended in a gelled completion fluid, proppant transport is considerably enhanced.

Polymer gels are extremely difficult to de-cross link, however. As a result, the gel becomes trapped downhole, coats the fracture, and thereby reduces reservoir permeability. Gel-related reservoir permeability "damage factors" can range from 40% to more than 80% depending on formation type.

The neutral buoyancy property that can be exhibited by the proppants of the present invention preferably eliminates or greatly reduces the need to employ permeability destroying polymer gels as they naturally stay in suspension.

In one or more embodiments, the proppants of the present invention are designed to improve reservoir flow rates by changing the hydrophilic properties of the proppants themselves. The hydrophilic nature of current proppants causes water to be trapped in the pore spaces between proppants. If this water could be removed, flow rates would be increased.

The use of extreme pressure, polymer gels, and/or exotic completion fluids to place ceramic proppants into formations adversely impacts the mechanical strength of the reservoir and shortens its economic life. Proppants of the present invention preferably enable the use of simpler completion fluids and possibly less (or slower) destructive pumping. Thus, reservoirs packed with neutrally buoyant proppants preferably exhibit improved mechanical strength/permeability and thus increased economic life.

More importantly, enhanced proppant transport enabled by neutral buoyancy preferably enable the placement of the proppant of the present invention in areas that were heretofore impossible, or at least very difficult to prop. As a result, the mechanical strength of the formation is preferably improved, preferably reducing decline rates over time. This benefit could be of significant importance—especially within "water fracs" where the ability to place proppants is extremely limited.

If neutrally buoyant proppants are employed, water (fresh to heavy brines) may be used in place of more exotic completion fluids. The use of simpler completion fluids would reduce or eliminate the need to employ de-crossing linking agents. Further, increased use of environmentally friendly proppants may reduce the need to employ other environmentally damaging completion techniques such as flashing formations with hydrochloric acid.

In addition to fresh water, salt water and brines, or synthetic fluids are sometimes used in placing proppants to the desired locations. These are of particular importance for deep wells.

In the present invention a range of approaches for the synthesis and fabrication of proppants with designed buoyancy are disclosed. The proppants are designed such that the material properties are such that the proppant preferably has neutral, positive, or negative buoyancy in the medium chosen for pumping the proppant to its desired location in the subterranean formation.

In the present invention, the proppant can be either solid throughout or hollow within the proppant to control buoyancy. In the present invention, a solid proppant is defined as an object that does not contain a void space in the center, although a porous material would be suitable. A fully dense material is not a requirement of solid. A hollow material is defined as an object that has at least one void space inside with a defined size and shape.

In the present invention the proppant can be made from a ceramic, a polymer, or mixture thereof. The proppant can be made from nanoparticles. The proppant can be a composite or combination of ceramic, polymer and other materials. Although not required it is understood that a ceramic may include oxides such as aluminum oxides (alumina) or mixed metal aluminum oxides (aluminates).

The strength properties for a proppant can be dependent on the application. It is intended that a crush strength of 4000 psi to 12,000 psi or higher is desirable. However, for specific applications, crush-strengths of greater than 9000 psi or greater than 12000 psi are desirable. Other crush strengths below or above these ranges are possible.

The optimum size of the proppant can also be dependent on the particular application. Part of the present invention is that it is possible to design various proppant sizes. Sizes (e.g., particle diameters) may vary from 10 µm to 10,000 µm. The particle diameter can be in the range of from 50 µm to 2,000 µm.

The proppant can be made from a single-phase material or can be made from a multi-phase system, such as from a two phase system that comprises a substrate (or template) and a second phase. A summary of exemplary templates and substrates is shown in Table 3. The substrate or template may be an inorganic material such as a ceramic or glass. Specifically, the ceramic can be an oxide such as aluminum oxides (alumina) as well as mixed metal aluminum oxides such as metal aluminates containing calcium, yttrium, titanium, lanthanum, barium, and/or silicon in addition to aluminum. In order to make variable buoyant proppants, it is preferable to use a ceramic cenosphere or similar glass-like hollow sphere as the substrate or template. The substrate or template (or hollow material useful in the shell) can be obtained from such sources as Macrolite by Kinetico, Noblite by Noblite Microspheres, Omega Bubbles by Omega Minerals, or Poraver by Dennert Poraver GmbH.

Alternatively, the substrate or template may be an organic material, such as a polymer or organic molecule or surfactant. Although not limited as such, the polymer may be chosen from polystyrene, latex, polybutadiene, polyethylene, polypropylene and chemically related polymers. The polymer can be a naturally occurring material such as a peptide or protein.

Alternatively, the substrate can be a naturally occurring material chosen from plant or tree material, such as plant seeds, crushed nuts, whole nuts, plant pips, cells, coffee grinds, or food products.

In a two-phase system, the second phase can coat the supporting or template first phase, or infiltrates the supporting or template first phase, or reacts with the supporting or template first phase.

The second phase can be a polymer, such as an epoxide, polyolefin, or polymethacrylate. Furthermore, a nanoparticle material such as an alumoxane optionally containing chemical functional groups that allow for reaction with the polymer can reinforce the polymer. Suitable chemical functional groups or substituents include, but are not limited to, hydroxides, amines, carboxylates, or olefins.

The second phase can also be a ceramic or glass. The ceramic can be an oxide, such as aluminum oxide called alumina, or a mixed metal oxide of aluminum called an aluminate, a silicate, or an aluminosilicate, such as mullite or cordierite. The aluminate or ceramic may contain magnesium, calcium, yttrium, titanium, lanthanum, barium, and/or silicon. The ceramic may be formed from a nanoparticle precursor such as an alumoxane. Alumoxanes can be chemically functionalized aluminum oxide nanoparticles with surface groups including those derived from carboxylic acids such as acetate, methoxyacetate, methoxyethoxyacetate, methoxyethoxyethoxyacetate, lysine, and stearate, and the like.

The designed proppant can be suspended in a liquid phase. The liquid phase may make the proppant more easy to transport to a drill site. Transportation may be by rail transport, road or ship, or any other appropriate method, depending on geography and economic conditions. In addition to transport to the drill site, the suspended mixture is preferably pumpable or otherwise transportable down the well to a subterranean formation and placed such as to allow the flow of hydrocarbons out of the formation.

Specific methods for designing proppants with specific buoyancy, strength, size, and/or other desirable properties are summarized below.

A proppant particle with controlled buoyancy and crush strength used to prop open subterranean formation fractures can be made from a naturally occurring substrate coated with an organic polymer or resin coating preferably containing a nanoparticle reinforcement. The naturally occurring substrate can be chosen from the following group: crushed nut shells, plant seeds, coffee grinds, plant pips, or other food products. The organic polymer or resin can be chosen from the following group: epoxide resin, polyethylene, polystyrene, or polyaramide. The nanoparticle reinforcement can be of various types, but is preferably a carboxylate alumoxane in which the carboxylate alumoxane optionally has one or more types of chemical functional groups that can react or otherwise interact with the polymer resin and/or also allow for the alumoxane to be miscible with the polymer. Proppants of this design may be made by suspending a substrate material in a suitable solvent, adding the polymer, resin or resin components, adding the nanoparticle, allowing the resin and nanoparticle mixture to coat the substrate material, and drying the coated particle. The nanoparticle and resin components can be pre-mixed before addition to the substrate, and a solvent or other components can be a component of the resin or polymer.

A proppant particle with controlled buoyancy and crush strength used to prop open subterranean formation fractures can be made from a ceramic substrate and an organic polymer or resin coating. The ceramic substrate or template can be a non-porous or porous particle and can be a solid or hollow particle. It is preferable that the particle is a hollow spherical particle such as a cenosphere or similar product. Cenospheres can be commercially produced ceramic or glass hollow spheres that are made as side products in various industrial processes. The organic polymer or resin can be chosen from the following group: epoxide resin, polyethylene, polystyrene, or polyaramide. Proppants of this design may be made by suspending a substrate material in a suitable solvent, adding the polymer, resin or resin components, allowing the resin to coat the substrate material, and drying the coated particle. It is possible to use a solvent to facilitate the coating process. An improved version of this proppant can be prepared by the addition of nanoparticles for reinforcement, such as an alumoxane optionally with chemical functional groups that react and/or allow miscibility with the polymer resin. An alternative method of controlling the properties of the proppant is to add a linker group to the surface of the ceramic substrate that can react with the organic polymer or resin coating.

In one or more embodiments, a reinforced template sphere can be formed by providing a template sphere and reinforcing around the outer surface of said template sphere by direct nucleation and deposition of species onto the template sphere. The direct nucleation and deposition can comprise a precipitation reaction. The species can be any species mentioned in this invention. Precursors for precipitation include, but are not limited to: titanium tetrachloride, titanium oxychloride, titanium chloride, titanium oxysulphate, titanium sulphate, and titanium organo-metallic compounds such as titanium isopropoxide, calcium chloride, calcium hydroxide, aluminum chloride, aluminum nitrate, aluminum sulphate, and aluminum organo-metallics for example aluminum isopropoxide, and the like.

A proppant particle with controlled buoyancy and/or crush strength used to prop open subterranean formation fractures can be made from a ceramic substrate, a ceramic coating, or infiltration. The ceramic substrate or template is preferably spherical and hollow such as a cenosphere or similar material. However, any suitable substrate that provides the resulting properties of the proppant may be used. The ceramic coating or infiltration can be an oxide, for instance, an oxide of aluminum or a mixed metal oxide of aluminum. A proppant of this type may be prepared by coating of a spherical template with a ceramic precursor solution, drying the coated ceramic particle, and heating the coated ceramic particle to a temperature sufficient to form ceramic sphere of desired porosity and hardness. The ceramic precursor may be a nanoparticle such as an alumoxane, or a sol-gel precursor. Proppants of this type may be prepared by suspending the ceramic substrate in a suitable solvent, adding a ceramic precursor, allowing the ceramic precursor to coat the ceramic substrate, drying the coated ceramic particle, and heating the coated ceramic particle to a temperature sufficient to form ceramic spheres of desired porosity and hardness.

TABLE 3

| Possible Templates for proppants | | | |
|---|---|---|---|
| Food and food products | Plants and minerals | Waste | Other |
| Coffee, Milk, Whey, Animal/Fish Eggs, Nuts, Small corn pieces. Wood flour, Grain Husks (corn, maize, mailo, capher, sorgum). | Soils, Bauxite, Cellulose, Guargum, Algae, Lignin, Poppy Seeds, Mustard Seeds Rape Seeds Plankton Pieces of sponge Fur/Hair, Kohl Rabi Seeds | Slag (steel, coke) Silicas (diatomaceous earth, diatomite, kesselgur, Popped Perlite, Vermiculate), Fly ash (coke), Rust, Gypsum (fertilizer), Rubber (tires), Spent FCC catalyst, Spent Motor Oil Used adsorbents | a) Polypropylene, b) Glass Beads c) Surfactants/ Detergents d) Polystyrene e) Bacteria f) Erasers g) Soap Sawdust h) Macrolite |

TABLE 3-continued

| Possible Templates for proppants | | | |
|---|---|---|---|
| Food and food products | Plants and minerals | Waste | Other |
| | | Flue gas filter cakes from bags in baghouses cenospheres | |

In the present invention, in one or more embodiments, the invention relates to a proppant used to prop open subterranean formation fractions comprising a particle or particles with controlled buoyancy and/or crush strength. The controlled buoyancy can be a negative buoyancy, a neutral buoyancy, or a positive buoyancy in the medium chosen for pumping the proppant to its desired location in the subterranean formation. The medium chosen for pumping the proppant can be any desired medium capable of transporting the proppant to its desired location including, but not limited to a gas and/or liquid, energized fluid, foam, like aqueous solutions, such as water, brine solutions, and/or synthetic solutions. Any of the proppants of the present invention can have a crush strength sufficient for serving as a proppant to prop open subterranean formation fractures. For instance, the crush strength can be 1,000 psi or greater, 3,000 psi or greater, greater than 4000 psi, greater than 9000 psi, or greater than 12000 psi. Suitable crush strength ranges can be from about 3000 psi to about 15000 psi, or from about 5000 psi to about 15000 psi, and the like. In some applications, like coal bed methane recovery, a crush strength below 3000 psi can be useful, such as 500 psi to 3000 psi, or 1000 psi to 2,000 psi.

The proppants of the present invention can comprise a single particle or multiple particles and can be a solid, partially hollow, or completely hollow in the interior of the particle. The particle can be spherical, nearly spherical, oblong in shape (or any combination thereof) or have other shapes suitable for purposes of being a proppant.

The proppant can have any particle size. For instance, the proppant can have a particle diameter size of from about 1 nm to 1 cm or a diameter in the range of from about 1 micron to about 1 mm, or a diameter of from about 10 microns to about 10000 microns, or a diameter of from about 1000 microns to about 2000 microns. Other particle sizes can be used. Further, the particle sizes as measured by their diameter can be above the numerical ranges provided herein or below the numerical ranges provided herein.

In one or more embodiments of the present invention, the particle comprising the proppant can be or can contain a ceramic material. The ceramic material can comprise an oxide such as an oxide of aluminum. The ceramic material can comprise an aluminate. For instance, the aluminate can be an aluminate of calcium, yttrium, titanium, lanthanum, barium, or silicon, or any combinations thereof, and/or other elements that can form aluminates.

In the present invention, the particle(s) forming the proppant can comprise a substrate or template and a second phase, such as a coating on the substrate or template. The substrate or template can be a polymer or surfactant or ceramic material. The polymer, for instance, can be any thermoplastic or thermoset polymer, or naturally occurring polymer. For instance, the polymer can be a polystyrene, a latex, or polyalkylene, such as a polyethylene or polypropylene. The polymer can be a polybutadiene, or related polymers or derivatives of any of these polymers. The polymer can be a naturally occurring material or can contain a naturally occurring material. For instance, the naturally occurring material can be a peptide or protein, or both.

With respect to the substrate or template, the substrate or template can be a naturally occurring material or can contain a naturally occurring material. For instance, the naturally occurring material can be a plant material or tree material. For instance, the naturally occurring material can be a plant seed, a crushed nut, whole nut, plant pip, cell, coffee grind, or food products, or any combination thereof. The ceramic material can comprise a cenosphere.

The second phase or coating, or shell can coat the template or substrate. The second phase or template can infiltrate the template or substrate. Further, or in the alternative, the second phase or shell or coating can react with the substrate or template, or a portion thereof.

The second phase, coating, or shell, can comprise one or more polymers such as a thermoplastic or thermoset polymer(s). Examples include, but are not limited to, an oxide, polyolefin, polymethacrylate, and the like. The coating, shell, or second phase can optionally be reinforced by nanoparticles. The nanoparticle material can be any type of material capable of acting as a reinforcement material. Examples include, but are not limited to, ceramics, oxides, and the like. Specific examples include, but are not limited to, alumoxane. The alumoxane can optionally contain one or more chemical functional groups that are on the alumoxane. These chemical functional groups can permit, facilitate, or otherwise permit reaction with a polymer that also forms the coating or shell, or the polymer that may be present in the template or substrate. Examples of substituents that may be on the nanoparticles, such as the alumoxane, include, but are not limited to, hydroxides, amines, carboxylates, olefins, and/or other reactive groups, such as alkyl groups, aromatic groups, and the like.

The coating or shell or second phase can be or contain a ceramic material(s), such as an oxide(s). Specific examples include, but are not limited to, an oxide(s) of aluminum. The ceramic can be an aluminate or alumina. For instance, the aluminate can be an aluminate of calcium, yttrium, titanium, lanthanum, barium, silicon, or any combination thereof, or can contain other elements. The material forming the coating or shell can be initially in the form of a nanoparticle such as an alumoxane. The alumoxane can be acetate, methoxyacetate, methoxyethoxyacetate, methoxyethoxyethoxyacetate, lysine, stearate, or any combination thereof.

In one or more embodiments of the present invention, the proppant can be suspended in a suitable gas, foam, energized fluid, or liquid phase. The carrier material, such as a liquid phase is generally one that permits transport to a location for use, such as a well site or subterranean formation. For instance, the subterranean formation can be one where proppants are used to improve or contribute to the flow of hydrocarbons, natural gas, or other raw materials out of the subterranean formation. In another embodiment of the present invention, the present invention relates to a well site or subterranean formation containing one or more proppants of the present invention.

In one embodiment of the present invention, the proppant which preferably has controlled buoyancy and/or crush strength has a naturally occurring substrate or template with an organic polymer or resin coating on the template or substrate and wherein the organic polymer or resin coating contains nanoparticles, preferably for reinforcement purposes. As specific examples, but non-limiting examples, the naturally occurring substrate can be a crushed nut, cell, plant seed, coffee grind, plant tip, or food product. The organic polymer or resin coating, for instance, can be an epoxy resin, polyethylene, polystyrene, or polyaramide, or other thermoplastic or thermoset polymers. The nanoparticle can be an alumoxane, such as an carboxylate alumoxane or other ceramic material. The alumoxane can have one or more chemical functional groups that are capable of reacting with the organic polymer or resin coating. The functional groups can optionally allow the ceramic materials, such as alumoxane, to be miscible with the polymer or resin coating. The crush strength of this proppant can be as described earlier. The proppant can have a diameter as described earlier or can be a diameter in the size range of from about 25 to about 2000 microns. Other diameter size ranges are possible.

In the present invention, the template or substrate can be a ceramic material with an organic polymer or resin coating. The ceramic substrate can be a porous particle, substantially non-porous particle, or a non-porous particle. The ceramic template or substrate can be spherical. The ceramic substrate can be a hollow particle. For instance, the ceramic substrate can be a cenosphere. The organic polymer or resin coating can be as described above. The crush strength can be the same as described above. The diameter can be the same as described earlier. Optionally, the proppant can have nanoparticles for reinforcement value or other reasons. The nanoparticle can be in the polymer or resin coating. The nanoparticle can be the same as described earlier.

In another embodiment, the proppant can have a substrate or template containing or made from one or more ceramic material(s). A linker group can be located on the template or substrate. A shell or coating containing a polymer containing a resin coating can be located around this template or substrate having the linker group. More than one type of linker group can be used. The linker group, in at least one embodiment, permits bonding between the substrate or template and the coating. The linker group can be a coupling agent. The coupling agent can be of the type used with metal oxides.

In another embodiment, the proppant can have a substrate or template that comprises a ceramic material and further has a coating or shell that comprises a ceramic material that can be the same or different from the template material. The template or substrate and the shell or coating can have the same characteristics and parameters as described above for the other embodiments, such as shape, crush strength, buoyancy, and the like. Preferably, the ceramic substrate or template is a cenosphere and the ceramic coating or shell is an oxide, such as an oxide of aluminum or aluminate, a silicate, or an aluminosilicate. Other examples include, but are not limited to, shells that contain silicon, yttrium, magnesium, titanium, calcium, or any combinations thereof.

The proppants of the present invention can be made a number of ways. For instance, the substrate material can be suspended in a suitable solvent and then the material forming the shell or coating can be added to the solvent containing the suspended substrate material. Optionally, nanoparticles can be added. The coating material, such as the polymer or resin, as well as the nanoparticle(s) present as a mixture can then coat the substrate material. Afterwards, the coated particle is dried using conventional drying techniques such as an oven or the like. The optional presence of nanoparticles can optional react with the coating material, such as the polymer or resin. Furthermore, if nanoparticles are used, the nanoparticles can be added separately or can be pre-mixed with the coating components, such as the resin or polymer, prior to being introduced to the suspension of substrate material. The solvent that is used to suspend the substrate material can be part of or present with the polymer or resin coating materials.

Furthermore, the coating materials can optionally cross link during the coating process to perform a cross-linked coating on the substrate or template.

As another option, if a linkage molecule or material is used, the linkage molecule can be reacted with the substrate or template prior to being suspended in a solvent, or after the substrate material is suspended in a solvent. The linkage molecule optionally reacts with the substrate or template material and optionally reacts with the coating or shell material such as the resin or polymer. Again, nanoparticles can be added at any point of this process.

In another method of making one or more types of proppants of the present invention, a template or substrate material can be coated, such as with a precursor solution such as a ceramic containing precursor solution. The coated template material can then be dried and subsequently heated to a temperature to form a densified shell, for instance, having desirable porosity or hardness, or both. Preferably, the material is in the shape of a sphere. In this embodiment, the precursor solution preferably comprises nanoparticles such as ceramic nanoparticles. For instance, ceramic particles can be alumoxane. The precursor solution can be in the form of a sol-gel. For instance, the sol-gel can contain aluminum as well as other elements. The template or substrate can be a hollow particle and/or can be spherical in shape. The coating that coats the ceramic template can optionally react with the substrate, for instance, during the heating step.

The substrate or template, preferably prior to the optional second phase or optional coating or optional shell being present, can be treated in one or more ways to remove or diminish flaws on the surface of the substrate or template. These flaws may be convex or concave in nature or both. This can be especially beneficial when the template or substrate is an inorganic material. The removal or diminishing of these flaws, especially strength-limiting flaws, can permit the second phase or coating or shell to provide more enhanced strengthening of the substrate or template and the overall proppant. The flaws can include, but are not limited to, peaks, protuberances, ridges, craters, and other flaws which can include surface undulations, which are significantly different from the overall surface texture or surface smoothness of the substrate or template. In one or more embodiments, a flaw in a material system can be considered as anything which negatively impacts the apparent strength of a material system. Flaws can be physical and/or chemical in nature. Physical flaws may include such things as protuberances, bumps, scratches, grooves, pores, pits, dislocations, and/or defects in the crystal structure of the material. Chemical flaws may include phases that prevent solid state bonding, e.g. grain boundary phases, modification of the crystal structure through atomic substitution, and the like. By removing or diminishing these flaws in the surface of the substrate or template, the sharp protuberances or peaks or ridges can be removed or diminished, and a surface can be created that is "smoother and more spherical" which can permit the second phase or coating or shell to be more effective in providing strength to the overall proppant. There are one or more ways to quantitatively show the removal or diminishing of flaws on the surface of the substrate or template. For instance, an aspect ratio (AR) test can be used and/or the radius of curvature (RC) can be compared.

In the aspect ratio test, representative micrographs are taken of a number of spheres (at least 40). For purposes of the test, 40 particles are studied and the results are averaged together. The size of the protuberances, bumps, etc (also called artifacts) on the surface of the spheres are measured. Two measurements of each artifact are taken. The first measurement, $x_1$ being taken radially from the base of the artifact to the tip and the second measurement, $x_2$ taken at the full width at half maximum point (FWHM) of the artifact in a perpendicular direction to the first, as shown in FIG. 12.

The aspect ratio, AR is calculated by dividing the first measurement by the second measurement (i.e. $x_1/x_2$) to obtain an aspect ratio for the artifact. As the aspect ratio approaches unity, the morphology of the artifact becomes spherical. The effectiveness of the treatment of the templates can be determined by the reduction in the aspect ratio of the artifacts on the surface.

For purposes of the present invention, the AR can be 5 or less, such as from 0.1 to 5, or from 0.2 to 5, or from 0.5 to 5, or from 0.1 to 4, or from 0.1 to 3, or from 0.1 to 2, or from 0.8 to 1, or from 0.1 to 1.8, or from 0.1 to 1.5, or from 0.5 to 1.3, or from 0.7 to 1.2 and other ranges.

In the radius of curvature (RC) test, representative micrographs (at least 40) are taken. Again, for purposes of the test, 40 particles are studied and the results are averaged together. The length of the curved surface over an angular range of 180° (π radians) of the artifact is measured, denoted by s in FIG. 13. For purposes of the RC test, the middle of the peak or flaw is identified and then 10% on each side of the peak tip or flaw is determined and the length of this curve is measured. The % is based on the total distance from the peak or middle of the flaw to the template surface. From the value of the surface length, the radius of the curvature, r can be determined from the following expression:

$$r=s/\pi$$

The RC can typically range from 0.5 μm to 100 μm, with the upper limit of the radius of curvature being the radius of the template.

Also, when the flaws or artifacts are removed or reduced, the overall surface area (m$^2$/g) of the template can be reduced, such as a reduction in surface area of 1% to 10% or more compared to the template prior to surface treatment.

As some specific examples, templates were measured before and after surface treatment with respect to each test, AR and RC and using one or more of the surface treatments achieved a reduction of flaws or artifacts.

Test #1
Pre-Treatment of Template
$x_1$=10 μm
$x_2$=1 μm
AR=10/1=10
Post-Treatment of Template
$x_1$=4 μm
$x_2$=2 μm
AR=4/2=2
Test #2
Pre-Treatment of Template
s=5 μm
r=5/π≈1.6 μm
Post-Treatment of Template
s=13 μm
r=13/π≈4.1 μm The treatments to remove or diminish flaws on the substrate or template can include one or more chemical treatments, one or more mechanical treatments, and/or one or more thermal treatments, and/or spark discharge treatment, or any combination of treatments.

For example, the chemical treatment can include the use of any chemical (e.g., compound) in the form of a solid, gas, or liquid which will dissolve or otherwise react with one or more parts of the surface of the substrate or template to remove or reduce the flaws described above. The chemical treatment of the template or substrate may include preferential dissolution of one or more species contained in and/or on the template structure, for example the preferential dissolution of silica from the template material to reduce the overall silica content (e.g., reduce from 1% to 99% or from 10% to 90%, or from 20% to 70% be weight of the one or more species as originally present on the surface). Examples of such chemicals include, but are not limited to, sodium hydroxide, potassium hydroxide, calcium carbonate, calcium hydroxide, acids, such as phosphoric acid, orthophosphoric acid, nitric acid, hydrofluoric acid, and the like. The chemical treatment of the templates can occur for any time, such as various reaction times, such as from 1 minute to 750 minutes, or from 5 minutes to 500 minutes, or any other time ranges within these ranges or outside of these ranges. Chemical treatment can occur in any reaction container or vessel, such as an agitated tank containing the reagent(s). The amount of the reagent or chemical used for treatment can vary depending upon the amount of substrate or template present and the number of surface flaws being reduced or removed. As an example, the amount of the reagent or chemical can be from about 10 wt % to about 70 wt %, such as from about 10 wt % to about 40 wt %. After treatment, the reagent or chemical can be removed using standard techniques, such as a filter, and also using standard washing techniques, such as spraying with water. In addition to the reduction of silica, the method (or other methods described herein) may also be used to reduce other contaminant phases present in the template system, for example iron oxides, free carbon, calcium oxides, sodium oxides, and/or various other contaminant phases that are formed during synthesis of the template system.

The treatment, such as the chemical treatment, may also be to activate, passivate, and/or alter the physical properties of the template surface, such as inducing or improving the hydrophyllic, hydrophobic or hydroneutrality of the surface. Examples include the use of chemical species that induce crystallization of the free amorphous or non-crystalline silica of the template. For example, the use of titanium oxide based treatments can induce the crystallization of the silica at reduced temperatures, and thus reduce the silica's propensity to infiltrate and reduce grain boundary strengths.

As another example, mechanical treatment(s) can be used, as indicated, to remove or reduce flaws on the substrate or template. The mechanical methods can include, but are not limited to, tumbling, tumbling in the presence of abrasive material, impingement, such as high-speed elastic collisions (impingement) with rigid surfaces, and the like. For example, tumbling of the substrate or templates alone can result in the fracture and consequent elimination of surface flaws. Tumbling of the substrates or templates in the presence of abrasive material can result in the gradual erosion of the surface flaws. Examples of abrasive material or media include, but are not limited to, metal oxides, carbides, and the like. Specific examples include, but are not limited to, aluminum oxide, silicon carbide, zirconium oxide, cerium oxide, iron oxide, or any combination thereof. Impingement can include high-speed impingement, for instance, on rigid surfaces, which can result in impact fracture and, therefore, the removal or reducing of the surface flaws. The amount of abrasive material used can be from about 5 wt % to about 50 wt %, such as from about 10 wt % to about 30 wt %. The abrasive media can have a size of from 1 µm to 500 µm and more preferably from 10 µm to 100 µm. The abrasive media, after being used, can be separated through standard separation techniques, such as, but not limited to, screening/sieving, sedimentation, and flotation. The high-speed impingement can occur at speeds of from 5 $ms^{-1}$ to 100 $ms^{-1}$, such as 10 $ms^{-1}$ to 30 $ms^{-1}$, and can be achieved by feeding the substrate or templates into a vortex stream or other stream which can yield particle-to-particle and/or particle-to-wall interactions sufficient to result in the removal or reduction of one or more surface flaws as explained above. The tumbling of the substrate or template can be achieved in standard equipment used for tumbling, such as a ball mill or other closed vessel which rotates about its longitudal axis.

With respect to a thermal treatment to remove or reduce surface flaws on the substrate or template, various devices and methods can be used which provide sufficient temperature to cause the reduction or removal of one or more surface flaws. These devices and/or methods include, but are not limited to, static bed furnaces, dynamic bed furnaces (e.g., rotating tube furnaces), fluidized bed furnaces, direct injection into high temperature flames (for instance, oxidizing flames), use of a gas flame contained within a combustion tube mounted vertically and/or injection into a high temperature plasma flame. The residence time for this thermal treatment can be any time sufficient to reduce or remove surface flaws, such as from 100 milliseconds to 200 minutes, and the residence time generally is lower for the direct injection into oxidizing flame or plasma flame techniques. The temperature achieved during thermal treatment can be any temperature sufficient to remove or reduce surface flaws, such as a temperature of 600° C. to 1,000° C., or greater than 1,000° C., such as from 1,000° C. to 1,500° C. or even higher, such as from 1,500° C. to 5,000° C. or higher. Generally, the temperature range of 1,500° C. or higher is more suitable for the flame injection method and the temperature of 5,000° C. or higher is more obtainable for plasma flame injection methods. During the thermal treatment, pressure can also be used to control the template structure or the physical properties of the template. For instance, pressures may be used from less than 0.1 atm to 10 atm or greater, such as from 1 atm to 5 atm. When the localized pressure is reduced to values below that of ambient pressure, this can lead to the expansion of the template and consequently a reduction in the density of the template. When the localized pressure is increased above ambient pressure, this can result in the contraction of the template to smaller overall diameters and hence an increase in the density of the template. Thus, this technique provides the ability to "dial in" or control certain densities of the proppant material. Also, the reduction or increase in pressure can improve the morphology of the template, especially when the template is held or is very near the glass transition temperature of the template material. The change in localized pressure can be achieved through the use of various pressure control devices and techniques, such as a sealed ceramic tube surrounded by heating elements and containing the template material, wherein the ceramic tube is connected to either a pressure source or sink. Pressurizing fluid can be used to achieve the desired localized pressure, such as air, nitrogen, inert gases, such as argon, or any gas.

The thermal treatment has the ability to combust "free carbon" particulates and/or other impurities from the template surface. Further, the thermal treatment has the ability to anneal the template surface to reduce potentially harmful strain fields. The thermal treatment has the ability to preferentially melt or otherwise remove or reduce the surface flaws, especially the "sharp" protuberances on the surface of the template due to the high radius of curvature.

During thermal treatment, it is an option to include an active phase in order to react with potentially harmful phases in the template material, such as amorphous silica. The addition of active phase material can include, but is not limited to, boehmite, alumina, spinel, alumnosilicate clays (e.g., kaolin, montmorillonite, bentonite, and the like), calcium carbonate, calcium oxide, magnesium oxide, magnesium carbonate, cordierite, spinel, spodumene, steatite, a silicate, a substituted alumino silicate clay or any combination thereof (e.g. kyanite) and the like. Thermal treatment may also be carried out in alternate atmospheres, other than that of air to induce the formation of new phases, for example thermal treatment in a nitriding atmosphere to form the nitrides, or thermal treatment in a carburizing atmosphere to form the carbides. Examples of such atmospheres include carbon monoxide, nitrogen, nitrogen oxide, nitrogen dioxide, dinitrogen pentoxide, anhydrous ammonia, and the like.

The thermal treatment of the template or substrate may include such processes as annealing, quenching, and/or tempering, or a combination thereof. The thermal treatment may also include the pyrolysis or combustion of volatile phases contained in the structure of the template or substrate material. The thermal treatment of the template or substrate material may be conducted using either a static or a dynamic system. The thermal and chemical treatments may be combined in any fashion, such as into a single process to achieve a multiplicity of results, for example the tumbling action afforded by a rotating hearth furnace may be utilized to achieve a chemical reaction between the template and an active phase as well as provide an overall improvement in the morphology of the template material.

With respect to the use of a gas flame contained within a combustion tube mounted vertically, the template can be introduced above the flame via feed tubes located on the periphery of the combustion tube and under the influence of gravity pass into the hot zone above the flame. Fluidization of the templates via the flame induced updraft and turbulence causes improved spheronization of the templates and reduction of flaws on the surfaces of the templates. The treated templates may then be removed from the combustion tube via a negative pressure applied to the top section of the combustion tube or via gravity at the bottom of the combustion tube in the annular space around the burner or some other manner. This method may also be used to sinter the ceramic shell of the proppant after coating. The furnaces that are used for the expansion of perlite ore, can be used for this embodiment.

In one example, thermal treatment of templates at a temperature of 700° C. for 120 minutes prior to coating has provided a strength increase of the proppant on the order of 1,000 psi, compared to the same proppant not being thermally treatment prior to receiving coat or shell.

Another treatment of the template can be achieved through a spark discharge treatment, wherein the template or substrate material can be suspended in a fluidizing air stream or a dielectric fluid, such as in a conductive vessel which is electrically grounded. The surfaces of each template can be electrically charged to a high enough potential difference with respect to the ground to induce a corona-type discharge. This corona discharge occurs when the potential difference is high enough and initiates from the template surface at the areas of lowest radius of curvature to the walls of the vessel. This results in localized extreme heating of these areas leading to melting and evaporation at that point, thus removing a peak, protuberance, or ridge, or surface flaws described above. The charge may be applied to the templates in any fashion.

The charge may be applied to the templates by way of a van de Graff generator, Tesla coil, or electron beam impingement. Radio frequency (RF), or induction coupling can be used to induce eddy currents in the surface regions of the templates and thus generate substantial surface charge on the templates. As indicated, the benefit of such a method would be to remove the "sharp" protuberances that have a negative effect on the mechanical properties of the proppant system.

The properties of the template or substrate may be modified by way of pressure and/or temperature effects. A variation in pressure with the application of thermal energy maybe used to alter the specific gravity of the template material.

In another embodiment of the present invention, the proppant can be obtained by suspending a substrate, such as a ceramic substrate in a suitable solvent such as water or other aqueous solutions. The ceramic precursor which coats the template or substrate can be added. The ceramic precursor then coats the substrate or template and then the coated particle such as the coated ceramic particle can then be dried and subjected to heating to a temperature to form a densified material having desirable porosity and/or hardness. The types of materials, characteristics, and parameters of the starting materials and finished coated particles as described above apply equally here in their entirety.

In a more preferred embodiment, a solid or hollow alumina, aluminosilicate, or metal aluminate ceramic sphere is obtained by coating a spherical template with an alumoxane solution or metal doped alumoxane and then subsequent application of heat to convert this sphere to alumina, aluminosilicate, or a metal aluminate. The alumoxane can comprise acetate-alumoxane. The spherical template preferably has a diameter in the size range of from about 25 to 2000 microns. The solid or hollow spherical templates can be ceramic or can be polystyrene or other polymeric materials. Even more preferably, the templates are cenospheres or synthetically produced microspheres such as those produced from a blowing process or a drop tower process. In one embodiment, the solid or hollow spherical templates remain in tact during the conversion process to alumina, aluminosilicate, or metal aluminate. In one or more embodiments, the solid or hollow spherical templates pyrolize, decompose, or are otherwise removed during the conversion process to alumina, aluminosilicate, or metal aluminate. The wall thickness can be of any desirable thickness. For instance, the wall thickness can be in a range of from about 25 to about 2000 microns. As an option, the surface of the formed alumina, aluminosilicate, or metal aluminate sphere can be functionalized with a chemical moiety or chemical material, such as an organic ligand, like a surfactant, and can provide surface wetting properties which can assist in allowing additional ceramic precursor, which is the same or different from the earlier coating, to be applied. Then, additional heat conversion can occur to form the second or multiple coating or shell on the already coated particle.

In another embodiment, the solid or spherical templates can be first coated with a resin or polymer and cured and then an alumoxane precursor or other similar type of precursor can be subsequently coated onto the particle followed by heat conversion to form a sphere comprised of an outer alumina, aluminosilicate, or metal aluminate shell or similar type of metal containing coating. This resin coating or polymer coating can pyrolize, decompose, or otherwise be removed during the conversion process. The coating used to coat the particles such as a solution of alumoxane nanoparticles can contain, for instance, from about 0.5 to about 20% alumoxane by weight of the coating solution. Other weights are possible and permissible. The coating of the particles can occur such as by dipped coating, pan, Muller mixing, or fluid bed coating.

With respect to the polymers or resins that can be used to coat the particles, these polymers include, but are not limited to, epoxies, polyurethanes, phenols, ureas, melamine formaldehyde, furans, synthetic rubber, natural rubber, polyester resins, and the like.

The proppants of the present invention while preferably used to prop open subterranean formation fractions, can be used in other technologies, such as an additive for cement or an additive for polymers, or other materials that harden, or would benefit. The proppants of the present invention can also be used as encapsulated delivery systems for drugs, chemicals, and the like.

In another method of making the proppants of the present invention, a colloidal suspension containing polymeric beads can be suspended in any solution such as an aqueous solution of a nanostructured coating material. The beads can then be covered with a nanostructured coated material to create a ceramic. The beads can then be dried and subsequently heated to a first temperature which is sufficient to convert the nanostructured coating material to a ceramic coating, such as a densified coating. The temperature is preferably not sufficient to decompose the polymeric beads. Then, the polymeric beads can be dissolved, such as in a solvent, and extracted from the ceramic coating. Afterwards, the material can then be heated to a second temperature to form a hollow ceramic sphere of the desired porosity and/or strength. The nanostructure coating material can be as described above earlier, such as titania, alumina, chromium, molybdenum, yttrium, zirconium, or the like, or any combination thereof. The nanostructure coating material dispersed in the solution can be achieved using a sol-gel method, controlled flow cavitation, PVD-CVD, flame, plasma, high energy ball milling, or mechano-made milling processes. The nanostructure coating media can be a solution, such as alcohol, liquid hydrocarbon, or combinations thereof.

In the present invention, the strength of the particle can be controlled by varying the wall thickness, the evenness of the wall thickness, the type of nanoparticles used, or any combination thereof. Further, the size of the particle can be controlled by varying the type, size, or any combination thereof of the template used. The template can have a size of from about 1 nm to about 3000 microns.

In the present invention, in one or more embodiments, the template material can be selected from wax, surfactant-derived liquid beads, seeds, shells, nuts, grain husks, grains, soils, powdered, ground, or crushed agglomerates of wood products, powdered, ground, or crushed agglomerates of ceramic material, powdered, ground, crushed, or rolled organics, silicas (glass beads), whey, cellulose, fly ash, animal eggs, rust, soap, bacteria, algae, and rubber.

More particular examples or seeds are rape seed, a poppy seed, a mustard seed, a kohl rabbi seed, a pea seed, a pepper seed, a pumpkin seed, an oil seed, a watermelon seed, an apple seed, a banana seed, an orange seed, a tomato seed, a pear seed, a corn seed.

More particular examples of shells are walnut shell, peanut shell, pasticcio shell, or an acorn shell. More specific examples of grain husks include, corn, maize, mailo, capher, or sorgum.

Another way to coat a particle in the present invention, can be with a fluidized bed, spray drying, rolling, casting, thermolysis, and the like.

Examples of powdered agglomerates of organic material include powdered milk, animal waste, unprocessed polymeric resins, animal hair, plant material, and the like. Examples of animal eggs include, but are not limited to, fish, chicken, snake, lizard, bird eggs, and the like. Examples of cellulose templates include, but are not limited to algae, flower, plankton, ground cellulose such as saw dust, hay, or other grasses, and the like. In general, the material coated can have a size of from about 100 to about 10,000 microns.

While the various embodiments of the present invention have been described in considerable detail, the following provides additional details regarding various embodiments of the present invention. It is noted that the above disclosure of the proppants, methods of making, and uses applies equally to the following disclosure of various embodiments of the present invention. Equally so, the following disclosure also applies to the above embodiments of the present invention. These disclosures are not exclusive of each other.

In one or more embodiments of the present invention, the present invention relates to a proppant comprising a template material and a shell on the template material. The shell can comprise a ceramic material or oxide thereof or a metal oxide. The shell can contain one or more types of ceramic material, or oxides thereof, or metal oxides, or any combinations thereof. The metal oxide can be a mixed metal oxide or a combination of metal oxides.

The template material can be porous, non-porous, or substantially non-porous. For purposes of the present invention, a substantially non-porous material is a material that is preferably at least 80 vol % non-porous in its entirety, more preferably, at least 90 vol % non-porous. The template material can be a hollow sphere or it can be a closed foam network, and/or can be a non-composite material. A non-composite material, for purposes of the present invention is a material that is not a collection of particles which are bound together by some binder or other adhesive mechanism. The template material of the present invention can be a single particle. In other words, the present invention can relate to a plurality of proppants, wherein each proppant can consists of a single particle. In one or more embodiments of the present invention, the template material can be a cenosphere or a synthetic microsphere such as one produced from a blowing process or a drop tower process.

Though optional, the template material can have a crush strength of 5000 psi or less, 3000 psi or less, or 1000 psi or less. In the alternative, the template material can have a high crush strength such as 3000 psi or more, such as from about 5000 psi to 10,000 psi. For purposes of the present invention, crush strength is determined according to API Practice 60 ($2^{nd}$ Ed. December 1995). In one or more embodiments of the present invention, the template material having a low crush strength can be used to provide a means for a coating to be applied in order to form a shell wherein the shell can contribute a majority, if not a high majority, of the crush strength of the overall proppant.

The template material can optionally have voids and these voids can be strictly on the surface of the template material or strictly in the interior of the template material or in both locations. As describe earlier, the shell can be sintered which can form a densified material which preferably has high crush strength. For instance, the shell can comprise sintered nanoparticles. These nanoparticles can be quite small, such as on the order of 0.1 nm up to 150 nm or higher with respect to primary particle size. The nanoparticles can comprise primary particles alone, agglomerates alone, or a combination of primary particles and agglomerates. For instance, the primary particles can have an average particle size of from about 1 nm to about 150 nm and the agglomerates can have an average particle size of from about 10 nm to about 350 nm. The weight ratio of primary particles to agglomerates can be 1:9 to 9:1 or any ratio in between. Other particle size ranges above and below these ranges can be used for purposes of the present invention. The shell of the proppant can have an average grain size of about 10 microns or less. The shell of the present invention can have an average grain size of 1 micron or less. The shell of the proppant of the present invention can have an average grain size of from 0.1 micron to 0.5 micron. In any of these embodiments, the maximum grain size can be 1 micron. It is to be understood that maximum size refers to the highest grain size existing with respect to measured grain sizes. With respect to any of these embodiments, as an option, at least 90% of all grain sizes can be within the range of 0.1 to 0.6 micron.

With respect to the shell, the shell can further comprise additional components used to contribute one or more properties to the shell or proppant. For instance, the shell can further comprise at least one sintering aid, glassy phase formation agent, grain growth inhibitor, ceramic strengthening agent, crystallization control agent, and/or phase formation control agent, or any combination thereof. It is to be understood that more than one of any one of these components can be present and any combination can be present. For instance, two or more sintering aids can be present, and so on. There is no limit to the combination of various agents or the number of different agents used. Generally, one or more of these additional agents or aids can include the presence of yttrium, zirconium, iron, magnesium, aluminum, alumina, bismuth, lanthanum, silicon, calcium, cerium, one or more silicates, one or more borates, or one or more oxides thereof, or any combination thereof. These particular aids or agents are known to those skilled in the art. For instance, a sintering aid will assist in permitting uniform and consistent sintering of the ceramic material or oxide. A glassy phase formation agent, such as a silicate, generally enhances sintering by forming a viscous liquid phase upon heating in the sintering process. A grain growth inhibitor will assist in controlling the overall size of the grain. A ceramic strengthening agent will provide the ability to strengthen the overall crush strength of the shell. A crystallization control agent will assist in achieving the desired crystalline phase of the shell upon heat treatment such as sintering or calcining. For instance, a crystallization control agent can assist in ensuring that a desirable phase is formed such as an alpha aluminum oxide. A phase formation control agent is the same or similar to a crystallization control agent, but can also include assisting in achieving one or more amorphous phases (in addition to crystalline phases), or combinations thereof. The various aids and/or agents can be present in any amount effective to achieve the purposes described above. For instance, the aid and/or agents can be present in an amount of from about 0.1% to about 5% by weight of the overall weight of the shell. The shell(s) can comprise one or more crystalline phases or one or more glassy phases or combinations thereof.

In one or more embodiments, the material or composition used to form the shell or coating can include reinforcing particulates. The particulates can be used for strength enhancement or density control (reduce or increase density), or both. The particulates can be included in the composition which forms the shell and can be present in any amount such as from about 5 vol % to 50 vol % or more, for example, from 5 vol % to 20 vol % of the overall shell. The reinforcing particulates can be ceramic material (e.g., oxide or non-oxide), metallic material (e.g., metal elements or alloys), organic material, or mineral-based material or any combination thereof. Ceramic particulates include, but are not limited to, alumina, zirconia, stabilized zirconia, mullite, zirconia toughened alumina, spinel, aluminosilicates (e.g., mullite, cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, and the like, or any combination thereof. Metallic particulates include, but are not limited to, iron, nickel, chromium, silicon, aluminum, copper, cobalt, beryllium, tungsten, molybdenum, titanium, magnesium, silver, as well as alloys of metals, and the like, or any combination thereof. Metallic particulates may also include the family of intermetallic materials, such as the iron aluminides, nickel aluminides, titanium aluminides, and the like. Organic particulates include, but are not limited to, carbon-based structures such as nanotubes, nanorods, nanowires, nanospheres, microspheres, whiskers of oxide, fullerenes, carbon fibers, nomex fibers, and the like, or combinations thereof. Mineral-based particulates include, but are not limited to, such materials as kyanite, mica, quartz, sapphire, corundum, including the range of aluminosilicate minerals that display high hardness and strength. Single crystal materials can be used. Resin material (e.g., organic resin(s)) with or without reinforcing particulates can be used as reinforcing material.

The morphology of the reinforcing particulates can have any aspect ratio, such as aspect ratios ranging from 1 to 1,000 or greater. The reinforcing particulates can have any shape or size. The reinforcing particulates can be hollow, solid, or have voids. The diameter sizes can be from about 10 nm to about 10 microns, such as from 1 to 2 microns. The same template modification to the surface can be done to the reinforcing surface. The particulates may be equiaxed, elongated grains, flakes, whiskers, wires, rods, nanowires, nanorods, platelets, spheres or any combination of them. The elastic and shear moduli of the particulates may be similar, higher, or lower in value than that of the ceramic matrix or other shell material. The thermal expansion coefficient of the particulates may match that of the shell or may be higher or lower. The mean particle size of the particulates may range from being equivalent to the particle size of the ceramic matrix (or other shell material) to significantly larger. Typical mean particle sizes of the reinforcement phase may range from 0.1 μm to 5 μm, with a preferential range from 0.2 μm to 1.0 μm. Other sizes can be used. The presence of particulates within the ceramic matrix (or other shell material) generate beneficial residual strain fields, allow for crack tip blunting, provide a mechanism for crack trajectory deviation, provide a mechanism for crack tip capture, and/or provide a mechanism for crack face bridging through the generation of ligands across cracks.

As an example, the incorporation of 20 vol % of 0.3 μm yttria stabilized zirconia in a cordierite matrix ceramic shell has shown an improvement in the uniaxial crush strength by approximately 1200 PSI. Similar improvements in the strength of the cordierite matrix through the incorporation of 20 vol % alumina particles with a mean particle size of 0.2 μm has been observed.

The shell or coating can be obtained or made from (or include) a variety of materials including waste or recycled materials. Examples of waste materials include spent FCC catalysts, spent deNOx catalysts, spent automotive catalysts, waste flyash and waste cenospheres derived from coal fired power stations and boilers, or ceramic-based catalyst materials. These spent catalysts can be generally ceramic based systems and can include such materials as alumina, mullite, and/or cordierite, with or without active phases present. The active phases may include platinum, rhodium, cerium, cerium oxide, titanium oxide, tungsten, palladium, and the like. The presence of the noble metals can have a beneficial effect as a reinforcing phase for the ceramic matrix. Another alternative coating material may be the use of silica flour (e.g., with a particle size of from 0.2 μm to 4 μm) that has been derived from the powder milling of silica sand. In addition to silica sand, zircon sand may also be used as a coating material for the template.

The template material can be a synthetic ceramic microsphere such as one produced from a blowing process or a drop tower process or can be a cenosphere such as a hollow cenosphere. The template material can be a fly ash particle or particles and can be a particle or particles derived from fly ash. In more general terms, the template material can be a hollow spherical particle. The template material can be a precipitator fly ash. The template material can be a blown hollow sphere. In other words, the hollow sphere can be naturally occurring or synthetic or can be a combination.

In one or more embodiments of the present invention, the shell can be substantially non-porous. For instance, substantially non-porous means that at least 90% of the surface of the shell is non-porous.

The shell can be substantially uniform in thickness around the entire outer surface of the template material. For instance, the thickness of the shell can be substantially uniform in thickness by not varying in thickness by more than 20% or more preferably by not varying more than 10% in overall thickness around the entire circumference of the shell. The shell can be non-continuous or continuous. Continuous, for purposes of the present invention means that the shell entirely encapsulates or covers the template material within the shell. Preferably, the shell fully encapsulates the template material.

With respect to the shell and the interaction of the shell and the template material, the shell can essentially be a physical coating on the template material and not react with the template material. Alternatively, the shell can react with one or more portions of the template material such as by chemically bonding to the template material. This chemical bonding may be ionic or covalent or both. As an alternative, the shell or portion thereof can diffuse, infiltrate, and/or impregnate at least a portion of the template material. As another alternative, the shell or at least a portion thereof can adsorb or absorb onto the template material or a portion thereof.

With respect to the outer surface of the template material and the shell, the shell can be in direct contact with the outer surface of the template material. Alternatively, one or more intermediate layers can be present in between the outer surface of the template material and the inner surface of the shell. The intermediate layer or layers can be of any material, such as a polymer, resin, ceramic material, oxide material, or the like.

The proppants of the present application can, for instance, have a specific gravity of from about 0.6 glee to about 2.5 g/cc. The specific gravity can be from abut 1.0 g/cc to about 1.3 g/cc or can be from abut 0.9 g/cc to about 1.5 g/cc, or can be from 1.0 g/cc to 2.5 g/cc, or from 1.0 g/cc to 2.4 g/cc, or from 1.0 g/cc to 2.3 g/cc, or from 1.0 g/cc to 2.2 g/cc, or from 1.0 g/cc to 2.1 g/cc, or 1.0 g/cc to 2.0 g/cc. Other specific gravities above and below these ranges can be obtained.

The proppant can have any of the crush strengths mentioned above, such as 3000 psi or greater, 5000 psi to 10,000 psi, 10,000 psi to 15,000 psi, as well as crush strengths above and below these ranges.

The shell of the proppant can have a wall thickness of any amount, such as 5 microns to about 150 microns or about 15 microns to about 120 microns. This wall thickness can be the combined wall thickness for two or more shell coatings forming the shell or can be the wall thickness for one shell coating.

As stated, the proppant can be spherical, oblong, nearly spherical, or any other shapes. For instance, the proppant can be spherical and have a Krumbein sphericity of at least about 0.5, at least 0.6 or at least 0.7, at least 0.8, or at least 0.9, and/or a roundness of at least 0.4, at least 0.5, at least 0.6, at least 0.7, or at least 0.9. The term "spherical" can refer to roundness and sphericity on the Krumbein and Sloss Chart by visually grading 10 to 20 randomly selected particles. The template, such as the template sphere, can have a Krumbein sphericity of at least about 0.3, or at least 0.5 or at least 0.6 or at least 0.8 or at least 0.9, and/or a roundness of at least about 0.1, at least about 0.3, at least about 0.5, at least about 0.7, at least about 0.8, or at least about 0.9.

In one or more embodiments of the present invention, the proppant can be a spray-coated shell. The shell(s) of the proppants can be formulated by one coating or multiple coatings. More than one shell can be present in layered constructions. The coatings can be the same or different from each other.

In one or more embodiments of the present invention, the shell can comprise at least alumina, aluminosilicate, aluminate, or silicate. For instance, the alumina, aluminate, or silicate can contain calcium, yttrium, magnesium, titanium, lanthanum, barium, and/or silicon, or any combination thereof. One or more rare earth metals or oxides thereof can be present.

Another way to form the coating or shell around the template is by a direct particle deposition from a slurry, such as an aqueous-based slurry, containing the precursor particles that form the shell or coating. A sacrificial monolayer(s) can be first applied to the surface of the template and this monolayer can have the ability to induce covalent bonding or other attachment mechanisms between the surface of the substrate and the particles in suspension that form the coating or shell. The treated template can then be immersed in an aqueous slurry containing the particles that form the coating or shell, thus resulting in particle attachment to the substrate surface through covalent bonding or other bonding mechanisms, wherein the covalent bonding can be between the functional groups of the monolayer and the particles forming the coating or shell. The coated template can then be subsequently dried and/or sintered to provide a desired shell. Generally, this technique is more useful in forming thin shells and can be used to form an intermediate shell, wherein a subsequent strength-bearing shell can be further created on top of this initial shell layer. By doing so, a highly reactive interfacial layer can be achieved between the template surface and the strength-bearing shell, which can be a strength-bearing ceramic shell. The material used to create the shell can be nano-sized particles, such as those described already herein. The sacrificial monolayer can be organic material, such as organic material that allows carboxy terminated self-assembled structures to be formed on the surface of the template. Another way to create a strength-bearing shell is through direct nucleation and deposition of the required species onto the template surface, for instance, through a precipitation-type reaction. For example, the template particles can be suspended in solution in the presence of the material or precursor material used to form the shell. Precipitation of the material used to form the shell, such as ceramic material, can be accomplished through the adjustment of the pH of the solution, adjustment of temperature, and/or pressure or a combination of any of these. Through this process, the template surface behaves as a seed to initiate spontaneous precipitation and deposition. Precursors for precipitation include: titanium tetrachloride, titanium oxychloride, titanium chloride, titanium oxysulphate, titanium sulphate, and titanium organo-metallic compounds such as titanium isopropoxide, calcium chloride, calcium hydroxide, aluminum chloride, aluminum nitrate, aluminum sulphate, and aluminum organo-metallics for example aluminum isopropoxide.

For example, the formation of a yttrium oxide-yttria stabilized zirconia composite can occur by such a method. Yttrium oxide particles of approximately 2 µm mean particle size are suspended in a yttrium chloride-zirconium oxychloride solution with a concentration of approximately $100 \text{ g·L}^{-1}$ as dissolved oxide content. The pH of the solution can be slowly raised in a controlled manner and the onset of precipitation can occur at a pH of approximately 5.5. The precipitated particles initiate on the surface of the yttrium oxide and attach themselves covalently to the surface. Further particle precipitation occurs and allows the formation of a shell of yttrium-zirconium oxyhydroxide. Subsequent washing of the solid material followed by heat treatment yields a yttrium oxide core surrounded by a yttrium oxide stabilized zirconium oxide structure.

The coating or shell can be applied to the template or substrate using a fluidized bed technique, as explained elsewhere in the present application. The shell can be created or applied to the template or substrate using an interfacial reaction mechanism between the template surface and a solution incorporating the chemical species to achieve this interfacial reaction. The shell can be created or applied to the template or substrate using a particle deposition technique, which can involve attracting and depositing particles from a slurry onto the surface of the template to form a self-assembled structure. The interfacial reaction between the solution and the template surface can lead to the precipitation of precursor materials, such as ceramic precursor materials, that decompose and densify, such as with the application of thermal energy or other energy sources. In creating the shell on the template or substrate, the surface charge of the template can be modified through the application of a functional species to the template surface which can result in the electrostatic attraction of particles, such as ceramic particles in the suspension.

The template material can be from a naturally occurring material as described earlier. The naturally occurring material can be seed, plant products, food products, and the like. Specific examples have been described earlier.

The proppants of the present invention, for instance, can be made by coating a template material with a formulation comprising a ceramic material or oxide thereof or metal oxide to form a shell around the template and then this formulation can be sintered to create the sintered shell having a densified structure. The shell preferably has a microcrystalline structure. The sintering can occur at any temperature to achieve densification of the ceramic material or oxide thereof of metal oxide such as from 700° C. to about 1,700° C. or about 800° C. to about 1,700° C. Generally, sintering occurs by ramping up to the temperature. The sintering temperature is the temperature in the oven or sintering device. As stated, the coating of the template material can be achieved by spray coating. For instance, in creating the shell, a non-alpha aluminum oxide can be coated onto a template material and then upon sintering, form an alpha-aluminum oxide coating. The formulation can be in the form of a slurry comprising the ceramic material or oxide thereof or metal oxide along with a carrier such as a liquid carrier. When spray coating, a spray coating chamber can be used such as a spray coater from Vector Corporation, Model MLF.01. The formulation can be introduced as an atomized spray and the template material is suspended in air within the chamber during the coating of the template material. Ranges for key parameters for the spray coating process include: Air temperature: 40°-90° C., Airflow: 90-150 liters per minute, Nozzle Air Setting: 10-25 psi. After coating, the sintering can occur.

With respect to the sintering, it is preferred that the sintering is sufficient to densify the ceramic material or oxide thereof or metal oxide so as to form a continuous coating. The formulation can comprise at least one acid, surfactant, suspension aid, sintering aid, grain growth inhibitor, glassy phase formation agent, ceramic strengthening agent, crystallization control agent, and/or phase formation control agent, or any combination thereof. One or more of these agents can be present. Again, as stated above, more than one type of the same agent can be used such as more than one type of acid, more than one type of surfactant, more than one type of sintering agent, and so on. The amount of these agents can be any amount sufficient to accomplish the desired purposes such as from about 0.1% to about 5% by weight of the weight of the final shell.

As stated above, the present invention further relates to a proppant formulation comprising one or more proppants of the present invention with a carrier. The carrier can be a liquid or gas or both. The carrier can be water, brine, hydrocarbons, oil, crude oil, gel, foam, or any combination thereof. The weight ratio of carrier to proppant can be from 10,000:1 to 1:10,000 or any ratio in between, and preferably 0.001 lb proppant/gallon fluid to 10 lb proppant/gallon fluid.

In a more preferred example, the proppant can have the following characteristics:
(a) an overall diameter of from about 90 microns to about 1,600 microns;
(b) spherical;
(c) said shell is substantially non-porous;
(d) said proppant has a crush strength of about 1,000 or greater, or 3,000 psi or greater;
(e) said coating has a wall thickness of from about 15 to about 120 microns;
(f) said proppant has a specific gravity of from about 0.9 to about 1.5 g/cc; and
(g) said template material is a hollow sphere.

Preferably, in this embodiment, the template material is a cenosphere or an aluminate, or a sintered aluminum oxide. The template material preferably has a crush strength of less than 3000 psi or less than 1000 psi. The shell is preferably an alpha aluminum oxide coating.

For the proppants of the present invention, the shell can comprise Mullite, Cordierite, or both. In one embodiment of the present invention, the formulation that is applied onto the template material can be prepared by peptizing Boehmite or other ceramic or oxide materials with at least one acid (e.g., acetic acid) to form a sol-gel formulation comprising alumoxane. The formulation can be a slurry comprising alumoxane along with a carrier such as a liquid carrier. The slurry can contain one or more sintering aids, grain growth inhibitors, ceramic strengthening agents, glassy phase formation agents, crystallization control agents, and/or phase formation control agents, which can comprise yttrium, zirconium, iron, magnesium, alumina, bismuth, silicon, lanthanum, calcium, cerium, silicates, and/or borates, or oxides thereof, or any combination thereof.

As an additional embodiment, the present invention can comprise a surface that comprises a ceramic material or an oxide thereof or metal oxide wherein the surface (e.g., polycrystalline surface) has an average grain size of 1 micron or less. The average grain size can be about 0.5 micron or less. The average grain size can be from about 0.1 micron to about 0.5 micron. The surface having this desirable grain size can be part of a coating, shell, or can be the core of a proppant or can be a proppant solid particle or hollow particle. The surface can have a maximum grain size of 5 microns or less, such as 1 micron. Further, the surface can have grain sizes such that at least 90% of all grain sizes are within the range of from about 0.1 to about 0.6 micron. The proppant can have a crush strength of 3000 psi or greater or can have any of the crush strengths discussed above, such as 5000 psi or more or 10,000 psi or more, including from about 5000 psi to about 15,000 psi. The ceramic material in this proppant can further contain yttrium, zirconium, iron, magnesium, alumina, bismuth, lanthanum, silicon, calcium, cerium, silicates, and/or borates, or oxides thereof or any combination thereof. The proppants can contain one or more of sintering aid, glassy phase formation agent, grain growth inhibitor, ceramic strengthening agent, crystallization control agent, or phase formation control agent, or any combination thereof. The proppant formulation can contain the proppant along with a carrier such as a liquid carrier or a gas carrier.

With respect to this embodiment, a template material is optional. The proppant can be completely solid, partially hollow, or completely hollow, such as a hollow sphere. If a template material is present, any one of the template materials identified above or below can be used.

Various methods exist to reduce the particle size distributions of precursor ceramic powders (or other powders that comprise the shell or template). These methods include, but are not limited to, conventional comminution techniques. Examples include stirred media attrition mills, ball mills, hammer mills, impact mills, planetary balls mills, jet mills, micronising ring mills, or mechanochemical milling. Ball mills, hammer mills, jet mills and impact mills can yield a minimum mean particle size of approximately 7 µm. Stirred media attrition mills and micronising ring mills can yield a minimum mean particle size of approximately 0.2 µm. Planetary ball mills can yield a minimum mean particle size of approximately 0.1 µm. Mechanochemical milling can yield a minimum mean particle size of approximately less than 0.05 µm (50 nanometers) or less. Smaller particle sizes of the precursor ceramic powders (or other powder) can lead to a reduction in sintering temperature. Thus, the mean particle size can be from 0.01 µm to 10 µm or from 0.05 µm to 7 µm or from 1 µm to 5 µm. With respect to lower sintering temperatures, it has been observed that grain growth is reduced which can lead to an improvement in the mechanical properties of the ceramic material (or other powder). Such properties include flexural strength, compressive strength, fracture toughness, and/or elastic moduli (Young's, bulk and shear).

In all embodiments of the present invention, one or more proppants of the present invention can be used alone or in a formulation to prop open subterranean formation fractions by introducing the proppant formulation into the subterranean formation such as by pumping or other introduction means known to those skilled in the art. An example of a well completion operation using a treating fluid containing proppants or particles is gravel packing. In gravel packing operations, particles referred to in the art as gravel are carried to a subterranean producing zone in which a gravel pack is to be placed by a hydrocarbon or water carrying fluid (or other carrier source, such as a fluid, energized fluid, foam, gas, and the like). That is, the particles are suspended in the carrier fluid which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore. An example of a production stimulation treatment utilizing a treating fluid having particles suspended therein is hydraulic fracturing. That is, a treating fluid, referred to in the art as a fracturing fluid, is pumped through a well bore into a subterranean zone to be stimulated at a rate and pressure such that fractures are formed and extended into the subterranean zone. At least a portion of the fracturing fluid carries particles, referred to in the art as proppant particles into the formed fractures. The particles are deposited in the fractures and the fracturing fluid leaks off into the subterranean zone and/or is returned to the surface. The particles function to prevent the formed fractures from closing whereby conductive channels are formed through which produced fluids can flow to the well bore.

While the term proppant has been used to identify the preferred use of the materials of the present invention, it is to be understood that the materials of the present invention can be used in other applications, such as medical applications, filtration, polymeric applications, catalysts, rubber applications, filler applications, drug delivery, pharmaceutical applications, and the like.

U.S. Pat. Nos. 4,547,468; 6,632,527 B1; 4,493,875; 5,212,143; 4,777,154; 4,637,990; 4,671,909; 5,397,759; 5,225,123; 4,743,545; 4,415,512; 4,303,432; 4,303,433; 4,303,431; 4,303,730; and 4,303,736 relating to the use of proppants, conventional components, formulations, and the like can be used with the proppants of the present invention, and are incorporated in their entirety by reference herein. The processes described in AMERICAN CERAMIC SOCIETY BULLETIN, Vol. 85, No. 1, January 2006, and U.S. Pat. Nos. 6,528,446; 4,725,390; 6,197,073; 5,472,648; 5,420,086; and 5,183,493, and U.S. Patent Application Publication No. 2004/0012105 can be used herein and is incorporated in its entirety herein. The proppant can be a synthetic proppant, like a synthetic cenosphere template, with any shell.

Sol-gel routes to forming monoliths or films, such as thicker than about 1 micron, can suffer from severe cracking or warping during the drying or gel consolidation process. Low solids-weight loadings result in large volumetric shrinkage during the drying process. Furthermore, cracking can be the result of relief of differential capillary stresses across the dimensions of the gel or film as drying and shrinkage occur. Total capillary stress present in the film can be a function of particle size, and decreases as particle size increases. As a result, films or monoliths formed from larger particle sizes can have a decreased tendency to incur cracking stresses during the shrinkage and drying process.

In a peptized formulation, such as a boehmite gel formulation, a blending of boehmite particles of varying dispersed size (e.g., 90% large, aggregated crystallites and 10% small, single crystallites) results in a lower number density of pores, as well as larger size of pore in the corresponding dried gel, thereby reducing drying stress. Thus, tailoring the particle size and blend of primary particles in the sol-gel formulation can confer control over crack formation for a given drying process. The particles have varying dispersed sizes in the sol-gel stage, but examination of the microstructure of the dried gel fragments reveals that only crystallites are distinct from one another in the green packing. This shows that the small particles uniformly fill the interstices of the larger particles, resulting in a well-structured green film.

In one or more embodiments, the proppants can be unagglomerated and each proppant can have a single particulate template with a shell formed from one or more layers. Thus, in one or more embodiments, there can be a 1:1 ratio with respect to shell to template, meaning there is one shell for each template particle or sphere. Thus, the present invention relates to a plurality of proppants which comprise individual template particles or spheres that are coated individually to form individual templates having a shell around each template sphere or particle. Further, in one or more embodiments, the population of proppants is consistent prior to sintering and/or after sintering. In other words, substantially each proppant (e.g., over 90% or over 95% or from 95% to 99.9%) of the proppant population in a plurality of proppants have a continuous coating around the template to form the shell and/or the shell has a uniform thickness around the template (e.g., the shell thickness does not vary more than +/−20% in thickness, such as +/−10% or +/−5% in thickness around the entire template) and/or each proppant in the plurality of proppants is substantially flaw-free.

In one or more embodiments, the template has one or more voids in the template wherein the one or more voids amount to at least 20% void volume (or at least 30% void volume) in the template wherein the percent is based on the entire volume of the template. The void volume can be from 25% to 95%, or from 50% to 95%, or from 60% to 95% or more, or from 70% to 90%, or from 75% to 90%) or from 80% to 90%.

In one or more embodiments, there can be a center void located in the middle of the template, especially when the template is a sphere. In one or more embodiments, the template can have a center void, but also other voids located throughout the template.

In one or more embodiments, the shell of the present invention has the ability to significantly add strength to the overall proppant even when the template (by itself) has a low point crush strength, such as a crush strength of 50 psi to 1,000 psi, or from 100 psi to 500 psi, or from 100 psi to 200 psi. The shell of the present invention can raise the crush strength of the overall proppant by 50%, 100%, 200%, 300%, 400%, 500%, or more. The present invention has the ability to take surface imperfections existing in the template, which could cause a failure in the proppant, and minimize or eliminate these defects in the template surface by forming a shell around the template. Thus, the shell of the present invention not only adds strength, such as crush strength to the overall proppant, the shell of the present invention has the ability to minimize surface defects in a template, such as a template sphere.

In one or more embodiments, the template is a material that can withstand a sintering temperature of at least 700° C. for 10 minutes in air or an oxidizing atmosphere. Preferably, the material forming the template can withstand sintering at a temperature range from 800° C. to 1,700° C. However, templates which can withstand a sintering temperature (in air or an oxidizing atmosphere) of 800° C., or 900° C., or 1,000° C., or 1,200° C., or 1,400° C. for 10 minutes or other temperatures can be used.

In one or more embodiments, any template material can be formed into a suitable template sphere for purposes of the present invention by reducing the size of the starting material, such as perlite, vermiculite, pumice, or volcanic materials by grinding, such as in an attrititor mixer and the like. The grinding will reduce the size to the desirable size of the template as mentioned herein. Alternatively, the template sphere can be formed by combining smaller particles to form a composite particle.

In one or more embodiments, the proppant can have a substrate or template that comprises an inorganic material, a metal oxide, or a combination of metal oxides and/or inorganic materials. Examples include, but are not limited to, oxides of aluminum, silicon, titanium, magnesium, sodium, potassium, and the like. Alloys of these various metal oxides can also be used or be additionally present.

In one or more embodiments, the substrate or template (or any layer of the shell) can be a mineral or contain a mineral, such as containing a mineral phase. The template or substrate, in one or more embodiments, can be or contain perlite, vermiculite, pumice, or volcanic materials that optionally are expandable, such as expandable with the application of heat.

In one or more embodiments, the template or substrate (or any layer of the shell) can be a mixture of two or more metal oxides in any proportions. For example, the template or substrate can be a mixture of aluminum oxide and silicon oxide. The template or substrate can be formed into a solid sphere or a hollow sphere or a sphere having one void or multiple voids by a variety of methods. The proportions of the metal oxides, when present as a mixture, can be 1:99 to 99:1% by weight. For instance, the proportions can be 85:15% to 70:30% or 60:40% to 27:73% by weight percent. A fluxing agent(s), such as sodium oxide, calcium oxide, magnesium oxide, lithium oxide, and/or potassium oxide can be used as part of the template formation, such as in amounts up to 10 wt %.

In one or more embodiments (in addition to, as an alternative, or in any combination with other embodiments described herein), the template, the shell (or one or more layers comprising the shell), or any reinforcing material can be surface modified, such as with the addition of silicon oxide, sodium oxide, potassium oxide, calcium oxide, zirconium oxide, aluminum oxide, lithium oxide, iron oxide, cordierite, spinel, spodumene, steatite, a silicate, an alumino silicate material, an aluminum containing material, a silicon containing material, an aluminum-silicon containing material, a substituted alumino silicate clay or any combination thereof.

The template or substrate can be formed into a hollow sphere or a sphere having one or multiple voids by any method, such as by a coaxial nozzle method, with the use of a blowing agent(s), by the solidification of the sphere from a melt phase, such as achieved with cenospheres derived from coal fly ash, or the aggregation of a plurality of smaller hollow spheres to form a substantially spherical agglomerate preferably with low specific gravity.

In one or more embodiments, the template or substrate can have one void, multiple voids, a porous network of unconnected or interconnected pores or voids. The voids or pores can have substantially the same size or differing sizes. One or more of the voids or pores can be interconnected and/or the voids or pores can be closed voids or pores, meaning not interconnected with other voids or pores. The size of the voids or pores can be from about 0.05 μm to about 500 μm, such as from about 1 μm to about 300 μm. In one or more embodiments, the template or substrate can be highly porous, wherein 60 vol % or more of the overall volume of the template or substrate is porous through voids, open voids or pores, closed voids or pores, or any combination thereof. The template or substrate can be porous, such that the voids and/or pores amount to 10% by volume to 95% by volume of the overall volume of the template or substrate, other volume percents include, but are not limited to, from about 30% to 95% by volume, from about 35% to about 80% by volume, from about 50% to about 75% by volume, wherein, as stated above, these percents are based upon the percent of the entire volume of the template or substrate.

In one or more embodiments of the present invention, the substrate or template can be any naturally occurring material or synthetic material. More particularly, and simply as an example, the synthetic material can be any synthetic material that can be formed in a sphere or substantially spherical shape. For instance, synthetic cenospheres can be used as the template or substrate of the present invention.

For purposes of the present invention, the template or substrate can have one or more coatings located on a core material (composite or non-composite material). The template or substrate can be a single particle or be made up of multiple particles formed, for instance, into a composite single particle. The present invention has the ability to take various types of substrates or templates and form them into suitable proppants that can have the proper crush strength, buoyancy, and the like. One way of transforming templates or substrates is with the application of one or more shells on the template or substrate, such as ceramic coatings, as described herein.

The shell in one or multiple layers can be a metal oxide or a combination of metal oxides such as oxides of aluminum, silicon, zirconium, magnesium, or any combination thereof. The shell can provide a substantially higher crush strength to the overall proppant, such as exceeding 1,500 psi, such as 2,500 psi or higher or at least 5,000 psi (e.g., from above 5,000 psi to 15,000 psi). One way of achieving this increased crush strength is incorporating a secondary phase, one or more dopants, and/or the use of multiple layers to form the shell around the template or substrate. In one or more embodiments, the shell can contain reinforcing material, such as particulates, fibers, whiskers, or combinations thereof. The reinforcing material can be present in the shell in an amount from about 1 wt % to about 25 wt %, and more particularly from about 5 wt % to about 15 wt %, based on the weight percent of the shell. The particulates or fibers typically can have a size of from about 0.1 µm to about 5 µm, more particularly from about 1 µm to about 3 µm. The reinforcing material can be uniformly distributed throughout the surface area of the shell. Examples of particular reinforcing materials include, but are not limited to, carbon black, fiberglass, carbon fibers, ceramic whiskers, ceramic particulates, and/or metallic particles. The shell can contain secondary phases, such as, but are not limited to, inorganic or ceramic phases. Examples include metal oxide(s), metal carbide(s), metal nitride(s), or any combination thereof. Zirconium oxide, zirconium carbide, and zirconium nitride are examples. The zirconium oxides (zirconium carbides, and/or zirconium nitrides) can be stabilized in a useful crystallographic phase, such as through the use of one or more elements, such as metals. For instance, zirconium oxide, such as a tetragonal phase of zirconium oxide, can be stabilized through the additions of the oxides of magnesium, calcium, cerium, yttrium, scandium, or any combination thereof. The carbides or nitrides of zirconium can be stabilized through the use of silicon, titanium, tungsten, aluminum, boron, or any combination thereof. The stabilizers can be present in any amount, such as from about 3.5 wt % to about 5.5 wt % based on the weight of metal oxide, such as zirconium oxide. Other examples of amounts include from about 10 wt % to about 17 wt %, based on the weight of metal oxide, such as zirconium oxide. The formation of the metal carbides, such as carbides of silicon, titanium, zirconium, tungsten, aluminum or boron (optionally with the one or more stabilizers), can be formed under elevated temperatures (such as temperatures from about 500° C. to about 1,200° C.) in an atmosphere of carbon monoxide, where a source(s) of silicon, titanium, zirconium, tungsten, aluminum, or boron (or other elemental particles) can come in contact with carbon to form the carbide phase, for instance, zirconium carbide. An unsintered shell can be coated with a carbon containing material (such as carbon black, pitch, charcoal, or coke derived from coal) prior to heat treating to form a carbide. In general, the shell can comprise a metal oxide, a metal carbide, a metal nitride, or any combination thereof, derived from a silicon source, titanium source, tungsten source, zirconium source, aluminum source, boron source, or any combination thereof.

Similarly, the metal nitrides (e.g., zirconium nitride) (having one or more stabilizers) can be formed under elevated temperatures in an atmosphere containing ammonia, nitrogen, nitrous oxide, or any combination thereof. Examples of elevated temperatures include, but are not limited to, from about 500° C. to about 1,200° C.

In one or more embodiments, the shell can contain one or more dopants, such as materials to improve the densification of the shell material, retard the densification of the shell material, and/or to improve the susceptibility of the shell material to external influences during the sintering process.

In one or more embodiments, the shell can be surface modified, for instance, by the addition of one or more inorganic materials or phases, or the attachment (e.g., chemical attachment or bonding) of one or more chemical groups, such as hydrophilic groups or hydrophobic groups. The chemical groups can be surfactants, polymers, ionic groups, ionizable groups, acid groups, salts, surface active agents, and the like. The surface modification can improve the surface morphology of the proppant, especially after the proppant is a sintered proppant. The inorganic material or phases used for surface modification can include glassy materials, such as silicon oxide, alone or with the addition of oxides of sodium, potassium, calcium, zirconium, aluminum, lithium, iron, or any combination thereof. The amount of the silicon oxide can be from about 70 wt % to about 99 wt %, such as from about 85 wt % to about 95 wt %, and the addition of the one or more other oxides, such as sodium oxide and the like, can be from about 1 wt % to about 15 wt %, such as from about 2 wt % to about 10 wt %. The surface modification of the shell can include the application of one or more organic materials (e.g., aliphatic compounds, ionic compounds, surfactants, aromatic compounds, polymeric compounds) or the application of an organic phase(s). The organic material or chemical groups can be bonded to the shell surface or adsorbed, or absorbed or otherwise attached. The organic material or organic phase can modify the proppant's propensity to interact with aqueous solutions, thus making the proppant either hydrophobic, hydrophilic, or hydro-neutral. The surface modification of the shell can include the use of substances that are effectively activated by temperature elevation of the proppant to yield a modification of the proppant transport fluid (e.g., breaking the gel used to transport the proppant through the subterranean regions). The surface treating, which can occur after sintering of the proppant, can have the ability to improve one or more chemical and/or mechanical properties, such as enhanced transportability.

The proppants of the present invention can be designed to improve reservoir flow rates by changing the hydrophilic properties of the proppants themselves. The hydrophilic nature of current proppants causes water to be trapped in the pore spaces between proppants. If this water could be removed, flow rates would be increased. A route to the prevention of this entrapped water within the proppant pack, is to functionalize the surface of the proppant particles with at least one chemical substituent such that more hydro-neutral or hydrophobic surface wetting properties of the particles are achieved. Such chemical substituents include, but are not limited to, functionalized carboxylate, phosphate, or esters, where the functionalized group can be an alkyl group, or other moiety conferring a degree of surface hydrophobicity or hydrophiilicity. In particular, the surface can be functionalized with hydrophobic carboxylic acids such as hexanoic acid or parahydroxybenzoic acid, or methoxy, methoxy(ethoxy), or methoxy(ethoxyethoxy) acetic acids. Furthermore, the carboxylate alumoxanes of each of these acids may also be used for the surface functionalization. The chemical groups mentioned throughout can be used as well for functionalization. These functionalizations of the proppant surface allow for varying of the wetting properties continuously within the range and spectrum of hydrophilicity, hydro-neutrality, and hydrophobicity of the surface.

In one or more embodiments of the present invention, the shell or one or more layers comprising the shell can be densified by a variety of methods. Examples of methods that can be used to densify the shell or a layer of the shell include, but are not limited to, liquid phase sintering, reactive phase sintering, and/or solid state sintering. As a more specific example, the densification can be achieved by indirect radiant heating, direct infrared radiation, direct conduction of the heat flux from the environment to the proppant shell, excitation of the constituent molecules of the shell, and consequent heating of the shell by electromagnetic radiation, inductive coupling of the shell material to an external excitation field of alternating current for instance, with a frequency from 5 to 1,000 HZ. The heating of the shell by electromagnetic radiation can be at a frequency from 2 to 60 GHZ, such as that generated by a magnetron. The pressure assisted sintering can be carried out with an application of external gas pressure to the system during heat treatment, with pressures, for instance, ranging from ambient to 1,500 PSIG.

For purposes of liquid phase sintering, additives may be used, such as metal oxides. Examples include, but are not limited to, oxides of aluminum, silicon, magnesium, titanium, lithium, sodium, calcium, potassium, or any combination thereof. The amount of the additives can be from about 0.1 wt % to about 5 wt %, such as from about 0.25 wt % to about 2 wt %, per weight of oxide in the shell. The liquid phase sintering additives can be introduced by way of chemical mixing, coating, or dissociation of a secondary phase in the coating.

With respect to the secondary phases which may be present with the shell, the secondary phases can be achieved by forming the secondary phase in-situ with the other ingredients used to form the coating, which ultimately forms the shell on the template or substrate. The secondary phase can be prepared separately and then added to the composition used to form the shell by blending or other introduction techniques.

In one or more embodiments, the shell can comprise multiple layers, such as two or more layers, such as two, three, four, or five layers. The layers can be the same or different from each other. Various layers can be used to achieve different purposes or physical or chemical properties. For instance, one layer can be used to improve crush strength, and another layer can be used to achieve buoyancy. For example the use of an aluminosilicate material as a layer material would produce an interfacial layer between the template and subsequent layers to improve boding of the layers. The use of an aluminosilicate layer, by virtue of its lower elastic modulus, would also improve the mechanical properties of the system due to the ability to inhibit crack propagation. Examples of such a material include, mullite, cordierite, and doped aluminosilicates with a dopant phase such as, but not limited to, lithium, magnesium, sodium. The lower specific gravity of the layer can reduce the overall specific gravity of the proppant, thus increasing the buoyancy of the proppant. The load bearing layer can be any of the widely available engineering ceramics such as, but not limited to aluminum oxide, stabilized zirconium oxide, carbides and nitrides. By using different layers, one or more synergistic results can be achieved with respect to the performance of the proppant. For instance, the use of two or more layers, which may be the same or different, can achieve synergistic improvement with respect to the generation of useful strain fields in the system, beneficial crack tip influences, or a combination of these properties. The thermal expansion coefficient mismatch between layers may generate residual compressive strain fields in one or more of the layers leading to apparent increases in fracture toughness and strength of the overall proppant system. The presence of an interface between layers will lead to deviation and/or trapping of an advancing cracktip during loading to improve the apparent fracture toughness and strength of the overall proppant system.

Besides the various techniques already mentioned, the shell can be formed on the template or substrate by a fluidized bed method. For instance, the shell can be formed through the use of heated fluidizing air, dried fluidizing air at ambient temperature, or dried heat fluidizing air. The ambient temperatures would be from 15 to 30° C. and the heated fluidizing air would be from about 50 to about 200° C. The dew point of the fluidizing air can be below 0° C. The temperature of the fluidizing air can be from about 25° C. to about 200° C. The volume of the fluidizing air admitted into the chamber can be the same or varied to effect adequate fluidization of the templates during the coating process. For example, as the coating builds, the mass of the individual particles increases such that they may no longer remain adequately fluidized, thus an increase in air velocity (volume) can be used to maintain the particles in suspension. The material forming the shell can be applied to the templates in the fluidizing bed through the use of a spray nozzle. The spray nozzle can have both single and/or dual fluid designs. The single fluid design can effect the atomization of the solution that forms the shell through, for instance, the effects of pressure reduction at the orifice of the nozzle. The dual fluid nozzle can effect the atomization of the solution that forms the shell through the addition of atomizing air to the solution either prior to exiting the nozzle or after exiting the nozzle, i.e., internal mix or external mix design.

In one or more embodiments, the template or substrate (and/or shell) can be modified, such as surface modified, through a variety of techniques. For instance, the surface of the template or substrate can be modified through one or more heat treatments prior to the formation of the shell on the template. Another form of surface treatment can be to modify chemically the surface of the template, such as by glazing, application of a bond coat, or chemical etching. The chemical modification can improve the performance and/or stabilize the template surface. Removal of residual impurities, cleaning of the surface, reduction of residual stain distributions prior to coating, increasing the microscopic roughness of the surface to improve coating bond strength or removing and/or improving the morphology of protuberances. Furthermore, the modification can be achieved by the preferential removal of one or more constituent phases on the template. For example, a wash with caustic soda may preferentially dissolve silica from the template.

Examples of templates or substrates that can be used in the present invention include metal-fly ash composites, which can contain metal and/or metal alloys. Examples include those set forth in U.S. Pat. No. 5,899,256, incorporated in its entirety by reference herein. The metal or metal alloy can be aluminum or an aluminum alloy. Further, the metal-fly ash composites contain cenosphere fly ash particles or other fly ash particles. The template or substrate used in the present invention can be particles, such as spheroidal particles of slag and/or ash. These particles, for instance, can contain $SiO_2$, $Al_2O_3$, and/or CaO. Other oxides can be present, such as other metal oxides. Examples of particles can include those set forth in U.S. Pat. No. 6,746,636, which is incorporated in its entirety by reference herein.

In one or more embodiments of the present invention, the template or substrate can be a sintered composite particulate containing nanoparticles and/or a clay material, bauxite, alumina, silica, or mixtures thereof. The nanoparticles can be hollow microspheres, such as hollow mineral glass spheres, such as SPHERELITES, CENOLIGHTS, SCOTCH LIGHT, or Z-LIGHT SPHERES. The template or substrate can be formed of clay or hydrided aluminum silicate, bauxite, containing 30 to 75% $Al_2O_3$, 9 to 31% $H_2O$, 3 to 25% $FeO_3$, 2 to 9% $SiO_2$, and 1 to 3% $TiO_2$.

The template or substrate (or the shell) can have a resin or polymer coating on it to aid in dispersibility, to aid in receiving a shell of the present invention, or for processing reasons. The template or substrate (or the shell) can contain nanoparticles, such as nanoclays, carbon nanofibers, silica, carbon nanotubes, nanoparticle minerals, such as silica, alumina, mica, graphite, carbon black, fumed carbon, fly ash, glass nanospheres, ceramic nanospheres, or any combination thereof. The nanoparticles can have a size of 10 nanometers to 500 nanometers. The template or substrate can be natural sand, quartz sand, particulate garnet, glass, nylon pellets, carbon composites, natural or synthetic polymers, porous silica, alumina spheroids, resin beads, and the like. It is to be understood that the term "template or substrate," as used throughout the application, includes template spheres, and preferably having at least one void.

In one or more embodiments, the template or substrate (or the shell) can be a porous particulate material, which can be treated with a non-porous coating or glazing material. For instance, the porous particulate material can be porous ceramic particles, such as those set forth in U.S. Pat. No. 5,188,175, incorporated in its entirety by reference herein. The non-porous coating or glazing material can be a resin or plastic.

In one or more embodiments, the template or substrate (or the shell can contain) can be synthetic microspheres, such as ones having a low alkali metal oxide content. Examples include those set forth in U.S. Patent Application Publication No. 2004/0079260, incorporated in its entirety by reference herein. The template or substrate can be spherical material made from kaolin clay having an aluminum content distributed throughout the pellet, such as those described in U.S. Patent Application Publication No. 2004/0069490.

In one or more embodiments, the template or substrate can be sintered, spherical composite or granulated pellets or particles, such as ones containing one or more clays as a major component and bauxite, aluminum, or mixtures thereof. The pellets can have an alumina-silica ratio from about 9:1 to about 1:1 by weight.

In one or more embodiments, the template or substrate (or the shell) can be porous ceramic particles having an average particle diameter of 50-2,000 microns. The porous ceramic particles can have pores averaging from about 1 to 100 microns in diameter, and other pores averaging from about 0.001 to 1 micron in diameter. The ceramic material can include alumina, silica, zirconia, titania, zirconium aluminum titanate, or nitrides thereof, carbides thereof, or mixtures thereof. The particles can have an average surface area (BET) of about 1 to 50 $m^2/g$. The particles can have an average surface area (BET) of from about 100 to 500 $m^2/g$.

In one or more embodiments, the shell comprises one or more layers. When multiple layers comprise the shell, the layers can be the same or different from each other. The thickness of each layer can be the same or different. As stated, one or more layers can comprise an inorganic or ceramic material, such as alumina or other ceramic or inorganic materials as described herein. One or more of the layers can be a toughened layer, such as a toughened inorganic or ceramic layer, such as alumina. For instance, the ceramic or inorganic layer that comprises at least one layer of the shell, can be strengthened or toughened by the addition or presence of metal oxide, metal nitrides, and/or metal carbides, and the like (e.g., zirconium oxide, zirconium nitride, and/or zirconium carbide). The strengthened layer can be achieved by either adding an additional layer comprising an inorganic or ceramic material, such as metal oxide, metal nitrides, or metal carbides, or in the alternative or in addition, the previously-applied layer containing the inorganic or ceramic material can be converted or chemically altered to contain a nitride, a carbide, or the like. Or, a nitride, carbide, or both can be added. Either option is possible. The nitrides can contain or be a nitride of Si, Al, Ti, Zr, W, Bo, and the like. The carbides can contain or be a carbide of Si, Zr, W, Al, Ti, Bo, and the like.

In one or more embodiments, the shell can comprise one or more layers, and can provide a surface repairing of the template surface, such as a template sphere surface. The surface repairing can comprise infiltrating cracks or flaws on a shell and/or template with a suspension comprising aluminium silicate, ceramic particles (nano-sized) alumoxane, mullite, or other minerals) or a combination thereof.

The surface repair can be achieved, for instance, by providing a glazing layer on the template surface. The glazing layer can at least partially infiltrate or penetrate below the top or outer surface of the template surface, such as in cracks or flaws in the template sphere. For instance, a thin layer (e.g., 0.5 micron to 10 microns) of silica, mullite, cordierite, spodumene, or other inorganic, mineral-containing, or ceramic-containing materials. (This materials as well all materials mention throughout can be used as the shell material and/or template material). This glazing layer can form part of the overall shell and serve as one layer of the shell. Preferably, this surface repairing of the template is achieved by glazing the immediate surface of the template. Another form of repairing the surface of the template prior to formation of the shell on the template surface can be achieved by heat treatment, which can densify, consolidate, or otherwise repair cracks or other flaws in the surface of the template. The heat treatment can occur at any temperature depending upon the composition of the template material, for instance, at temperatures of from about 500° C. to 1,700° C. for a time sufficient to surface repair (e.g., 10 minutes or more). In addition, as another option to surface repairing of the template surface, the cracks or flaws can be infiltrated with suspensions of alumoxanes or other inorganic (e.g., mullite, metal oxides) or ceramic-containing materials, such as alkyl-alumoxanes, methyl-alumoxanes, and the like. Further, dopants containing one or more of the alumoxanes or other materials can be used. Also, alumina-containing slurries and mullite-containing slurries, as well as inorganic or ceramic-containing slurries, can be used. Preferably, the particle size of the alumoxane, alumina, mullite, or other inorganic or ceramic-containing particles are small enough to fit within the cracked surface, such as particles on the nano-scale level, for instance, from 1 nanometer to 1,000 nanometers.

In one or more embodiments, one of the layers comprising the shell can be a resin or polymer-containing layer. For instance, the resin or polymer-containing layer can be the outermost layer of the shell and can optionally have a tacky surface, which permits the proppant to have the ability to remain in the subterranean formation during hydrocarbon recovery. Also, should the proppant have a structure failure, an outer resin coating, such as one that is tacky, can permit the failure of the proppant to stay in the proppant location in the subterranean formation without interfering with hydrocarbon recovery. The resin coating or polymer layer can be any thickness as described herein with respect to any other layer of the shell, such as from about 5 microns to 150 microns. The resin or polymer layer can be located anywhere as part of the shell, such as the innermost layer of the shell, the outermost layer of the shell, or one of the intermediate layers of the shell depending upon the purpose of the resin or polymer layer.

In one or more embodiments, the template material or sphere can be or contain a geopolymer or contain a pore forming or pore containing material (e.g., dissolvable or decomposable material) which can be subsequently subjected to chemical etching or a burn-out, wherein portions of the geopolymer or other pore-forming material can be removed.

In one embodiment, the template, such as the template sphere, can comprise ceramic material or inorganic material, which can be present with pore or void-forming material, wherein the pore or void-forming material is removable by any process, such as chemical etching, heating, and the like. Once the pore-forming or void-forming material is partially or completely removed, the template sphere or material is achieved, which has the desirable void volume percent as described herein.

In one or more embodiments of the present invention, the shell can be formed on the template, such as the template sphere, while the template or template sphere is in a green state, and then the entire proppant having the template and the shell can then be subjected to sintering or heat treatment to form or consolidate the shell and consolidate or calcine the template sphere as well.

In one or more embodiments, the template material, such as the template sphere, can have a specific gravity of from 0.25 to 0.85 g/cc. This specific gravity for the template sphere can be especially useful when coating the template sphere to form the shell, especially when the coating is being achieved with the use of a fluidized bed.

The template sphere or material is preferably a particle not formed by granulation or agglomeration techniques, but is a single individual continuous particle having one or more voids.

In one or more embodiments, the template or substrate can be a hollow microsphere made by the coaxial process described in U.S. Pat. No. 5,225,123, incorporated in its entirety by reference herein. This process includes the use of feeding a dispersed composition in a blowing gas to a coaxial blowing nozzle, wherein the coaxial blowing nozzle has an intercoaxial nozzle for blowing gas and an outer nozzle for the dispersed particle composition. The hollow microspheres can be made from ceramic materials, glass materials, metal materials, metal glass materials, plastic materials, macroparticles, and the like.

The proppants of the present invention can be used in a variety of areas. The proppants can be used as substrates as semi-permeable membranes in processes for carrying out gas and liquid separations and for use as substrates for catalysts and enzymes. The proppants can be used in processes for the manufacture and purification of pharmaceutical or chemical products, for instance, using or derived from genetically-engineered bacteria, natural living organisms, and enzymes. The proppants of the present invention can be used as containers for liquids, adsorbents, absorbents, or catalysts or as containers for chemical agents whose release is subject to predetermined control (e.g., controlled slow release).

The proppants of the present invention can be used in one or more of the following areas as a composition, an additive, and/or to fully replace or partially replace the filler or reinforcing agent conventionally used, using similar or the same amounts, or lesser amounts, to achieve the same or improved properties: proppants for oil and gas industry, lightweight high strength fillers for polymers, as a component in a matrix system, syntactic foams for aerospace applications, high performance fillers for cement and concrete, high performance refractory materials, high strength, lightweight insulating materials, carriers for catalysis systems, water treatment systems, high strength, lightweight particulate reinforcements for polymer matrix composites, high strength, lightweight particulate reinforcements for ceramic matric composites, high strength, lightweight particulate reinforcements for metal matrix composites, high performance casting sand for metal casting applications, or friction reducing fillers for polymer processing systems (e.g. extrusion, die casting, etc). Matrix materials may include, but are not limited to the following: polymeric systems such as polyesters, epoxies and urethanes, polyethylenes, polypropylenes, and the like, calcium silicate based cement systems, calcium aluminate based cement systems, foamed polymeric systems, extruded polymeric systems, and ceramic systems.

The proppant of the present invention can be prepared by forming a template sphere and providing a shell around the entire outer surface of the template sphere, and then sintering the shell to form a continuous sintered shell. The sintering can be liquid phase sintering, reactive phase sintering, or solid state sintering, or any combination thereof. The sintering can comprise indirect radiant heating, direct infrared radiation, direct conduction of heat flux from an environment to the proppant, excitation of molecules of the shell, and consequent heating of the shell by electromagnetic radiation, or inductive coupling of the shell to an external excitation field of alternating current. The template sphere can be formed by various processes which preferably make a template sphere having one or more voids. The template sphere can be formed by a spray drying process, a dehydrating gel process, a sol-gel process, a sol-gel-vibrational dropping process, a drop tower process, a fluidized bed process, a coaxial nozzle gas-bubble process, a thermolysis process, a chemical etching process, or a blowing process. Examples of these various processes are set forth below, and patents and applications providing details of these processes which can be adapted to the present invention are further provided below. It is noted that as an option the step of solidifying, hardening, or sintering to form the final template sphere can be optional, and the template sphere can be left in a green state so that upon the formation or densification of the shell by sintering, the green template sphere can be also sintered, hardened, or otherwise solidified to form the proppant of the present invention.

The hollow template spheres can be made from aqueous or non-aqueous suspensions or dispersions of finely divided inorganic or organic solid particles, such as ceramic, glass, metal and metal glass particles, having particle diameters in the range of from about 0.01 to 10 microns (µm), a binder material, a film stabilizing agent, a dispersing agent for the solid particles, and a continuous aqueous or non-aqueous liquid phase. The suspension or dispersion is blown into spheres using a coaxial blowing nozzle, and the spheres are heated to evaporate the solvent and further heated or cooled to harden the spheres. The hardened spheres are then subjected to elevated temperatures to decompose and remove the binder and any residual solvent or low boiling or melting materials. The resulting porous hollow spheres are then fired at further elevated temperatures to cause the particles to sinter and/or fuse at the points of contact of the particles with each other such that the particles coalesce to form a strong rigid network (lattice structure) of the sintered-together particles.

A coaxial blowing nozzle and a blowing gas to blow hollow spheres from a continuous liquid phase and dispersed particle film forming composition can be used and can comprise feeding the blowing gas to an inner coaxial nozzle, feeding the dispersed particle film forming composition to an outer coaxial nozzle, forming spherically shaped hollow spheres in the region of the orifice of the coaxial blowing nozzle and removing the hollow spheres from the region of the orifice of the coaxial blowing nozzle. A transverse jet entraining fluid can be used to assist in the sphere formation and the detaching of the hollow spheres from the blowing nozzle. The continuous liquid phase of the dispersed particle film forming composition allows the hollow spheres to be blown by forming a stable film to contain the blowing gas while the hollow sphere is being blown and formed. The dispersed particles in the dispersed particle composition, as the dispersed particle composition is forming the hollow sphere and after the sphere is formed, link up with each other to form a rigid or relatively rigid lattice work of dispersed particles which dispersed particle lattice work with the binder and continuous liquid phase comprise the hollow green spheres. The hollow spheres, after they are formed, can be hardened in ambient atmosphere or by heating and removing a portion of the continuous phase. The hardened hollow green spheres have sufficient strength for handling and further treatment without significant breaking or deforming of the microspheres.

The hardened green spheres can be treated at elevated temperatures to remove the remainder of the continuous liquid phase and volatile materials such as binder, film stabilizing agent and dispersing agent. The treatment at elevated temperatures sinters and coalesces the dispersed solid particles to form rigid hollow porous spheres that can be substantially spherical in shape, can have substantially uniform diameters and can have substantially uniform wall thickness. The heating at elevated temperatures, in removing the continuous phase and added materials, creates interconnecting voids in the walls of the spheres which result in the porous characteristics of the spheres. The sintering and coalescing of the dispersed solid particles, depending on the time and temperature of the heating step, can cause a small degree of compaction of the dispersed particles and can cause the coalescing of the particles at the points in which they are in contact to form rigid, uniform size and shaped spheres of uniform wall thickness, uniform void content and uniform distribution of voids in the walls and high strength. Because the porosity is a result of the removal of the continuous phase from uniformly dispersed solid particles, the pores can be continuous from the outer wall surface of the template sphere to the inner wall surface of the template sphere and the walls of the template spheres can have substantially uniform void content and uniform distribution of the voids that are created.

The hollow template spheres in general can be substantially spherical, have substantially uniform diameters, and have substantially uniform wall thickness and the walls have uniform void content and void distribution and voids which are connected to each other and to the inner and outer sphere wall surfaces. The walls of the hollow porous spheres can be free of latent solid or liquid blowing gas materials, and can be substantially free of relatively thinned wall portions or sections and bubbles.

The hollow spheres can be made from a wide variety of film forming dispersed particle compositions, particularly dispersed ceramic, glass, metal, metal glass and plastic particle compositions and mixtures thereof. The dispersed particle compositions can comprise an aqueous or nonaqueous continuous liquid phase and have the necessary viscosities when being blown to form stable films. The hollow sphere stable film wall after the sphere is formed rapidly changes from liquid to solid to form hollow green spheres. The hollow green spheres can be substantially spherical in shape and can be substantially uniform in diameter and wall thickness.

The hollow green spheres as they are being formed and/or after they are formed can have a portion of the continuous liquid phase removed from the dispersed particle composition from which the spheres were formed. The removal of continuous liquid phase can act to bring the dispersed particles closer together and into point to point contact with each other. The dispersed particles can then link up with each other to form a rigid or relatively rigid lattice work of dispersed particles which particles lattice work with the binder (if one is used) and continuous liquid phase (that remains) comprise the hollow green spheres. The hollow green spheres are free of any latent solid or liquid blowing gas materials or latent blowing gases. The walls of the hollow green spheres are free or substantially free of any holes, relatively thinned wall portions or sections, trapped gas bubbles, or sufficient amounts of dissolved gases to form bubbles. The term "latent" as applied to latent solid or liquid blowing gas materials or latent blowing gases is a recognized term of art. The term "latent" in this context refers to blowing agents that are present in or added to glass, metal and plastic particles. The glass, metal and plastic particles containing the "latent blowing agent" can be subsequently heated to vaporize and/or expand the latent blowing agent to blow or "puff" the glass, metal or plastic particles to form spheres. The hollow green spheres can have walls that are substantially free of any holes, thinned sections, trapped gas bubbles, and/or sufficient amounts of dissolved gases to form trapped bubbles.

In general, the hollow template spheres can contain a single central cavity, i.e. the single cavity is free of multiple wall or cellular structures. The walls of the hollow spheres can be free of bubbles, e.g. foam sections. The hollow template spheres can be made in various diameters and wall thickness. The spheres can have an outer diameter of 200 to 10,000 microns, preferably 500 to 6000 microns and more preferably 1000 to 4000 microns. The spheres can have a wall thickness of 1.0 to 1000 microns, preferably 5.0 to 400 microns and more preferably 10 to 100 microns. When the dispersed particles are sintered, the smaller particles can be dissolved into the larger particles. The sintered particles in the hollow porous spheres can be generally regular in shape and have a size of 0.1 to 60 microns, preferably 0.5 to 20 microns, and more preferably 1 to 10 microns.

In certain embodiments of the invention, the ratio of the diameter to the wall thickness, and the conditions of firing and sintering the hollow template spheres can be selected such that the spheres are flexible, i.e., can be deformed a slight degree under pressure without breaking. The preferred embodiment of the invention, particularly with the ceramic materials, is to select the ratio of the diameter to wall thickness and the conditions of firing and sintering the hollow porous spheres such that rigid hollow porous spheres are obtained.

Another process to make the template sphere can involve a dehydrating gel process. An example of such a process can include the steps of adding precursor material comprising an aqueous solution, dispersion or sol of one or more metal oxides (or compounds calcinable to metal oxide) to a liquid body of a dehydrating agent comprising an organic dehydrating liquid, agitating the liquid body to maintain the resulting droplets of the precursor material in suspension and prevent settling thereof, to maintain relatively anhydrous dehydrating liquid in contact with the surface of the droplets as they are dehydrated, and to rapidly extract within 30 seconds at ambient temperatures of 20° to 40° C., the major amount of water from said droplets and form gelled microparticles therefrom, the predominant amount of said gelled microparticles being in the form of spherical, gelled, porous, liquid-filled spheres, recovering said liquid-filled spheres, drying the resulting recovered spheres at temperatures and pressures adjusted to minimize fracture and bursting the same and remove liquid from within the recovered spheres, and firing the resulting dried spheres to form spherical ceramic spheres the peripheral wall or shell of each which encloses the single hollow within the interior thereof being porous and heat-sealable, homogeneous, and made of non-vitreous ceramic comprising polycrystalline metal oxide or amorphous metal oxide convertible to polycrystalline metal oxide upon firing at higher temperature.

Another method to make the template sphere can be a thermolysis process, such as the process described in U.S. Pat. No. 4,111,713, the disclosure of which is incorporated herein by reference. The method involves the preparation of hollow spheres, the exterior wall of which comprises a thermally fugitive binder material and sinterable inorganic particles dispersed in the binder material. By "thermally fugitive" is meant materials that upon heating of the spheres will be removed from the spheres, e.g., by vaporization and/or oxidation or burning. For instance, at least 20% by volume of the thermally fugitive material can be removed, or from 20% to 100% or 70% to 99% by volume. Natural or synthetic organic materials which are readily burned such as corn starch syrup, phenolic resins, acrylics and the like can be used as binder materials.

Besides a binder material, the solidifiable liquid sphere includes a volatile void-forming agent such as taught in U.S. Pat. No. 4,111,713. Other ingredients may also be included, such as a solvent or other dispersing liquid. In addition, a metal or other inorganic material may be included. Metallic binder combinations can be obtained by using (1) a colloidal dispersion of a metal, metalloid, metal oxide, or metal salt or (2) a metal, metalloid, metal oxide, or metal salt dispersion in a phenolic resin or other organic binder.

Typically the solidifiable liquid sphere is formed at room temperature, e.g., by dissolving the binder material in a solvent or dispersing it in another liquid. However, solid granules of binder material that become liquid during the tumbling operation may also be used.

During the sphere-forming operation the binder material should achieve a viscosity that is low enough for the parting agent particles to be wetted by the spheres, and preferably low enough so that any cells forming inside an evacuated sphere will tend to at least partially coalesce, whereby binder material will be concentrated at the exterior spherical wall or shell of the sphere. The parting agents can be applied by a mixer or by a fluidized bed, using a similar approach that is described in forming the shell. At the same time the viscosity of the binder material should be high enough so that the expanded sphere will not deform excessively while sphere formation is taking place. The useful range of viscosities for the binder material is broad, ranging from at least about 50 to 100,000 centipoises, but an especially preferred range is between about 100 and 10,000 centipoises. The spheres of binder material in the tumbling, sphere-forming operation are termed liquid herein, since even when at high viscosity they are flowable. The range of useful viscosities will vary with particle size and the ease with which the parting agent particles can be wet. Surfactants can be used to advantage either as an ingredient in the binder material or as a treatment on the parting agent particle.

The parting agent particles used in practicing the invention can be solid discrete free-flowing particulate material which is sufficiently inert, including sufficiently nonmelting, during the sphere-forming operation to retain a parting function. In addition, parting agents that eventually become the primary or only constituent of the sphere walls should be sinterable inorganic materials. Suitable metal parting agents are iron, copper, nickel and the like. Suitable metalloid parting agents include carbides such as silicon carbide, nitrides such as boron nitride, borides, silicides and sulfides. Suitable metal oxide parting agent particles include alumina, zirconia, magnetite, silica, mullite, magnesite, spinels and the like. Suitable metal salt parting agent particles include metal hydroxides, nitrates, and carbonates.

Mixtures of different parting agent particles are used in some embodiments of the invention. For example, parting agent particles providing better flow properties, e.g., spheres, which may or may not be sinterable, may be mixed with irregular sinterable parting agent particles. Alternatively, mixtures are used to provide pigmentation, flame-retardancy, or variety in physical properties of the final sphere. However, sinterable particles generally constitute at least a majority, and preferably at least 60 volume percent, of the exterior wall of a sphere so as to obtain adequate coherency and strength.

Generally the parting agent particles can range from a few micrometers up to several hundred micrometers in size. They generally have a diameter no larger than the thickness of the wall of the final hollow sphere.

Generally the solidifiable liquid spheres are used in sizes that produce hollow spheres about ½ millimeter to 2 centimeters in diameter. Spheres of the invention can be made with good uniformity of sizes by using binder material granules or spheres of uniform size. Further, of course, hollow spheres may be screened after formation to provide desired ranges of size.

The template spheres are generally round but need not be perfectly spherical; they may be cratered or ellipsoidal, for example. Such irregular, though generally round or spherical, hollow products are regarded as "spheres" herein.

The hollow template spheres can have a single hollow interior space, such as described in U.S. Pat. No. 4,111,713. The interior space in the sphere may be divided into a number of cells by interior walls having essentially the same composition as the exterior wall; but even such spheres have an outer wall, usually of rather constant thickness and of greater density, around the interior space. The outer wall is continuous and seamless (that is, without the junction lines resulting when two separately molded hemispheres are bonded together), though the wall may be permeable or porous. The thickness of the outer wall is generally less than about ½ the radius of the sphere and may be quite thin, as thin as 1/50 the radius, for example.

Another method to form the template sphere is also a dehydrating gel or liquid method which uses an aqueous precursor material that contains an aqueous solution, dispersion or sol of one or more metal oxides or metal compounds calcinable to metal oxides, or mixtures of said forms of precursor materials. The precursor material should be pourable and stable, that is, non-gelled, non-flocculated or non-precipitated. The equivalent concentration of the metal oxide in the precursor material can vary widely, e.g. a few tenths of one weight % to 40 or 50 weight %, and the particular concentration chosen will be dependent on the particular form of the precursor metal oxide and dehydrating liquid used and the desired dimensions and proposed utility of the template spheres. Generally, this concentration will be that sufficient to promote rapid formation of droplets in the dehydrating liquid and, generally, the lower the equivalent concentration of metal oxide in the precursor materials, the thinner the walls and the smaller the diameters of the spheres.

The dehydrating liquid used to dehydratively gel the precursor material is preferably a liquid in which water has a limited solubility and in which water is miscible to a limited extent. Such a dehydrating liquid will practically instantaneously cause formation of liquid droplets of the precursor material and rapidly extract the major amount of the water from the droplets to form discrete, dispersed, liquid-filled spheres having a porous gelled wall or shell, the physical integrity of which is maintained in the body of dehydrating liquid. The formation of a substantially quantitative yield of gelled spheres can be complete within 30 seconds. Further, this formation does not require heating (i.e., it can be accomplished at ambient room temperature, e.g., 23° C.) nor does it require use of a barrier liquid. Though a small amount of solid beads may also be formed, the predominant amount, i.e., at least 85-95% or higher, of the microparticles formed will be in the form of template spheres. If the liquid-liquid extraction is carried out in a batch operation, there may be a tendency to form the small amount of solid beads (or relatively thicker-walled microcapsules) toward the end of the extraction due to the progressively decreasing dehydrating ability of the dehydrating liquid as it extracts the water from the precursor material.

Generally, dehydrating liquids can have a limited solubility of about 3 to 50 weight %, preferably 15 to 40 weight % for water (based on the weight of the dehydrating liquid) at 23° C. Representative organic dehydrating liquids useful are alcohols, such as alkanols with 3-6 carbon atoms, e.g. n-butanol, sec-butanol, 1-pentanol, 2-pentanol, 3-methyl-2-butanol, 2-methyl-2-butanol, 3-methyl-3-pentanol, 2-methyl-1-propanol, 2,3-dimethyl-2-butanol and 2-methyl-2-pentanol, cyclohexanol, ketones such as methyl ethyl ketone, amines such as dipropylamine, and esters such as methylacetate, and mixtures thereof. Some of these dehydrating liquids, e.g. n-butanol, when used to form spheres with relatively large diameters, e.g. 100-500 microns or larger, may have a tendency to cause micro-cracks in the walls of the spheres. Such micro-cracks can be prevented or minimized when such dehydrating liquids are used to form large spheres by adding a small amount of water to such dehydrating liquids, e.g. 5 to 10% by weight of the dehydrating liquid. However, the resulting water-dehydrating liquid mixture still has the limited solubility for water, preferably at least 15 weight %.

The liquid-liquid extraction step can be carried out at ambient temperatures, e.g. 20° to 40° C.; higher temperatures, e.g. 60° C. and higher, cause fragmentation of the gelled spheres. Excellent, substantial, quantitative yields, e.g. 95% and higher, of gelled spheres, based on the equivalent oxide solids content of the precursor material, can be conveniently achieved at room temperature (23° C.). In order to quickly and efficiently dehydratively gel the droplets of the precursor material in a batch operation, the body of dehydrating liquid can be subjected to externally applied agitation (e.g. by swirling the body of dehydrating liquid or by inserting a stirrer therein) when the precursor material is added thereto, and the agitation is continued during the course of dehydration of the resultant droplets of precursor material. This agitation maintains the droplets in suspension (and thereby prevents agglomeration and settling of the droplets) and ensures maintenance of relatively anhydrous dehydrating liquid in contact with the surface of the droplets as they are dehydrated. In a continuous liquid-liquid extraction operation, equivalent agitation can be accomplished by adding the precursor material at a point to a stream of the dehydrating liquid flowing at a sufficient rate to maintain the droplets in suspension in the course of their dehydration.

The dehydration of the droplets to form the gelled spheres can be sufficiently complete within 30 seconds, and usually in less than 15 seconds, from the time of addition of the precursor material, that addition being in the form of drops, flowing stream, or by bulk.

The size of the droplets, and consequently the size of the resultant gelled and fired spheres, will be affected by the degree or type of agitation of the dehydrating liquid as the precursor material is added thereto. For example, with high shear agitation, e.g. that obtained with a Waring Blendor, relatively tiny droplets (and gelled spheres) can be formed, e.g. with diameters less than 20 microns. In general, gelled spheres with diameters in the range of about 1 to 1000 microns can be produced.

The gelled, porous, transparent, liquid-filled spheres can be separated and recovered from the dehydrating liquid in any suitable manner, e.g. by filtration, screening, decanting, and centrifuging, such separation being preferably performed soon after completion of the extraction step. Where the gelled spheres are recovered by filtration, filter cake comprising the spheres and residual dehydrating liquid is obtained. In any event, the recovered mass of gelled spheres are then sufficiently dried to remove the residual dehydrating liquid and the liquid within the spheres, the resultant dried, gelled spheres being conveniently referred to herein as green spheres, i.e. dried and unfired. The drying can be accomplished in any suitable manner, care being exercised to prevent too rapid an evaporation in order to minimize fracturing or bursting of the spheres. This drying can be carried out in ambient air and pressure in a partially enclosed vessel at temperatures, for example, of 20°-25° C. Higher or lower drying temperatures can be used with commensurate adjustment of pressure if necessary to prevent fracture of the wall of the spheres. During the course of drying, the liquid within the spheres diffuses through the shell or wall of the spheres, as evidenced by microscopic observation of the retreating upper surface or meniscus of the liquid within the transparent spheres, thus attesting to the porous nature of the gelled spheres. The larger the dried spheres are, the more free-flowing they are. The dried spheres have sufficient strength to permit subsequent handling. It may be desired to screen classify them to obtain desired size fractions.

The dried spheres are then fired to convert them to spherical, smooth-surfaced, light weight or low density, rigid, crushable spheres, the shell or wall of which is non-vitreous, synthetic, ceramic, homogeneous, preferably transparent and clear, and comprises metal oxide which is polycrystalline or is amorphous metal oxide convertible to polycrystalline metal oxide upon firing at higher temperature. Depending on the particular oxide precursor material and firing temperature used, the walls of the fired spheres will be porous and heat-sealable or impermeable, the metal oxide in the walls being present in whole or in part in the polycrystalline state or in an amorphous state capable of conversion upon further firing to the polycrystalline state. For example, dried, gelled spheres made from $Al_2O_3$—$B_2O_3$—$SiO_2$ precursor material can be prefired at 500° C. to produce porous, transparent, ceramic spheres comprising amorphous $Al_2O_3$—$B_2O_3$—$SiO_2$, which can be further fired at 1000° C. to form impermeable, transparent, ceramic spheres comprising polycrystalline aluminum borosilicate and an amorphous phase. As another example, dried, gelled spheres made from $TiO_2$ precursor material can be prefired at 250°-450° C. to produce porous, transparent, ceramic spheres consisting of polycrystalline $TiO_2$, and these spheres can be further fired to or at 650° C. to form impermeable, transparent, ceramic spheres consisting of anatase titania, $TiO_2$, and even further fired at 800° C. to form impermeable, ceramic spheres consisting of polycrystalline rutile $TiO_2$. The dried, gelled spheres can be fired in one step directly to impermeable spheres.

The template spheres can be prepared by a spray-drying process. For instance, spray-drying solutions can be used that contain nearly any film-forming substance. Spray drying is particularly suited to the preparation of hollow spheres from solids dispersed in aqueous media. U.S. Pat. Nos. 3,796,777; 3,794,503 and 3,888,957 disclose hollow spheres prepared by spray drying alkali metal silicate solutions that have been combined with "polysalt" solutions, and then carefully drying the intermediate hollow spheres. The process by which these products are made must be tightly controlled to minimize the holes, cracks and other surface imperfections that contribute to porosity that is undesirable in these products.

In general, largely spherical particles are produced from such substances by forming a solution of the film-forming substance in a volatile solvent and spray drying that solution under conditions that lead to the production of hollow particles of the size required. A substance that breaks down to provide a gas in the interior of the particle may be required with certain systems to maintain the expansion of the product while it is still plastic and to prevent breakage under atmospheric pressure when the walls have set. Examples of useful blowing agents include inorganic and organic salts of carbonates, nitrites, carbamates, oxalates, formates, benzoates, sulfites and bicarbonates such as sodium bicarbonate, ammonium carbonate, magnesium oxalate, etc. Other organic substances are also useful, such as p-hydroxy phenylazide, di-N-nitropiperazines, polymethylene nitrosamines and many others. Selection of a particular blowing agent would be based upon compatibility with the film-forming system and the intended use of the product.

Film-forming systems that are of particular value and which do not require the addition of a gas-forming substance as a blowing agent are disclosed in U.S. Pat. No. 3,796,777, hereby incorporated by reference. Hollow spheres can be produced by forming a homogeneous aqueous solution comprising a sodium silicate and a polysalt selected from a group consisting of ammonium pentaborate, sodium pentaborate and sodium hexametaphosphate (other inorganic materials can be used) and then spray drying the solution under conditions necessary to produce hollow spheres of the size required. The spheres are further dried to reduce the water content and to set the walls. In general, the template spheres can have a bulk density of about 0.6 to 20 lbs/ft.$^3$, a true particle density of about 2 to 40 lbs/ft.$^3$ and a particle size of about 1 to 500 microns.

The film-forming system in which the organic solvent is used will determine the characteristics required, but in general it must be water miscible and have a boiling point of 100° C. or more. Those solvents used with alkaline systems, such as those containing alkali metal silicate, must be alkali stable and should not adversely affect the stability of the silicate solution. These characteristics need only be fleeting, less than about 3 minutes, as the organic solvent need only be added immediately before spray drying. In general, those organic solvents that have a number of hydroxyl groups or exposed oxygens are useful in the preferred alkali metal silicate polysalt combination. Examples of useful solvents include, among others, cellosolve, cellosolve acetate, ethyl cellosolve, diglyme and tetraglyme. About 0.5 to 5.0 parts by weight of the solvent for each 100 pbw of the solids in the feed solution are required to provide the beneficial effects of the improved process.

The solution used to form hollow spheres in this method can contain 5 to 50% of the film-forming solids. The amount of organic solvent additive to achieve improved results is between 0.5 and 5%, so that between 0.025 and 2.5% of the solution spray dried to form the hollow spheres is solvent. Ammonium pentaborate (APB), sodium pentaborate (SPB) and sodium hexametaphosphate (SHP) can be used as "polysalts." If a solution of APB and sodium silicate is used, the total solids would be 5 to 35% with 3 to 15% as APB; the ratio of APB solids to sodium silicate solids should be between 0.03:1.0 and 0.5:1.0 and preferably between 0.06:1.0 and 0.5:1.0. About 0.015 to 1.75% of the organic solvents would be added to such solutions. A system having 0.02 to 0.3 parts by weight (pbw) of SPB per pbw of sodium silicate solids contains 17.4 to 34.5% total solids and 6 to 7% SPB solids. This combination would require 0.087 to 1.7% of the appropriate organic solvent. A system having 1 to 3 pbw of SHP per 1 pbw of silicate solids contains 29.6 to 48% of total solids. This combination requires 0.14 to 2.4% of the organic solvent.

The process can be initiated by preparing a solution of the film-forming solids in water, observing any required restrictions as to concentration, order of addition, temperature or the like. It is important that any restrictions relating to viscosity are observed; if the viscosity of the solution is too high when spray dried, fibers may result. After the homogeneous solution is prepared, the organic solvent is added with rapid agitation to ensure proper dispersion. The resulting material is spray dried prior to any manifestation of instability such as rising viscosity or gelling, such as spray dry within 10 minutes.

Any conventional spray drying equipment can be used to implement the process of this invention. The suspension-solution can be atomized into the spray tower by either an atomizer wheel or a spray nozzle. Since a wide range of film-forming materials and solvents can be used in this process a wide range of spray drying temperatures can be used. Inlet temperatures of 50° to 500° C. can be used with outlet temperatures of about 40° to 300° C. Satisfactory products can be prepared from the film-forming system of sodium silicate and polysalt by spray drying the material at an inlet temperature of 200° to 500° C. and an outlet temperature of 100° to 300° C.

Another method of making the template sphere is by a blowing process or blowing agent process. An example of such a process is forming an aqueous mixture of inorganic primary component and a blowing agent. The mixture is dried and optionally ground to form an expandable precursor. Such a precursor is then fired with activation of the blowing agent being controlled such that it is activated within a predetermined optimal temperature range. Control of the blowing agent can be accomplished via a variety of means including appropriate distribution throughout the precursor, addition of a control agent into the precursor, or modification of the firing conditions such as oxygen deficient or fuel rich environment, plasma heating, and the like.

In certain embodiments, the precursor for producing the expanded sphere can be produced by combining the primary component, blowing component and optionally, control agent in an aqueous mixture. This aqueous mixture is then dried to produce an agglomerated precursor. As described above, a method of forming a precursor includes the steps of mixing and drying. The resultant precursor is generally a substantially solid agglomerate mixture of its constituent materials.

The mixing step provides an aqueous dispersion or paste, which is later dried. Mixing can be performed by any conventional means used to blend ceramic powders. Examples of preferred mixing techniques include, but are not limited to, agitated tanks, ball mills, single and twin screw mixers, and attrition mills. Certain mixing aids such as, surfactants may be added in the mixing step, as appropriate. Surfactants, for example, may be used to assist with mixing, suspending and dispersing the particles.

Drying is typically performed at a temperature in the range of about 30 to 600° C. and may occur over a period of up to about 48 hours, depending on the drying technique employed. Any type of dryer customarily used in industry to dry slurries and pastes may be used. Drying may be performed in a batch process using, for example, a stationary dish or container. Alternatively, drying may be performed in a spray dryer, fluid bed dryer, rotary dryer, rotating tray dryer or flash dryer.

The mixture can be dried such that the water content of the resultant agglomerate precursor is less than about 14 wt. %, more preferably less than about 10 wt. %, more preferably less than about 5 wt. %, and more preferably about 3 wt. % or less. It was found that, in certain embodiments, with about 14 wt. % water or more in the precursor, the precursor tends to burst into fines upon firing. This bursting can be caused by rapid steam explosion in the presence of too much water. Hence, in certain embodiments, the resultant precursor should preferably be substantially dry, although a small amount of residual moisture may be present after the solution-based process for its formation. In some embodiments, a small amount of water may help to bind particles in the precursor together, especially in cases where particles in the precursor are water-reactive.

The dried precursor particles can have an average particle size in the range of about 10 to 1000 microns, more preferably about 30 to 1000 microns, more preferably about 40 to 500 microns, and more preferably about 50 to 300 microns. The particle size of the precursor will be related to the particle size of the resultant synthetic hollow template sphere, although the degree of correspondence will, of course, only be approximate. If necessary, standard comminuting/sizing/classification techniques may be employed to achieve the preferred average particle size.

Drying can be performed using a spray dryer having an aqueous feed. Various techniques for controlling activation of the blowing agent can be used such that it is activated at a pre-determined (e.g. optimal temperature) point in the production process. Such control can be achieved by combining a control agent in the precursor formulation. Another embodiment includes a series of control agents and/or blowing agents such that there is sufficient blowing/expanding gas available at the optimal temperature. In one embodiment, a series of blowing agents may be used which are sequentially activated as temperature rises.

Yet a further embodiment involves distributing the blowing agent throughout the precursor such that while the precursor is being fired, the blowing agent distributed near the surface is exposed to a high temperature but the blowing agent near the core of the precursor is "physically" protected. The thermal conductivity of the formulation causes a delay between application of heat on the surface of the precursor to temperature rise within the core of the precursor. Accordingly, blowing agent which is within the core of the precursor will not be activated until a major portion of the precursor particle has already reached its optimal temperature. Many blowing agents are activated by oxidation. Particles within the core of the precursor will not be exposed to oxygen to the same extent as blowing agent on the surface, further protecting the blowing agent in the core of the particle.

Spray dryers are described in a number of standard textbooks (e.g. Industrial Drying Equipment, C. M. van't Land; Handbook of Industrial Drying $2^{nd}$ Edition, Arun S. Mujumbar) and will be well known to the skilled person.

The particle size and particle size distribution can be affected by one or more of the following parameters in the spray drying process:

inlet slurry pressure and velocity (particle size tends to decrease with increasing pressure);

design of the atomizer (rotary atomizer, pressure nozzle, two fluid nozzle or the like);

design of the gas inlet nozzle;

volume flow rate and flow pattern of gas; and slurry viscosity and effective slurry surface tension.

The aqueous slurry feeding the spray dryer can comprise about 25 to 75% w/v solids, such as about 40 to 60% w/v solids.

In addition to the ingredients described above, the aqueous slurry may contain further processing aids or additives to improve mixing, flowability or droplet formation in the spray dryer. Suitable additives are well known in the spray drying art. Examples of such additives are sulphonates, glycol ethers, cellulose ethers and the like. These may be contained in the aqueous slurry in an amount ranging from about 0 to 5% w/v.

In the spray drying process, the aqueous slurry is typically pumped to an atomizer at a predetermined pressure and temperature to form slurry droplets. The atomizer may be one or a combination of the following: an atomizer based on a rotary atomizer (centrifugal atomization), a pressure nozzle (hydraulic atomization), or a two-fluid pressure nozzle wherein the slurry is mixed with another fluid (pneumatic atomization).

In order to ensure that the droplets formed are of a proper size, the atomizer may also be subjected to cyclic mechanical or sonic pulses. The atomization may be performed from the top or from the bottom of the dryer chamber. The hot drying gas may be injected into the dryer co-current or counter-current to the direction of the spraying.

For example, a rotary atomizer has been found to produce a more uniform agglomerate particle size distribution than a pressure nozzle. Furthermore, rotating atomizers allow higher feed rates, suitable for abrasive materials, with negligible blockage or clogging. In some embodiments, a hybrid of known atomizing techniques may be used in order to achieve agglomerate precursors having the desired characteristics.

The atomized droplets of slurry are dried in the spray dryer for a predetermined residence time. The residence time can affect the average particle size, the particle size distribution and the moisture content of the resultant precursors. The residence time can be controlled to give the various characteristics of the precursor. The residence time can be controlled by the water content of the slurry, the slurry droplet size (total surface area), the drying gas inlet temperature and gas flow pattern within the spray dryer, and the particle flow path within the spray dryer. Preferably, the residence time in the spray dryer is in the range of about 0.1 to 10 seconds, although relatively long residence times of greater than about 2 seconds are generally more preferred. Preferably, the inlet temperature in the spray dryer is in the range of about 300 to 600° C. and the outlet temperature is in the range of about 90 to 220° C.

Spray drying advantageously produces precursors having this narrow particle size distribution. Consequently, synthetic expanded spheres resulting from these precursors can have a similarly narrow particle size distribution and consistent properties for subsequent use.

The template sphere can be formed by a drop tower process, for instance, forming spheroidal particles from slag and ash. The spheroidal particles are formed by dropping particles of slag and ash (or other inorganic material) through a heated zone which fuses at least an outer surface of the particles. Any type of furnace can be used, such as a drop tower furnace, a rotary kiln, a fluidized bed, and the like.

The process can involve spherulizing particles of coal slag or agglomerated coal fly ash, resulting from coal combustion (or using inorganic or volcanic material). The process can include the steps of:

(a) providing a drop tube having an upper portion, a central portion and a lower portion;

(b) delivering a feedstock of particles to the upper portion of the drop tube in a manner such that the particles flow in a substantially vertical downward path through the feed tube as individualized particles;

(c) heating the particles to a sufficient temperature by providing heat to the outer surface of the central portion of the drop tube to cause at least the outer surface of the particles to melt such that a majority, i.e., at least about 50 weight percent, of the particles become spheroidal due to surface tension at the outer surface; and (d) cooling the particles, preferably in the lower portion of the drop tube, to prevent agglomeration. Other types of furnaces can be used in this embodiment or other embodiments, such as a tunnel furnace, a microwave furnace and the like.

The slag or ash feedstock, which can range in size from, for example, about 0.001 to 10 mm, preferably from about 0.1 to 1 mm, can be delivered through a feed tube having a discharge port, having one or more holes, each with a diameter from, for example, at least the maximum particle diameter of the feedstock, and more preferably, at least one to twenty times the maximum particle diameter of the feedstock, at the lower end thereof.

The template spheres can also be formed by chemical etching, such as by forming a sphere around a bead that is then subsequently removed by heat or dissolving. At least 20% by volume of the bead can be removed or dissolved, such as from 20% to 100% or 70% to 99% by volume. The steps in such methods comprise coating a polystyrene (or other polymer or dissolvable material) bead with an alumoxane solution (or other inorganic or ceramic material), drying the bead, and then heating the coated bead to a temperature sufficient to calcine the alumoxane to porous amorphous alumina (or other inorganic material). The coated bead is then washed in a solvent to remove the bead from inside the coating. The remaining shell is then heated to a temperature sufficient to form an α-alumina sphere. Besides alumoxane, other inorganic materials or solutions can be used.

An alumoxane (A-alumoxane) can be prepared according to the method described in Chem. Mater. 9 (1997) 2418 by R. L. Callender, C. J. Harlan, N. M. Shapiro, C. D. Jones, D. L. Callahan, M. R. Wiesner, R. Cook, and A. R. Barron, which is incorporated herein by reference. Aqueous solutions of alumoxane can be degassed before use. Dry-form polystyrene beads, such as those available from Polysciences, Inc., can be used. Beads of polymers other than polystyrene may be used, so long as the polymer is soluble in a solvent. Likewise, beads of other materials may be used, so long as they are soluble in a solvent that will not damage the alumoxane coating.

The aqueous solution of A-alumoxane may range from 1-10 weight percent. The aqueous solution of A-alumoxane more preferably ranges from 2-8 weight percent, and most preferably is 8 weight percent. Beads 10 may range from 1-80 µm in diameter, and are preferably 1-5 µm in diameter and more preferably about 3 µm in diameter.

The solution can be pipetted onto beads and then can be placed in a coated ceramic firing crucible, and allowed to dry in air. The coating process can be conducted in a ceramic firing crucible to minimize the amount of agitation of beads. Beads can be covered or coated one to three or more times to achieve a uniform alumoxane coating.

The alumoxane-coated polystyrene beads can be fired to 220° C. for 40 minutes to burn off organic substituents. The firing converts the alumoxane coating to a porous amorphous alumina coating. This allows a solvent such as toluene to dissolve polystyrene beads but not the amorphous alumina coating. Beads with amorphous alumina coating can be stirred in toluene for 1 hour and then vacuum filtered. Multiple washes can be conducted to remove all of the polystyrene resulting from the dissolution of polystyrene beads, because the polystyrene solution tends to "gum up" the surface of α-alumina sphere, precluding removal of additional polystyrene. To separate free-standing α-alumina spheres from any extra alumina resulting from the coating process, the fired (1000° C.) material can be placed in water, centrifuged and filtered. The calcination temperature of 220° C. can be used.

A sol-gel process can be used to form the template sphere, such as by forming a metal oxide solution and adding a metal basic carbonate with acid and surface active agent and thickening agent to prepare a sol of metal, and then dropping the sol into an alkaline gelation bath and then rinsing, drying, and calcining. Another method to form a template sphere involves the use of a sol-gel-vibrational dropping process, wherein aqueous solutions or sols of metal oxides, such as Hf or Zr, are pre-neutralized with ammonia and then pumped gently through a vibrating nozzle system, where, upon exiting the fluid stream, breaks up into uniform droplets. The surface tension of the droplets molds them into perfect spheres in which gelation is induced during a short period of free fall. Solidification can be induced by drying, by cooling, or in an ammonia, gaseous, or liquid medium through chemical reaction.

The following patents/applications, all incorporated in their entirety by reference herein, provide examples of the above processes, which can be adapted to form the template sphere of the present invention: U.S. Pat. Nos. 4,743,545; 4,671,909; 5,225,123; 5,397,759; 5,212,143; 4,777,154; 4,303,732; 4,303,731; 4,303,730; 4,303,432; 4,303,431; 4,744,831; 4,111,713; 4,349,456; 3,796,777; 3,960,583; 4,420,442; 4,421,562; 5,534,348; 3,365,315; 5,750,459; 5,183,493; and U.S. Patent Application Publication Nos: 2004/0262801; 2003/0180537; 2004/0224155.

The crush strength of the proppant can be determined in a uniaxial loading configuration in a strength testing cell with a cavity diameter of 0.5 inches (12.7 mm). The volume of material admitted to the interior of the strength testing cell is 1.0±0.1 mL. Loading of the strength test cell is carried out using a Lloyd Instruments Compression Tester (Model LR30K Plus) at a strain rate of 0.0400 inches per minute (1.016 mm per minute). The compressive force (lbf) and deflection in inches are recorded continuously. The load at "failure" of the system under test is calculated at a deflection of 0.02 inches (0.508 mm) from the applied preload value of 3.00 lbf. The uniaxial crush strength of the system (proppant., template, etc) is quoted in pounds per square inch (PSI) and calculated from the load applied at 0.02 inches deflection divided by the cross-sectional area of the strength test cell in square inches.

In one or more embodiments, the template material or sphere can be made by hybrid methods based on a combination of two or more of the above-described exemplary methods for making the template material or sphere. For instance, a template sphere having voids can be formed by way of a coaxial blowing process and then a drop tower design can be used to form the spheres. For instance, the drop tower can convert the template material into a sphere or a more spheroidal shape through the drop tower approach, and/or the drop tower approach can permit a cooling of the template material or sphere.

In the present invention, the present invention provides improvements with respect to proppant technology. Currently, there is a balance of properties that must be met, such as with respect to specific gravity or buoyancy and sufficient crush strength. In the past, if one wanted to achieve a proppant having sufficient crush strength, the specific gravity and density of the overall proppant was too high such that the proppant would be difficult to pump to the particular location in the subterranean formation or, when in the subterranean formation, the proppant would not be uniformly distributed since the proppant was too heavy and would sink in the medium used to transport the proppant. On the other hand, some proppants may have sufficient low specific gravity, meaning that the proppant would satisfy buoyancy requirements, however, by doing so, the proppant typically does not have reliable crush strength and, therefore, the proppant would fail (e.g., deform, fracture or break) once in the subterranean formation, if not earlier. The present invention achieves the desirable balance of properties by, in at least some embodiments, using a template sphere or material which has low density or desirable specific gravities and then strengthening the template by providing a shell around the template sphere thereby creating sufficient crush strength to the overall proppant due to the shell. Thus, in the present invention, at least in one embodiment, the template sphere provides the desirable buoyancy or specific gravity requirements, and the shell of the present invention provides the desirable crush strength and related properties. A balance of competing properties is achievable by the present invention.

In one or more embodiments of the present invention, and as explained in one or more of the embodiments described previously, the template or substrate (e.g., template sphere) and/or one layer (or more layers, if present) comprising the shell can contain fugitive phases and/or hollow material (e.g., hollow spheres, hollow particulates, hollow materials having other shapes, wherein the hollow material can have one central void and/or multiple voids or cells). The fugitive phase or phases can be formed from material that can burn out or otherwise be removed at some point in the formation of the proppant, if desirable, such as during the sintering step described previously. For instance, the fugitive phases can include, but are not limited to, volatile material, vaporizable material, combustible material, and/or the like. Specific examples include, but are not limited to, cellulose-based material, wood-based material, carbon-based material, such as carbon black, carbon fibers, charcoal, activated carbon, coal, paper, plant material, flour, other particulates that are combustible such as some of the material mentioned previously that has this property, and the like. The fugitive phases can be uniformly present in one layer (or more than one layer if present) that comprises the shell and in addition, or in the alternative, can be present in the template or substrate, wherein the fugitive phases can be uniformly distributed throughout the template or layer or can be located in specific locations, such as a central area, edge, upper surface, or other locations. The fugitive phases may also be present in a non-uniform distribution, in that there is a graded concentration of the fugitive phase through the bulk of the shell, with a higher concentration of fugitive phase near the surface regions and a lower concentration near the internal regions (or surfaces). The opposite distribution may also be used as may an increase in concentration of the fugitive phase in the center regions of the shell and a lower concentration at the internal and outer surfaces. These fugitive phases can then form void areas upon the fugitive material being optionally burned out or otherwise removed by other means (e.g., chemical dissolution). When multiple layers are used to form or comprise the shell, one of the layers can contain a fugitive phase, whereas a second or third layer does not contain the fugitive phase, or the number of fugitive phases, the location of the fugitive phases, and/or the size of the fugitive phases can be the same or different with respect to when the fugitive phase is present in two or more layers or is present in one or more layers of the shell and the template. Similarly, hollow material, such as hollow spheres, such as cenospheres or any of the hollow material mentioned above (e.g., ceramic microspheres, ceramic nanospheres, glass microspheres, glass nanospheres, expanded perlite, etc) can be present in the template and/or one layer (or more than one layer if present) that can comprise the shell. Like the fugitive phase, the hollow material can be the same or different if present in more than one layer comprising the shell or if present in one or more layers of the shell and the template. The number of hollow material, the location of the hollow material, and/or the size of the hollow material and/or the amount of the hollow material can be the same or different per layer or for the one or more layers of the shell and template. As with the fugitive phases, the hollow material can be centrally located in the template or can be uniformly distributed throughout the template or layer or can be specifically located in certain portions of the template or layer, such as the outer area, inner area, and the like. Similarly, with respect to the one or more layers of the shell that contains hollow material, the hollow material can be uniformly distributed throughout the shell or it can be located in certain portions of the shell, such as the outer area or inner area of the one or more layers comprising the shell. The amount of fugitive phases and/or microspheres or other hollow material can be any volume percentage based on the volume of the layer or template containing this material. For instance, the fugitive phases or hollow material can be present in a volume amount of from about 0% to about 15% by volume (e.g., 0.1% to 10%, 0.5% to 7%, 1% to 5% by volume) and, at this amount, the overall proppant can be significantly lightened and/or toughened from the standpoint of crush strength due to this amount. When amounts greater than 15% by volume are present in a layer or template, such as 15% by volume to 80% by volume (e.g., 20% to 70%, or 25% to 60% or 30% to 50% and the like), this amount typically leads to strictly a lightening effect (e.g., overall lowering of density and/or weight of the proppant) as opposed to any strengthening effect. Thus, when amounts greater than 15% by volume are present in one layer or the template or both, a lightening effect or scaffolding regime (open-cell network, which can improve overall sphericity and surface smoothness, but not impart mechanical strength) can be achieved. However, a layer(s) can comprise from about 15% to about 25% by volume of the hollow material when the diameter size of the hollow material is from 0.1 to 0.2 microns. Further, as an option, the size diameter of the fugitive phase material can be from 0.2 to 2 microns such as 0.2 to 1 micron. The hollow material can be smaller in size than fugitive phase material. The sizes can be, for instance from 0.1 microns and 0.2 microns, and 10 microns or greater. The hollow material can be obtained from: Apollo SRI, and Nanoridge Materials, or formed following U.S. Pat. No. 7,220,454, incorporated herein by reference.

As an option, coatings, such as resin coatings, can be used as one of the layers present on top of the template or substrate or present on one or more of the layers comprising the shell. This coating can have the ability to fill in at least a part of the voids formed from the fugitive phases and/or can be used to reduce porosity. The coatings, such as resin coatings or other material that have the ability to fill voids, can be used after the fugitive phase is burned out (or otherwise removed) or prior to the fugitive phase being burned out (or otherwise removed). Most preferably, the resin coating is applied after burn-out or removal of the fugitive phase. In general, the fugitive phase can be entirely removed by burn-out or other means or it can be partially removed by burn-out or other means, depending upon the particular uses of the proppant. Preferably, the removal of the fugitive phase can be 100% or nearly 100%, such as from 90% to 99% by volume, though amounts less than 90% by volume can be achieved if desired. As an option, when the fugitive phase and/or hollow material is present in more than one layer or in a layer(s) and the template, the amounts and type of fugitive phase material and/or hollow material can be present in different volume amounts. For instance, the template or substrate can contain a high level by volume of a fugitive phase and/or hollow material, and one or multiple layers comprising the shell can contain lower amounts of the hollow material and/or fugitive phase in order to ensure that the layer has sufficient strength, such as crush strength. Thus, as a specific example, the template or substrate can contain 0% to 80% by volume of a fugitive phase and/or hollow material, such as 15% to 80% by volume (or 20 vol % to 70 vol %, or 30 vol % to 60 vol %), whereas one or more layers on the template that form the shell can contain hollow material and/or fugitive phases in an amount of from 0% to 15% by volume (based on the volume of the layer that the fugitive phase and/or hollow material is present within). The fugitive phases and/or hollow material can be present on the surface of the one or more layers comprising the shell and/or the template surface and/or can be present within the thickness of the layer comprising the shell and/or template sphere.

The use of fugitive phases and/or hollow materials can permit the use of less strength-bearing phases (e.g., alumina, cordierite, mullite, steatite, zirconia, metal oxides, ceramics, etc), thus reducing the costs, as well as improving control over other attributes, such as material toughness, strength, strain fields, elastic moduli, compliancy, and the like, which can result in the optimization of the overall strength-to-weight ratio.

As an example, when more than one layer contains a hollow material and/or fugitive phase, the amount of hollow and/or fugitive phase material can decrease as one goes from the inner layers that comprise the shell to the outer layers. In other words, the outer layers, in one embodiment, can contain less fugitive phase material and/or hollow material than the inner layers that comprise the shell and/or the template or substrate itself. This can be achieved through a continuously rated percentile of fugitive phase and/or hollow material by volume. These various embodiments can be present in any of the embodiments described throughout the present application in combination with the other embodiments or as separate embodiments. The amount of the coating, such as resin coating, can be present in an amount of from about 1 vol % to about 20 vol %. The vol % binder is based up the volume of the proppant (e.g. sphere). In the ideal case the resin layer coats the surface of the proppant thus sealing any porosity off from the migration of fluids etc. There may be some migration of the resin through the porosity into the interior regions.

The fugitive phase can be "burned" out during the heating cycle and usually occurs at temperatures less than that of sintering. In the case of carbon based fugitive phases the decomposition temperature can be from about 400 deg C. to about 800 deg C. in an oxidizing atmosphere (the temperature being dependent upon the fugitive phase). Other temperatures can be used. The temperatures herein are a reference to the temperature of the material being subjected to the heating. The actual time for "burn-out" of the fugitive phase may vary from 15 minutes up to 60 minutes or more. Alternatively, the heating rate may be slowed from about 400 deg C. to about 800 deg C. to allow time for "burn-out" to occur without the requirement for a dwell time at a specific temperature. The use of hollow material like nano or micro spheres is preferential to the use of a fugitive phase as the voids thus generated are able to persist in the structure during sintering. The pores generated via the fugitive phase methodology may be eliminated during sintering due to the effects of grain growth and grain migration. In the case of hollow material like spheres, the pores will tend to persist during sintering due to the lower specific surface energy of the pore geometry and the fact that the sphere material provides a barrier to grain growth and grain migration. The size of the fugitive phases and/or hollow material that can be used can vary in diameter size of from about 0.1 µm to about 10 µm, such as from about 0.1 µm to about 0.5 µm. Other sizes can be used.

In one or more embodiments, the template and/or one or more layers comprising the shell, can contain any amount of Steatite, such as amount (vol %) of from 75 vol % to about 100 vol %. The Steatite can be used in combination with other materials described previously in the present invention.

In one or more embodiments of the present invention, the reinforcing particulates, reinforcing material and/or any of the components used to form one or more layers of the shell and/or template can be treated with one or more of the surface treatments mentioned, such as the heat treatment, densification, surface modifications, coatings, glazings, mechanical treatment, chemical treatment, a direct particle deposition from a slurry containing precursor particles, preferential dissolution of one or more species on the particulates or components, one or more chemical treatments, one or more mechanical treatments, one or more thermal treatments, one or more spark discharge treatments, or any combination thereof, and the like.

For purposes of the present invention, and as at least one embodiment of the present invention, the template sphere (or template or substrate) can be used alone, meaning no shell is present. For purposes of the present invention, the template sphere will be referred to, but it is to be understood that the embodiment(s) further relates to the template material in general or the substrate as referred to herein. The template sphere can be used in the same applications as the template with shell described herein. For instance, the template sphere can be used alone, without a shell, as a proppant for propping open formations, in hydrocarbon recovery, as part of a component in concrete, as well as the other applications described herein. The template sphere can be any of the template spheres described herein. The template sphere can be a template sphere wherein one or more flaws on the surface of the template sphere are removed or diminished as described herein. As mentioned already, these flaws can be removed by one or more chemical treatments, one or more mechanical treatments, one or more thermal treatments, one or more spark discharge treatments, or any combination thereof. The various treatments that can be used as described above can be used to form the sphere alone and/or to modify the surface of the sphere for purposes of using the template sphere alone or with a coating or shell.

In one or more embodiments, the silica migration (and/or other metal oxide migration) can be controlled, such as by two methods, i.e. reaction of silica (or other metal oxide) and the formation of an impervious boundary phase to preclude further migration of the silica (or other metal oxide). In the present invention, a thin layer (<20 µm) of a calcium containing species (e.g. $CaCO_3$, CaO, etc) can be coated over the template, the shell (or at least one layer of the shell if multiple layers are present), and/or reinforcing material with subsequent heat treatment. The reaction between the silica (or other metal oxide) and Ca containing compound can produce a range of calcium silicate phases (CS, $C_3S$, $CS_3$, $CS_6$, etc) or other calcium phases, which can then hydrate in the presence of moisture to form a dense impervious layer. A subsequent over coating(s) with a strength bearing layer(s), such as a strength bearing ceramic coating, can yield a sintered microstructure that can be essentially devoid of free silica at the grain boundaries, thus yielding a significant improvement in materials properties.

The present invention is not only limited to the fabrication of proppants, but may also be applied to filler materials for cements, cement fiber board systems, drywall fillers, caulks, polymeric systems and other such applications that require high strength, low density filler materials.

The present invention will be further clarified by the following examples, which are intended to be exemplary of the present invention.

EXAMPLES

An aqueous acetate-alumoxane solution was prepared according to the method described in Chem. Mater. 9 (1997) 2418 by R. L. Callender, C. J. Harlan, N. M. Shapiro, C. D. Jones, D. L. Callahan, M. R. Wiesner, R. Cook, and A. R. Barron, incorporated in its entirety by reference herein. The aqueous solution was degassed before use. The aqueous acetate-alumoxane solution mentioned above, in the solution range of 0.5-20 weight percent, was degassed before use. Cenosphere templates in the size range of 100-600 micron were coated with the alumoxane solutions as described in the examples below.

Figure 4:
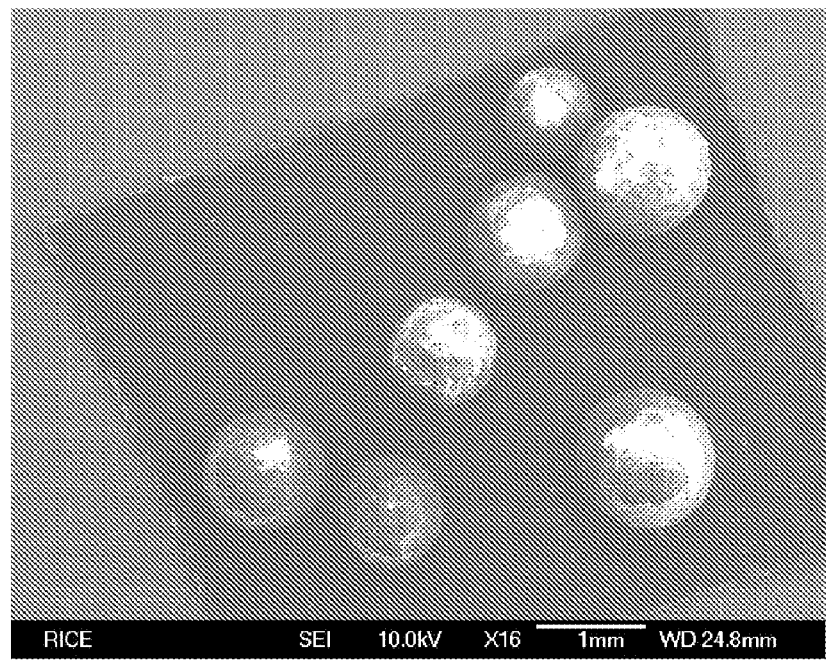
FIG. 4 is an SEM image of pre-expanded polystyrene with 1 coat of a 10% acetate-alumoxane nanoparticle solution and heated to 220° C. for 1 hour.

In Example 1, spherical polystyrene template beads were coated with the alumoxane solution, ranging from 0.5-20 weight percent alumoxane nanoparticles. The template spheres were submerged in the solution at room temperature. The solution was then drained, and the spheres placed in a ceramic crucible, which were allowed to dry under controlled conditions. The preferred conditions were at room temperature for 48 hours under 70% relative humidity. These dried, coated spheres were then agitated, and recoated two more times as stated above to achieve a uniform coating, and to maximize their sphericity. The spheres were then heated to 180° C. for 40 minutes to burn off organics and to set the alumina shell. After cooling to room temperature, the spheres were coated again with the alumoxane solution, dried, and reheated to 180° C., as stated above, which resulted in a thickening of the alumina shell. The templated alumina spheres were then sintered at 1200° C. for 1 hour, to convert the phase of alumina in the shell to the crystalline sapphire phase of alumina. FIG. 4 is a SEM image illustrating the spheres formed from the process.

This is a theoretical example. In Example 2, the polystyrene template spheres can be placed into a container under vacuum, and sufficient alumoxane solution can be injected into the container so as to submerge the template spheres. The container can be vented, followed by draining of the alumoxane solution, and drying of the spheres under controlled conditions in a ceramic crucible. The preferred conditions can be at room temperature for 48 hours under 70% relative humidity. The spheres can be recoated according to this vacuum method two more times and dried under the preferred conditions to achieve a uniform coating, and to maximize their sphericity. The alumina spheres can be heat processed at 180° C., recoated under vacuum, and dried under the preferred conditions, and sintered at 1200° C., as Example 1.

Figure 5:
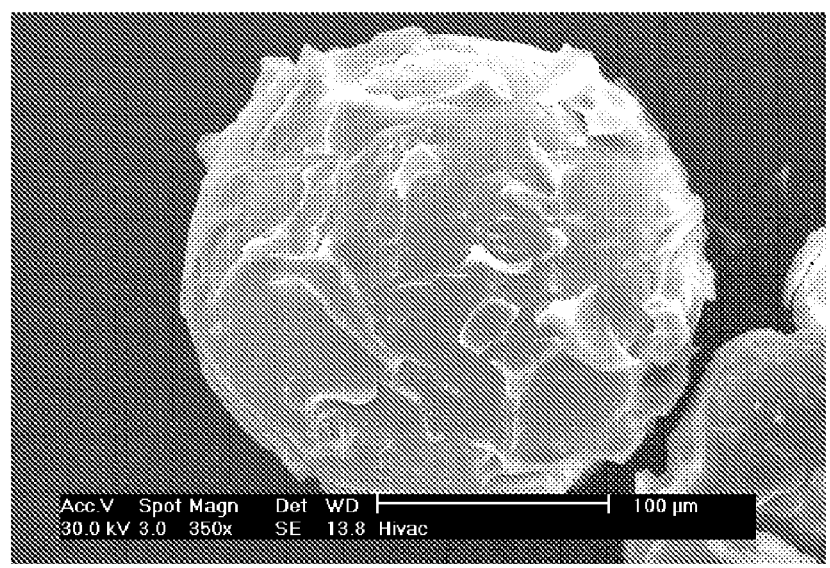
FIG. 5 is a SEM image of cenosphere with a coating of 10% acetate alumoxane nanoparticle solution heated to 1000° C. for 1 hour.

In Example 3, the Cenosphere template spheres were submerged in the alumoxane solution at room temperature. The solution was then drained, and the spheres placed in a ceramic crucible, which were allowed to dry under controlled conditions. The preferred conditions were at room temperature for 48 hours under 70% relative humidity. These dried, coated spheres were then agitated, and recoated two more times as stated above to achieve a uniform coating, and to maximize their sphericity. The spheres were then heated to 460° C. for an hour to burn off organics and to set the alumina shell. After cooling to room temperature, the spheres were coated again with the alumoxane solution, dried, and reheated to 180° C., as stated above, which results in a thickening of the alumina shell. The templated alumina spheres were then sintered at 1200° C. for 1 hour, to convert the phase of alumina in the shell to the crystalline sapphire phase of alumina. FIG. 5 is a SEM image illustrating such spheres formed from the process.

This is a theoretical example. In Example 4, the Cenosphere template spheres can be placed into a container under vacuum, and sufficient alumoxane solution can be injected into the container so as to submerge the template spheres. The container can be vented, followed by draining of the alumoxane solution, and drying of the spheres under controlled conditions in a ceramic crucible. The preferred conditions can be at room temperature for 48 hours under 70% relative humidity. The spheres can be recoated according to this vacuum method two more times and dried under the preferred conditions to achieve a uniform coating, and to maximize their sphericity. The alumina spheres can be heat processed at 460° C., recoated under vacuum, and dried under the preferred conditions, and sintered at 1200° C., as in Example 3.

This is a theoretical example. In Example 5, spherical Styropore templates of 300-1200 micron diameter range and 50-200 micron wall thickness can be infiltrated with the alumoxane solution, ranging from 0.5-60 weight percent. The resulting diameter and wall thickness of the alumina shells formed can be dictated by the diameter and wall thickness of the Styropore templates chosen. The template spheres can be submerged in the solution at room temperature. The solution can then be drained, and the spheres placed in a ceramic crucible, which can be allowed to dry under controlled conditions. The preferred conditions can be at room temperature for 48 hours under 70% relative humidity. These dried, infiltrated spheres can then be heated to at least 180° C., to calcine the infiltrated alumoxane nanoparticles to alumina, followed by further heating at a ramp rate of 0.2° C./min to 230° C. A hold of 1 hour at 230° C. can be allowed for burnoff of the Styropore template, resulting in a porous spherical alumina shell. Further heating at a ramp rate of 1° C./min to 500° C. resulted in further setting of the alumina shell. The alumina shells can then be cooled to room temperature, and themselves infiltrated with the alumoxane solution, as stated above for the Styropore templates. This can result in filling of the void space left by the lost Styropore template. These infiltrated shells can be heated at a ramp rate of 1° C./min to 500° C., to calcine the infiltrated alumoxane nanoparticles, and to further set the infiltrated alumina shell, followed by cooling to room temperature. These shells can be infiltrated and calcined once more, to produce a uniform shell of maximal sphericity, followed by sintering at 1200° C. for one hour, to convert the phase of alumina in the shell to the crystalline sapphire phase of alumina.

This is a theoretical example. In Example 6 the Styropore sphere templates can be placed into a container under vacuum, and sufficient alumoxane solution can be injected into the container so as to submerge the template spheres. The container can be vented, followed by draining of the alumoxane solution, and drying of the infiltrated Styropore spheres under controlled conditions in a ceramic crucible. The preferred conditions can be at room temperature for 48 hours under 70% relative humidity. These dried, infiltrated spheres can then be heated to at least 180° C., to calcine the infiltrated alumoxane nanoparticles to alumina, followed by further heating at a ramp rate of 0.2° C./min to 230° C. A hold of 1 hour at 230° C. can be allowed for burnoff of the Styropore template, resulting in a porous spherical alumina shell. Further heating at a ramp rate of 1° C./min to 500° C. can result in further setting of the alumina shell. The alumina shells can then be cooled to room temperature, and themselves infiltrated under the same vacuum conditions with the alumoxane solution, as stated above for the Styropore templates. This can result in filling of the void space left by the lost Styropore template. These infiltrated shells can be heated at a ramp rate of 1° C./min to 500° C., to calcine the infiltrated alumoxane nanoparticles, and to further set the infiltrated alumina shell, followed by cooling to room temperature. These shells can be infiltrated and calcined once more, to produce a uniform shell of maximal sphericity, followed by sintering at 1200° C. for one hour, to convert the phase of alumina in the shell to the crystalline sapphire phase of alumina.

This is a theoretical example. In Example 7, hollow spherical glass template beads of 150-850 micron size range can be coated with the alumoxane solution, ranging from 0.5-20 weight percent. The template spheres can be submerged in the solution at room temperature. The solution can then be drained, and the spheres placed in a ceramic crucible, which can be allowed to dry under controlled conditions. The preferred conditions can be at room temperature for 48 hours under 70% relative humidity. These dried, coated spheres can then be agitated, and recoated two more times as stated above to achieve a uniform coating, and to maximize their sphericity. The spheres can then be heated at a ramp rate of 1° C./min to 460° C., followed by a hold of 40 minutes to burn off organics and to set the alumina shell. After cooling to room temperature, the spheres can be coated again with the alumoxane solution, dried, and reheated to 460° C., as stated above, which resulted in a thickening of the alumina shell. The templated alumina spheres can then be sintered at 1200° C. for 6 hours, which resulted in the formation of an aluminosilicate at the silica-alumina interface, consisting of mullite and corundum phases. The amorphous silica further can serve as a reactive wetting phase to facilitate the resorption of some of the alumina, in creating mullite at the interface. The relative amount of mullite and alumina phases formed can be dependent on the amounts of silica and alumina initially present, and can be calculated from an alumina-silica binary phase diagram. Complete conversion of the silica phase to mullite can occur in the aluminosilicate sphere, with the alumina in excess of 60% originally present in the starting material, comprising the alumina phase of the sphere.

This is a theoretical example. In Example 8, a known amount of solid, hollow or porous beads would be fluidized in a fluid bed. An alumoxane solution would be sprayed into the chamber in order to coat the beads. The beads will then be dried by introducing a heated gas into the chamber or by virtue of their movement through the gaseous "fluid". Cycles of spraying and drying can be repeated, depending on the thickness of the coating required. Once the desired thickness has been achieved, the coated beads are removed and sintered to 1200° C. in order to convert the alumina to sapphire.

This is a theoretical example. In Example 9, a known amount of solid, hollow or porous beads would be fluidized in a fluid bed. A solution of partially cross-linked hybrid alumoxane polymer would be sprayed into the chamber in order to coat the beads. This would be followed by spraying a curing agent into the chamber in order to set the polymer coating. Alternatively, a molten hybrid alumoxane polymer could be sprayed onto the chamber to coat the particles. The beads can then be cooled by introducing cooled air into the chamber. In the case of a polymer that requires heating for cure, heated air can be introduced into the chamber.

In Example 10, 440 mL of water was mixed with 20 mL glacial acetic acid, in which 4 g of Catapal B and 36 g Dispal 11N7-80 boehmites were peptized with mixing, at room temperature for 2 hours. After sufficient mixing, 150 g of an 8% wt solution of the mixture was spray coated in a fluidized bed (Vector fluidized bed, model MFL.01) onto 20 g of cenospheres, and dried at 80° C., at 130 liters per minute airflow. These coated cenospheres were then sintered at 5° C./min to 500° C., and then to 1400° C. at 10° C./min, for 2 hours. FIGS. 6-8 illustrate sintered microstructures of the above formulation.

In Example 11, 440 mL of water was mixed with 20 mL glacial acetic acid, in which 4 g of Catapal B and 36 g Dispal 11N7-80 boehmites were peptized with mixing, at room temperature for 2 hours. To this mixture was added 50 mL of a 1% wt. $Fe_2O_3$ solution (1% $Fe_2O_3$ by total solids wt), with additional stirring. After sufficient mixing, 150 g of an 8% wt solution of the mixture was spray coated in a fluidized bed (Vector fluidized bed, model MFL.01) onto 20 g of cenospheres, and dried at 80° C., at 130 liters per minute airflow. These coated cenospheres were then sintered at 5° C./min to 500° C., and then to 1200° C. at 10° C./min, for 2 hours. FIGS. 9-11 illustrate sintered microstructures of the above formulation.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A proppant comprising a sintered sphere and having a Krumbein sphericity of at least about 0.5 and a roundness of at least about 0.4, and wherein said proppant comprises a) a ceramic material and b) a volcanic material or vermiculite or both, and said proppant has a crush strength of about 1,500 psi or greater, an overall diameter of from about 90 microns to about 1,600 microns, and has a specific gravity of from about 0.9 to about 1.5 g/cc.

2. The proppant of claim 1, wherein said proppant comprises a template sphere and a shell on said template sphere.

3. The proppant of claim 2, wherein said shell is a continuous sintered shell around the entire outer surface of said template sphere, and wherein said shell comprises a ceramic material or oxide thereof and said template sphere comprises a material capable of withstanding sintering.

4. The proppant of claim 2, wherein said shell has a thickness of from about 5 microns to 150 microns.

5. The proppant of claim 1, wherein said volcanic material comprises perlite, pumice or both.

6. The proppant of claim 1, wherein said ceramic material comprises mullite, cordierite, or both.

7. The proppant of claim 1, wherein said volcanic material comprises perlite, pumice or both, and wherein said ceramic material comprises mullite, cordierite, or both.

8. The proppant of claim 2, wherein said shell is porous.

9. The proppant of claim 2, wherein said proppant further comprises a non-porous coating on said shell.

10. The proppant of claim 9, wherein said non-porous coating is a glazing layer.

11. The proppant of claim 1, wherein said proppant further comprises boehmite, alumina, spinel, an alumnosilicate clay, calcium carbonate, calcium oxide, magnesium oxide, magnesium carbonate, cordierite, spinel, spodumene, steatite, a silicate, a substituted alumino silicate clay or any combination thereof.

12. The proppant of claim 1, wherein said proppant comprises one or more amorphous phases and one or more crystalline phases.

13. The proppant of claim 1, wherein said proppant further comprises nanotubes, nanorods, nanowires, nanospheres, microspheres, whiskers of oxide, fullerenes, carbon fibers, nomex fibers, or any combination thereof.

14. The proppant of claim 1, wherein said proppant further comprises mineral-based particulates.

15. The proppant of claim 14, wherein said mineral-based particulates comprise kyanite, mica, quartz, sapphire, corundum, or any combination thereof.

16. The proppant of claim 2, wherein said shell comprises reinforcing particulates.

17. The proppant of claim 16, wherein said reinforcing particulates have a thermal expansion coefficient that matches that of the shell.

18. The proppant of claim 16, wherein said reinforcing particulates have a thermal expansion coefficient that is higher that of the shell.

19. The proppant of claim 16, wherein said reinforcing particulates have a thermal expansion coefficient that is lower that of the shell.

20. The proppant of claim 1, wherein said proppant comprises a mixture of two or more metal oxides.

21. The proppant of claim 20, wherein said mixture is at a weight ratio of 85:15% to 70:30%.

22. The proppant of claim 20, wherein said mixture is at a weight ratio of 60:40% to 27:73%.

23. The proppant of claim 1, wherein said proppant further comprises reinforcing material.

24. The proppant of claim 1, wherein said proppant further comprises carbon black, fiberglass, carbon fibers, ceramic whiskers, ceramic particulates, metallic particles, or any combination thereof.

25. The proppant of claim 1, wherein said proppant further comprises nanoparticles.

26. The proppant of claim 1, wherein said proppant further comprises nanoclays, carbon nanofibers, silica, carbon nanotubes, nanoparticle minerals, mica, graphite, carbon black, fumed carbon, fly ash, glass nanospheres, ceramic nanospheres, or any combination thereof.

27. The proppant of claim 2, wherein said shell comprises two or more layers and wherein at least two layers contain a fugitive phase material or a hollow material or both, wherein the fugitive phase material or hollow material or both are the same or different in each layer.

28. The proppant of claim 27, wherein said two or more layers comprise at least an outer layer and an inner layer, wherein said outer layer has a higher amount of said fugitive phase material and/or hollow material compared to said inner layer.

29. The proppant of claim 2, wherein said shell comprises a coating layer to fill in at least a portion of the pores or voids that are present on a layer comprising a shell or surface of said template sphere.

30. A method of forming the proppant of claim 2, comprising providing a template sphere and providing a shell around the entire outer surface of said template sphere, and then sintering said shell to form a sintered shell, wherein said sintering comprises microwave sintering.

31. A method of forming the proppant of claim 1, comprising providing a green body that forms said proppant upon sintereing, and sintering said proppant to form a sintered proppant, wherein said sintering comprises microwave sintering.

32. The method of claim 31, wherein said sintering comprises liquid phase sintering, reactive phase sintering, solid state sintering, or pressure-assisted sintering.

33. A proppant formulation comprising the proppant of claim 1 and a carrier.

34. A method to prop open subterranean formation fractions comprising introducing the proppant formulation of claim 33 into said subterranean formation.

35. A method of treating a subterranean producing zone penetrated by a well bore comprising the steps of (a) preparing or providing a treating fluid that comprises a fluid, energized fluid, foam, or a gas carrier having the proppant of claim 1 suspended therein, and (b) pumping said treating fluid into said subterranean producing zone whereby said particles are deposited therein.

36. The method of claim 35, wherein said treating fluid is a fracturing fluid and said particles are deposited in fractures formed in said subterranean producing zone.

37. The method of claim 35, wherein said treating fluid is a gravel packing fluid and said particles are deposited in said well bore adjacent to said subterranean producing zone.

38. The proppant of claim 1, wherein said proppant comprises a shell and template sphere and said volcanic material or vermiculite or both is present in said shell.

39. The proppant of claim 1, wherein said proppant comprises a shell and template sphere and said volcanic material or vermiculite or both is present in said template sphere.

* * * * *